US006952519B2

(12) United States Patent
Bickham et al.

(10) Patent No.: US 6,952,519 B2
(45) Date of Patent: Oct. 4, 2005

(54) LARGE EFFECTIVE AREA HIGH SBS THRESHOLD OPTICAL FIBER

(75) Inventors: Scott R. Bickham, Corning, NY (US); Dipakbin Q. Chowdhury, Corning, NY (US); Madison L. Howard, Wilmington, NC (US); Shiva Kumar, Hamilton (CA); Daiping Ma, Wilmington, NC (US); Snigdharaj K. Mishra, Wilmington, NC (US); A. Boh Ruffin, Painted Post, NY (US); Sergey Y. Ten, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/818,054

(22) Filed: Apr. 5, 2004

(65) Prior Publication Data

US 2004/0218882 A1 Nov. 4, 2004

Related U.S. Application Data

(60) Provisional application No. 60/467,676, filed on May 2, 2003, provisional application No. 60/507,313, filed on Sep. 29, 2003, provisional application No. 60/528,953, filed on Dec. 11, 2003, and provisional application No. 60/546,490, filed on Feb. 20, 2004.

(51) Int. Cl.[7] .............................. G02B 6/00; G02B 6/02
(52) U.S. Cl. ...................................... 385/127; 385/147
(58) Field of Search .................... 65/398; 385/123–127, 385/129, 141, 146, 147

(56) References Cited

U.S. PATENT DOCUMENTS

| 4,679,934 | A | * | 7/1987 | Ganguly et al. ............... 356/43 |
| 4,794,598 | A | * | 12/1988 | Desurvire et al. ............. 372/3 |
| 5,278,931 | A | | 1/1994 | Antos et al. ................. 385/126 |
| 5,680,491 | A | | 10/1997 | Shigematsu et al. .......... 385/24 |

(Continued)

FOREIGN PATENT DOCUMENTS

| EP | 1 130 426 | 9/2001 | ............. G02B/6/16 |
| EP | 1 233 288 | 8/2002 | ............. G02B/6/22 |
| EP | 1 391 759 | 2/2004 | ............. G02B/6/16 |
| JP | 2002026818 A | 1/2002 | ............. H04B/10/02 |
| WO | WO 01/23922 | 4/2001 | ............. G02B/6/02 |
| WO | WO 01/65287 | 9/2001 | ............. G02B/6/16 |

OTHER PUBLICATIONS

Lu et al., "*A Bidirectional Hybrid DWDM System for CATV and OC–48 Trunking*", IEEE Photonics Technology Letters, vol. 13, No. 8, Aug. 2001, pps. 902–904.

Bugos, A.R., "*60 Channel AM–VSB Video Transmission over 30 Kilometers of Optical Fiber Using a Nd:YA Laser and External Intensity Modulation*", Proceedings of the Southeast Conference, New York, IEEE, US, vol. 1, Apr. 7, 1991, pps 289–292.

(Continued)

*Primary Examiner*—Akm Enayet Ullah
(74) *Attorney, Agent, or Firm*—Joseph M. Homa

(57) ABSTRACT

An optical waveguide fiber having a high threshold for stimulated Brillouin scattering. The optical fiber preferably has large optical effective area, and further preferably has a low zero dispersion wavelength.

33 Claims, 18 Drawing Sheets

U.S. PATENT DOCUMENTS

| | | | | |
|---|---|---|---|---|
| 5,812,294 | A | | 9/1998 | Wilson ........................ 359/161 |
| 5,848,215 | A | | 12/1998 | Akasaka et al. ............. 385/123 |
| 5,851,259 | A | | 12/1998 | Clayton et al. ................ 65/377 |
| 5,933,553 | A | * | 8/1999 | Ziemann ....................... 385/24 |
| 5,956,448 | A | | 9/1999 | Smolka et al. ............... 385/124 |
| 6,014,249 | A | | 1/2000 | Fermann et al. ............ 359/341 |
| 6,072,929 | A | | 6/2000 | Kato et al. ................... 385/123 |
| 6,078,715 | A | | 6/2000 | Fujii et al. ................... 385/124 |
| 6,091,873 | A | | 7/2000 | Matsuo et al. ............... 385/123 |
| 6,424,778 | B1 | | 7/2002 | Li .............................. 385/127 |
| 6,490,396 | B1 | | 12/2002 | Smith ......................... 385/123 |
| 6,516,113 | B1 | | 2/2003 | Glingener et al. ............ 385/24 |
| 6,529,672 | B1 | | 3/2003 | Blondel et al. ............. 385/140 |
| 6,542,683 | B1 | | 4/2003 | Evans et al. ................ 385/127 |
| 6,587,623 | B1 | | 7/2003 | Papen et al. ................ 385/123 |
| 6,600,862 | B2 | | 7/2003 | Mukasa ...................... 385/124 |
| 6,647,190 | B2 | | 11/2003 | Matsuo et al. ............... 385/123 |
| 6,687,440 | B2 | | 2/2004 | Balestra et al. ............. 385/123 |
| 2001/0021298 | A1 | | 9/2001 | Mukasa ....................... 385/124 |
| 2002/0081069 | A1 | * | 6/2002 | Yeniay et al. .................. 385/39 |
| 2002/0154876 | A1 | | 10/2002 | Kawasaki et al. .......... 385/124 |
| 2002/0181076 | A1 | | 12/2002 | Bickham et al. ............ 359/334 |
| 2003/0044150 | A1 | | 3/2003 | Van Bergen et al. ....... 385/127 |
| 2003/0180019 | A1 | | 9/2003 | Tirloni ....................... 385/127 |
| 2004/0037529 | A1 | | 2/2004 | Balestra et al. ............. 385/128 |
| 2004/0062504 | A1 | | 4/2004 | Bellman et al. ............ 385/129 |
| 2004/0218882 | A1 | * | 11/2004 | Bickham et al. ............ 385/127 |
| 2004/0247320 | A1 | * | 12/2004 | Bickham et al. .............. 398/71 |
| 2004/0252994 | A1 | * | 12/2004 | Bickham et al. .............. 398/26 |
| 2005/0025501 | A1 | * | 2/2005 | Bickham .................... 398/188 |

OTHER PUBLICATIONS

Botineau et al., "Effective stimulated Brillouin gain in singlemode optical fibres", Electronics Letters, Nov. 9, 1995, vol. 31, No. 23, pps., 2032–2034.

Koyamada et al., "Simulating and Designing Brillouin Gain Spectrum in Single–Mode Fibers", Journal of Lightwave Technology, vol. 22, No. 2, Feb. 2004, pps. 631–639.

Yeniay et al., "Spontaneous and Stimulated Brillouin Scattering Gain Spectra in Optical Fibers", Journal of Lightwave Technology, vol. 20, No. 8, Aug. 2002, pps. 1425–1432.

Yu et al., "Analysis of Brillouin Frequency Shift and Longitudinal Acoustic Wave in a Silica Optical Fiber With a Triple–Layered Structure", Journal of Lightwave Technology, vol. 21, No. 8, Aug. 2003, pps. 1779–1786.

Tsun et al., "Wavelength Dependences of Brillouin Frequency Shifts of Optical Fibres in 1·55 $\mu m$ Wavelength Region", Electronics Letters, Sep. 12, 1991, vol. 27, No. 19, pps. 1764–1765.

Shibata et al., "Brillouin–Gain Spectra for Single–Mode Fibers Having Various Core/Cladding Material Compositions", Fourteenth European Conference on Optical Communication, vol. 1, Sep. 11–15, 1988, pps. 115–118.

Azuma et al., "Wavelength Dependence of Brillouin–Gain Spectra for Single–Mode Optical Fibres", Electronics Letters, Mar. 3, 1988, vol. 24, No. 5, pps. 250–252.

Shiraki et al., "Performance of Strain–Free Stimulated Brillouin Scattering Suppression Fiber", Journal of Lightwave Technology, vol. 14, No. 4, Apr. 1996, pps. 549–554.

Shiraki et al., "SBS Threshold of a Fiber with a Brillouin Frequency Shift Distribution", Journal of Lightwave Technology, vol. 14, No. 1, Jan. 1996, pps. 50–57.

Ohashi et al., "Design of Strain–Free–Fiber with Nonuniform Dopant Concentration for Stimulated Brillouin Scattering Suppression", Journal of Lightwave Technology, vol. 11, No. 12, Dec. 1993, pps. 1941–1945.

Shiraki et al., "Suppression of stimulated Brillouin scattering in a fibre by changing the core radius", Electronics Letters, Apr. 13, 1995, vol. 31, No. 8, pps. 668–669.

Mao et al., "Stimulated Brillouin Threshold Dependence on Fiber Type and Uniformity", IEEE Photonics Technology Letters, vol. 4, No. 1, Jan. 1992, pps. 66–68.

Tsujikawa et al., "New SBS Suppression Fiber with Uniform Chromatic Dispersion to Enhance Four–Wave Mixing" IEEE Photonics Technology Letters, vol. 10, No. 8, Aug. 1998, pps. 1139–1141.

Yu et al., Brillouin frequency shifts in silica optical fiber with the double cladding structure, Optics Express, vol. 10, No. 19, Sep. 23, 2002, pps. 996–1002.

Jen et al., "Role of Guided Acoustic Wave Properties in Single–Mode Optical Fibre Design", Electronics Letters, Nov. 10, 1988, vol. 24, No. 23, pps. 1419–1420.

Headley et al., "Methods of Suppressing Stimulated Brillouin Scattering in Optical Fibers by Manipulation of the Fiber Properties", Technical Digest Symposium on Optical Fiber Measurements, Oct. 1, 1996, pps. 105–110.

Thomas et al., "Normal acoustic modes and Brillouin scattering in single–mode optical fibers", Physical Review B, vol. 19, No. 10, May 15, 1979, pps. 4986–4998.

Helge E. Engan, "Acousto–Optic Coupling in Optical Fibers",2000 IEEE Ultrasonics Symposium, Oct. 22–25, 2000, pps. 625–629.

Jen et al., "Backward Collinear Guided–Wave–Acousto–Optic Interactions in Single–Mode Fibers", Journal of Lightwave Technology, vol. 7, No. 12, Dec. 1989, pps. 2018–2023.

Jen et al., "Leaky Modes in Weakly Guiding Fiber Acoustic Waveguides", IEEE Transactons on Ultrasonics, Ferroelectrics, and Frequency Control, vol. UFFC–33, No. 6, Nov. 1986, pps. 634–643.

Lu et al., "A Hybrid CATV/256–Qam/OC–48 DWDM System Over an 80–km LEAF Transport", IEEE Transactions on Broadcasting, vol. 49, No. 1, Mar. 2003, pps. 97–102.

Lee et al., "Repeaterless Transmission of 80–Channel AM–SCM Signals Over 100–km Large–Effective–Area Dispersion–Shifted Fiber", IEEE Photonics Technology Letters, vol. 12, No. 2, Feb. 2000, pps. 341–343.

Kobyakov et al., "Stimulated Brillouin Scattering in Raman– Pumped Fibers: A Theoretical Approach", Journal of Lightwave Technology, vol. 20, No. 8, Aug. 2002, pps. 1635–1643.

Lu et al., "Long–Distance Transmission of Directly Modulated 1150 nm AM–VSB CATV Systems", Fiber and Integrated Optics, vol. 20, No. 3, 2001, pps. 279–285.

Radmacher et al., "Long Distance Transmission of 1550 nm CATV signals on Different Optical Fiber Types", Microwave and Optoelectronics Conference, vol. 1, Aug. 6–10, 2001, pps. 359–362.

* cited by examiner

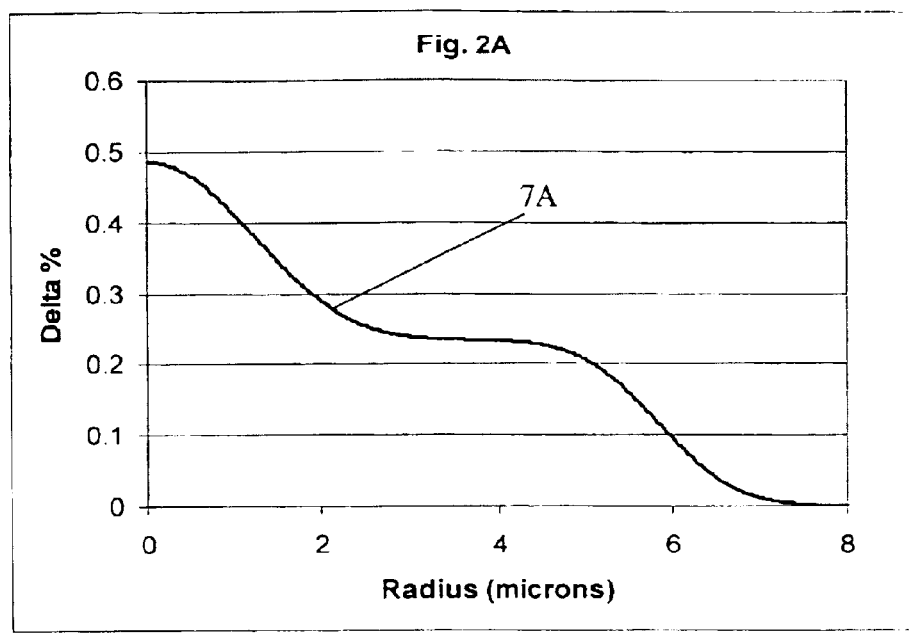
FIG. 2B
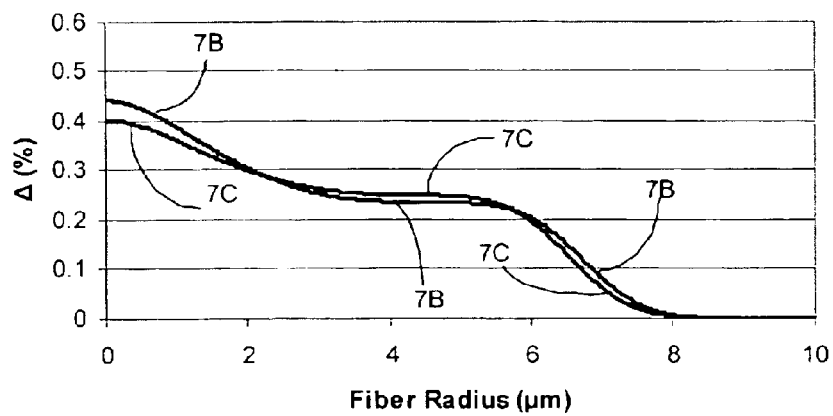
FIG. 2C
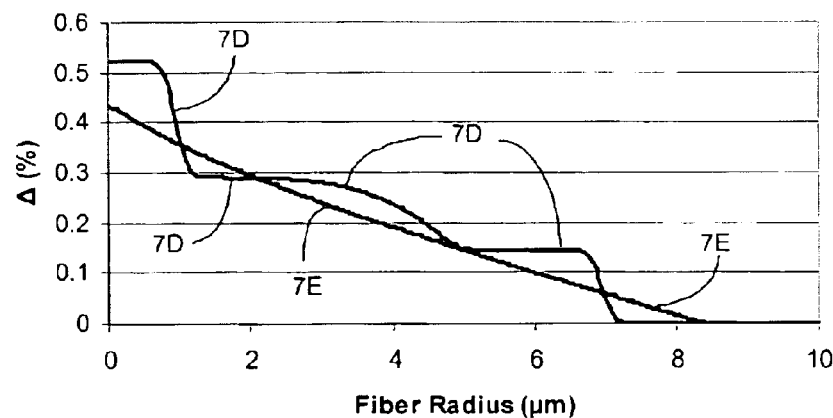

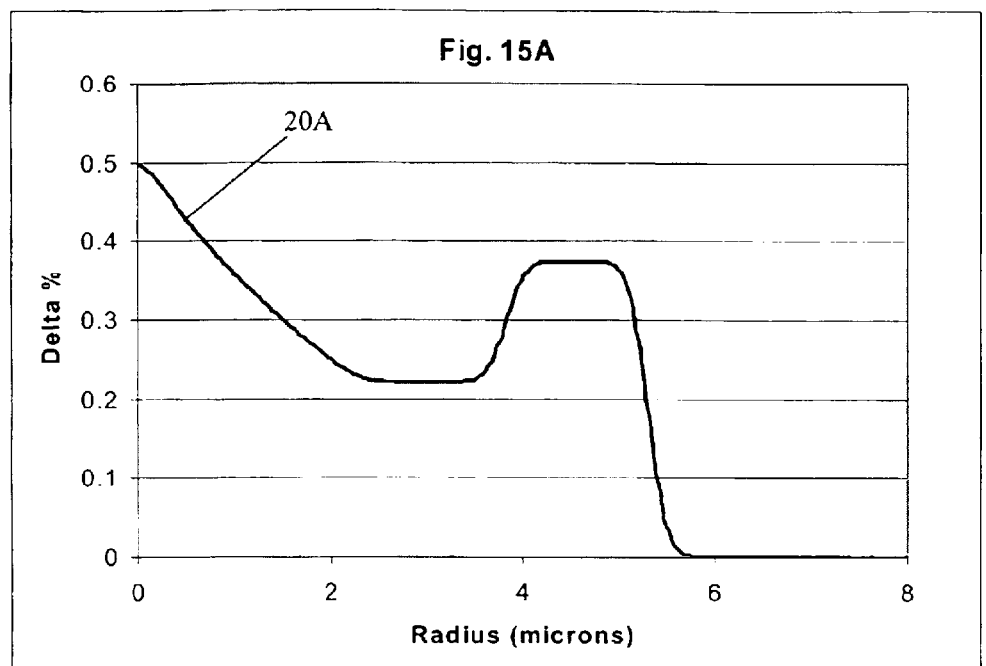
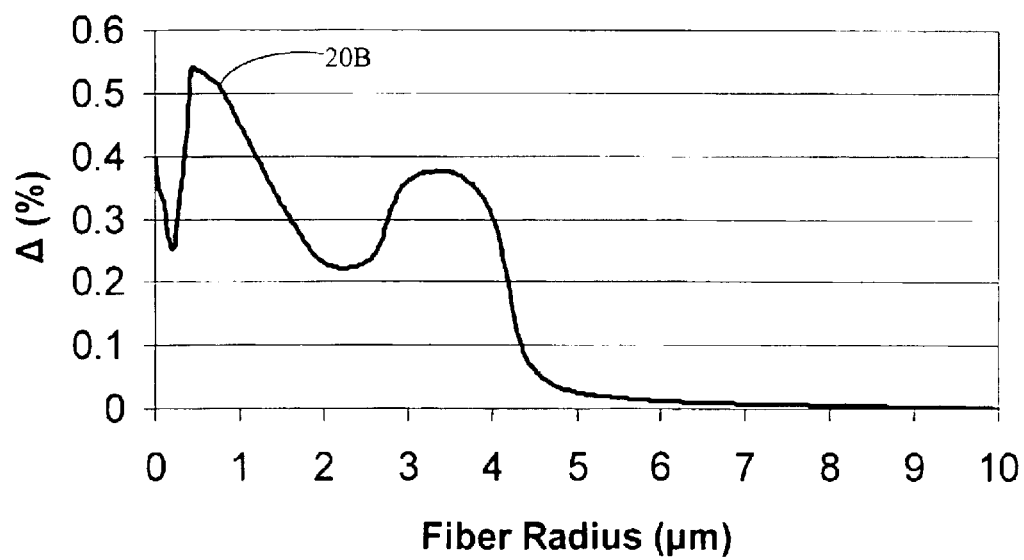

LARGE EFFECTIVE AREA HIGH SBS THRESHOLD OPTICAL FIBER

CROSS-REFERENCE TO RELATED APPLICATIONS

This application claims the benefit of priority under 35 U.S.C. § 119(e) of U.S. Provisional Application Ser. No. 60/467,676 filed May 2, 2003; U.S. Provisional Application Ser. No. 60/507,313 filed Sep. 29, 2003; U.S. Provisional Ser. No. 60/528,953 filed Dec. 11, 2003; and U.S. Provisional Application Ser. No. 60/546,490 filed Feb. 20, 2004.

BACKGROUND OF THE INVENTION

1. Field of the Invention

The present invention relates to high SBS threshold optical fibers. More preferably, the present invention relates to high SBS threshold optical fibers having large effective area.

2. Technical Background

Stimulated Brillouin Scattering (SBS) is a dominant nonlinear penalty in many optical transmission systems. In many systems, the launching of large power to optical fiber while maintaining high signal to noise ratio (SNR) is desirable. However, as the launch power or signal power of an incident signal launched into an optical fiber increases, the launch power may exceed a certain threshold power and part of the signal power gets reflected due to SBS as a reflected signal. An undesirably large amount of the signal power can thus be reflected back toward the transmitter due to SBS. In addition, the scattering process increases the noise level at the signal wavelength. The combination of decrease in signal power and increase in the noise both lower the SNR and lead to performance degradation.

At finite temperatures, thermal excitations occur in glasses similar to phonons in crystals, and the interaction of these vibrational modes with low intensity signal light produces spontaneous Brillouin scattering. An intense optical field generates pressure or sound waves through electrostriction due to the beating of intense incident and spontaneous reflected light giving rise to pressure or acoustic waves. The change in pressure causes material density to change, thereby resulting in refractive index fluctuations. The net result is that an intense electrical field component of the optical wave generates pressure or sound waves which cause density fluctuations. The acoustic wave changes the refractive index and enhances the reflected light amplitude through Bragg diffraction. Above the SBS threshold of an optical fiber, the number of stimulated photons is very high, resulting in a strong reflected field which limits the optical power that is transmitted and which reduces the SNR.

SUMMARY OF THE INVENTION

Disclosed herein is an optical waveguide fiber having a high threshold for stimulated Brillouin scattering. The optical fiber preferably has large optical effective area. The optical fiber guides at least one optical mode and a plurality of acoustical modes, including an $L_{01}$ acoustical mode and an $L_{02}$ acoustical mode. The optical fiber comprises a core having a refractive index profile and a centerline and a cladding layer surrounding and directly adjacent the core.

In one group of embodiments, an optical fiber is disclosed herein comprising: a length; a core having a refractive index profile and a centerline, the core comprising a central region having a maximum relative refractive index $\Delta_{1MAX}$, an intermediate region surrounding and directly adjacent the central region, the intermediate region having a minimum relative refractive index $\Delta_{2MIN}$, and an outer region surrounding and directly adjacent the intermediate region, the outer region having a maximum relative refractive index $\Delta_{3MAX}$, wherein $\Delta_{1MAX} > \Delta_{2MIN}$ and $\Delta_{3MAX} > \Delta_{2MIN}$; and a cladding layer surrounding and directly adjacent the core; wherein the optical fiber has an attenuation at 1550 nm; wherein the refractive index of the core is selected to provide an absolute SBS threshold in dBm greater than about $9.3 + 10\log[(1-e^{-(0.19)(50)/4.343})/(1-e^{-(\alpha)(L)/4.343})]$, wherein L is the length in km and $\alpha$ is the attenuation in dB/km at 1550 nm. Preferably, the refractive index of the core is selected to provide an optical effective area at 1550 nm greater than 80 $\mu m^2$. Preferably, the refractive index of the core is selected to provide a zero dispersion wavelength below 1400 nm. Preferably, the refractive index of the core is selected to provide a dispersion of greater than 15 ps/nm-km at a wavelength of 1550 nm. Preferably, the refractive index of the core is selected to provide a dispersion slope at 1550 nm of less than 0.07 ps/nm$^2$-km. In preferred embodiments, $\Delta_{1MAX} > 0.4\%$. Preferably, the absolute SBS threshold in dBm greater than about $9.5 + 10\log[(1-e^{-(0.19)(50)/4.343})/(1-e^{-(\alpha)(L)/4.343})]$. Preferably, the attenution at 1550 nm is less than 0.23 dB/km, more preferably less than 0.22 dB/km, even more preferably less than 0.21 dB/km, still more preferably less than 0.2 dB/km.

Preferably, $\Delta_{1MAX} > 0$, $\Delta_{3MAX} > 0$, and $\Delta_{2MIN} > 0$. Preferably, the refractive index of the entire core relative to the cladding is greater than 0.

In one subset of embodiments, $\Delta_{1MAX}$ is greater than $\Delta_{3MAX}$. In another subset, $\Delta_{1MAX}$ is substantially equal to $\Delta_{3MAX}$. In yet another subset, $\Delta_{1MAX}$ is less than $\Delta_{3MAX}$.

Preferably, $|\Delta_{1MAX} - \Delta_{2MIN}| > 0.25\%$, more preferably $\Delta_{1MAX} - \Delta_{2MIN} > 0.25\%$. Preferably, $\Delta_{2MIN} < 0.4\%$, more preferably $\Delta_{2MIN}$ is between 0.1 and 0.4%. In some preferred embodiments, $\Delta_{2MIN}$ is between 0.1 and 0.3%. In other preferred embodiments, $\Delta_{2MIN}$ is between 0.2 and 0.3%.

Preferably, $|\Delta_{3MAX} - \Delta_{2MIN}| > 0.10\%$, more preferably $\Delta_{3MAX} - \Delta_{2MIN} > 0.10\%$. In preferred embodiments, $\Delta_{1MAX} > 0.4\%$, $\Delta_{1MAX} - \Delta_{2MIN} > 0.25\%$, $\Delta_{2MIN}$ is between 0.1 and 0.4%, and $\Delta_{3MAX} - \Delta_{2MIN} > 0.10\%$.

In preferred embodiments, the absolute SBS threshold in dBm is greater than about $9.5 + 10\log[(1-e^{-(0.19)(50)/4.343})/(1-e^{-(\alpha)(L)/4.343})]$.

In some preferred embodiments, the optical effective area at 1550 nm is greater than 90 $\mu m^2$. In other preferred embodiments, the optical effective area at 1550 nm is greater than 100 $\mu m^2$.

In some preferred embodiments, the zero dispersion wavelength is between 1230 and 1400 nm. In other preferred embodiments, the zero dispersion wavelength is between 1230 and 1340 nm. In still other preferred embodiments, the zero dispersion wavelength is between 1280 and 1340 nm.

Preferably, the optical fiber guides at least one optical mode and a plurality of acoustical modes, including an $L_{01}$ acoustical mode and an $L_{02}$ acoustical mode, wherein the $L_{01}$ acoustical mode has a first acousto-optic effective area, $AOEA_{L01}$, not less than 170 $\mu m^2$ at the Brillouin frequency of the optical fiber, and wherein the $L_{02}$ acoustical mode has a second acousto-optic effective area, $AOEA_{L02}$, not less than 170 $\mu m^2$ at the Brillouin frequency of the optical fiber. Preferably, $0.4 < AOEA_{L01}/AOEA_{L02} < 2.5$.

In preferred embodiments, the optical effective area at 1550 nm is greater than 80 $\mu m^2$ and less than 120 $\mu m^2$.

An optical communication system is disclosed herein comprising a transmitter, a receiver, and an optical transmission line optically connecting the transmitter and receiver, the optical transmission line comprising optical fiber disclosed herein optically connected to a second optical fiber, the second optical fiber having a dispersion at 1550 nm of between −70 and −150 ps/nm-km.

In another group of embodiments, an optical fiber is disclosed herein comprising a length; a core having a refractive index profile and a centerline, the core having a maximum relative refractive, $\Delta_{MAX}$, wherein $\Delta_{MAX}>0.4\%$, and a cladding layer surrounding and directly adjacent the core, wherein the optical fiber has an attenuation at 1550 nm, wherein the refractive index of the core is selected to provide an absolute SBS threshold in dBm greater than about $9.8+10\log[(1-e^{-(0.19)(50)/4.343})/(1-e^{-(\alpha)(L)/4.343})]$, wherein L is the length in km and $\alpha$ is the attenuation in dB/km at 1550 nm. In preferred embodiments, $\Delta_{MAX}$ is located at a radius between 0 and 1 $\mu$m. Preferably, the refractive index of the core is selected to provide an optical effective are at 1550 nm greater than 80 $\mu$m$^2$. In preferred embodiments, the absolute SBS threshold in dBm is greater than about $10.0+10\log[(1-e^{-(0.19)(50)/4.343})/(1-e^{-(\alpha)(L)/4.343})]$. Preferably, the attenuation at 1550 nm is less than 0.23 dB/km, more preferably less than 0.22 dB/km, even more preferably less than 0.21 dB/km, still more preferably less than 0.2 dB/km. In some preferred embodiments, the attenuation at 1550 nm is less than 0.19 dB/km.

In some preferred embodiments, the optical fiber has an attenuation at 1380 $\mu$m not more than 0.3 dB greater than an attenuation at 1310 $\mu$m.

Preferably, the refractive index of the entire core relative to the cladding is greater than 0%.

In some preferred embodiments, substantially all, preferably all, of the core has a relative refractive index having an alpha profile with an alpha <1.

In other preferred embodiments, the core comprises a central region and an outer region surrounding and directly adjacent the central region, wherein the central region comprises $\Delta_{MAX}$.

In still other preferred embodiments, the core comprises a central region having a maximum relative refractive index, $\Delta_{1MAX}$, an intermediate region surrounding and directly adjacent the central region, the intermediate region having a minimum relative refractive index, $\Delta_{2MIN}$, and an outer region surrounding and directly adjacent the intermediate region, the outer region having a maximum relative refractive index, $\Delta_{3MAX}$, wherein $\Delta_{1MAX}>\Delta_{2MIN}$ and $\Delta_{3MAX}>\Delta_{2MIN}$. Preferably, $\Delta_{1MAX}>0$, $\Delta_{3MAX}>0$, and $\Delta_{2MIN}>0$.

In one subset of embodiments, $\Delta_{1MAX}$ is greater than $\Delta_{3MAX}$. In another subset, $\Delta_{1MAX}$ is substantially equal to $\Delta_{3MAX}$. In yet another subset, $\Delta_{1MAX}$ is less than $\Delta_{3MAX}$.

Preferably, $|\Delta_{1MAX}-\Delta_{2MIN}|>0.25\%$, more preferably $\Delta_{1MAX}-\Delta_{2MIN}>0.25\%$. Preferably, $\Delta_{2MIN}<0.4\%$, more preferably $\Delta_{2MIN}$ is between 0.1 and 0.4%. In some preferred embodiments, $\Delta_{2MIN}$ is between 0.1 and 0.3%. In other preferred embodiments, $\Delta_{2MIN}$ is between 0.2 and 0.3%.

Preferably, $|\Delta_{3MAX}-\Delta_{2MIN}|>0.10\%$ more preferably $\Delta_{3MAX}-\Delta_{2MIN}>0.10\%$.

An optical communication system is disclosed herein comprising a transmitter, a receiver, and an optical transmission line optically connecting the transmitter and receiver, the optical transmission line comprising the optical fiber described herein optically connected to a second optical fiber, the second optical fiber having a dispersion at 1550 nm of between −70 and −150 ps/nm-km.

Preferably, the optical fiber guides at least one optical mode and a plurality of acoustical modes, including an $L_{01}$ acoustical mode and an $L_{02}$ acoustical mode, wherein the $L_{01}$ acoustical mode has a first acousto-optic effective area, $AOEA_{L01}$, not less than 170 $\mu$m$^2$ at the Brillouin frequency of the optical fiber, and wherein the $L_{02}$ acoustical mode has a second acousto-optic effective area, $AOEA_{L02}$, not less than 170 $\mu$m$^2$ at the Brillouin frequency of the optical fiber. Preferably, $0.4<AOEA_{L01}/AOEA_{L02}<2.5$.

In preferred embodiments, the optical effective area at 1550 nm is greater than 80 $\mu$m$^2$ and less than 120 $\mu$m$^2$.

The optical fiber preferably has a zero dispersion wavelength (or dispersion zero or $\lambda_0$) less than 1400 nm, more preferably less than 1340 nm. Preferably, the optical fiber has a dispersion of between 15 and 21 ps/nm-km at a wavelength of 1550 nm.

In preferred embodiments, the effective area of the optical mode at 1550 nm is greater than 80 $\mu$m$^2$; the $L_{01}$ acoustical mode has a first acousto-optic effective are $AOEA_{L01}$, not less than 170 $\mu$m$^2$ at the Brillouin frequency of the optical fiber; the $L_{02}$ acoustical mode has a second acousto-optic effective area, $AOEA_{L02}$, not less than 170 $\mu$m$^2$ at the Brillouin frequency of the optical fiber; and $0.4<AOEA_{L01}/AOEA_{L02}<2.5$. Preferably, $AOEA_{L01}$ and $AOEA_{L02}$ are not less than 180 $\mu$m$^2$ at the Brillouin frequency of the optical fiber. More preferably, $AOEA_{L01}$ and $AOEA_{L02}$ are not less than 190 $\mu$m$^2$ at the Brillouin frequency of the optical fiber. Preferably, the attenuation at 1550 nm is less than 0.23 dB/km, more preferably less than 0.22 dB/km, even more preferably less than 0.21 dB/km, still more preferably less than 0.2 dB/km. In some preferred embodiments, the attenuation at 1550 nm is less than 0.19 dB/km.

In preferred embodiments, the optical fiber has a zero dispersion at a wavelength in the range between 1310 and 1340 nm, more preferably between 1320 and 1340 nm. In other preferred embodiments, the optical fiber has a zero dispersion at a wavelength below 1320 nm, more preferably in the range between 1290 and 1320 nm.

In some preferred embodiments, the optical fiber has a dispersion of between 15 and 17 ps/nm-km at a wavelength of 1550 nm. In other preferred embodiments, the optical fiber has a dispersion of between 17 and 20 ps/nm-km at a wavelength of 1550 nm.

In some preferred embodiments, the optical fiber has an optical effective area of greater than 85 $\mu$m$^2$. In other preferred embodiments, the optical fiber has an optical effective area of greater than 95 $\mu$m$^2$. In still other preferred embodiments, the optical fiber has an optical effective area greater than 100 $\mu$m$^2$.

Preferably the optical fiber has pin array bending loss at 1550 nm of less than 15 dB, more preferably less than 10 dB.

Preferably the optical fiber has a lateral load attenuation less than 1 dB/m, more preferably less than 0.7 dB/m.

In preferred embodiments, the core comprises a first portion extending from the centerline to a radius of 1 $\mu$m, the first portion having a relative refractive index greater than 0.25% and less than 0.5%.

Preferably the optical fiber described and disclosed herein allows suitable performance at a plurality of operating wavelength windows between about 1260 nm and about 1650 nm. More preferably, the optical fiber described and disclosed herein allows suitable performance at a plurality of wavelengths from about 1260 nm to about 1650 nm. In a preferred embodiment, the optical fiber described and disclosed herein is a dual window fiber which can accommodate operation in at least the 1310 nm window and the 1550 nm window.

Reference will now be made in detail to the present preferred embodiments of the invention, examples of which are illustrated in the accompanying drawings.

BRIEF DESCRIPTION OF THE DRAWINGS

FIG. 2A–2C shows another refractive index profile corresponding to the second set of preferred embodiments of FIG. 2;

FIGS. 12–15 and 15A–15F show respective refractive index profiles corresponding to a fourth set of preferred embodiments of an optical waveguide fiber as disclosed herein;

DETAILED DESCRIPTION OF THE PREFERRED EMBODIMENT

Figure 1:
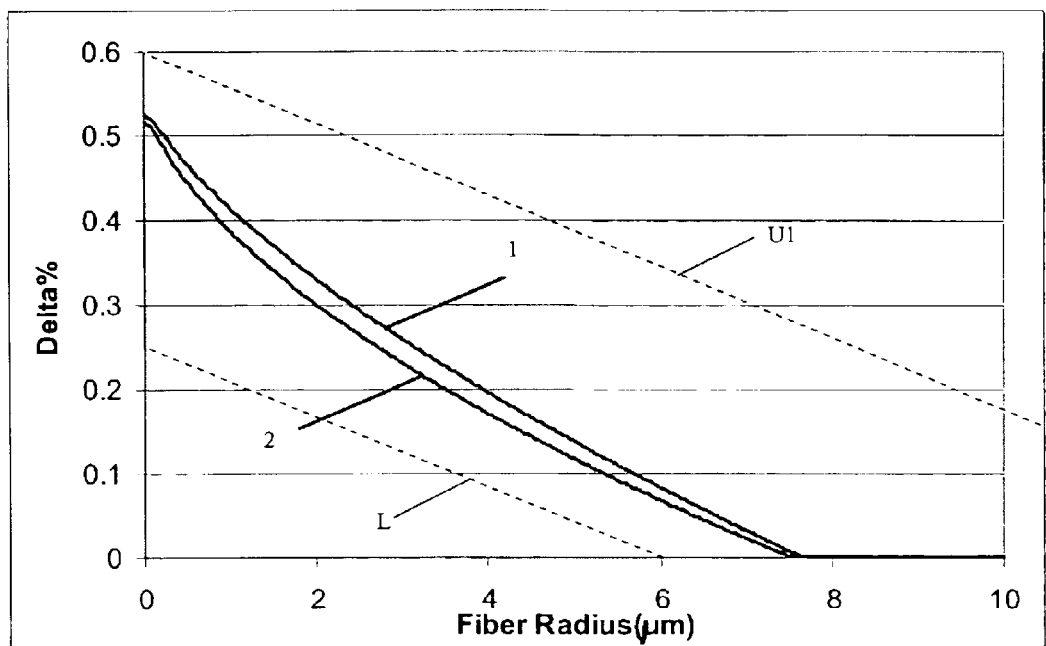
FIG. 1 shows refractive index profiles corresponding to a first set of preferred embodiments of an optical waveguide fiber as disclosed herein.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is the average refractive index of the cladding region. As used herein, the relative refractive index is represented by $\Delta$ and its values are given in units of "%", unless otherwise specified. In cases where the refractive index of a region is less than the average refractive index of the cladding region, the relative index percent is negative and is referred to as having a depressed region or depressed index, and is calculated at the point at which the relative index is most negative unless otherwise specified. In cases where the refractive index of a region is greater than the average refractive index of the cladding region, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Zero dispersion wavelength is a wavelength at which the dispersion has a value of zero. Dispersion slope is the rate of change of dispersion with respect to wavelength.

"Effective area" is defined as:

$$A_{eff} = 2\pi (\int f^2 r\, dr)^2 / (\int f^4 r\, dr),$$

where the integration limits are 0 to $\infty$, and f is the transverse component of the electric field associated with light propagated in the waveguide. As used herein, "effective area" or "$A_{eff}$" refers to optical effective area at a wavelength of 1550 nm unless otherwise noted.

The term "$\alpha$-profile" refers to a relative refractive index profile, expressed in terms of $\Delta(r)$ which is in units of "%", where r is radius, which follows the equation, $$\Delta(r) = \Delta(r_o) \cdot (1 - [|r - r_o|/(r_1 - r_o)]^\alpha),$$

where $r_o$ is the point at which $\Delta(r)$ is maximum, $r_1$ is the point at which $\Delta(r)\%$ is zero, and r is in the range $r_i \leq r \leq r_f$, where $\Delta$ is defined above, $r_i$ is the initial point of the $\alpha$-profile, $r_f$ is the final point of the $\alpha$-profile, and $\alpha$ is an exponent which is a real number.

The mode field diameter (MFD) is measured using the Peterman II method wherein, 2w=MFD, and $w^2 = (2\int f^2 r\, dr/\int [df/dr]^2 r\, dr)$, the integral limits being 0 to $\infty$.

The bend resistance of a waveguide fiber can be gauged by induced attenuation under prescribed test conditions.

One type of bend test is the lateral load microbend test. In this so-called "lateral load" test, a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied to the plates and the increase in attenuation in dB/m is measured. The increase in attenuation is the lateral load attenuation of the waveguide.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39–44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The effective fiber cutoff is lower than the theoretical cutoff due to losses that are induced by bending and/or mechanical pressure. In this context, the cutoff refers to the higher of the LP11 and LP02 modes. LP11 and LP02 are generally not distinguished in measurements, but both are evident as steps in the spectral measurement, i.e. no power is observed in the mode at wavelengths longer than the measured cutoff. The actual fiber cutoff can be measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cabled cutoff" is even lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP's. Cabled cutoff measurement is described in EIA-455-170 Cable Cutoff Wavelength of Single-mode Fiber by Transmitted Power, or "FOTP-170".

Kappa is the ratio of dispersion divided by dispersion slope at a particular wavelength. Unless otherwise noted herein, kappa is reported at a wavelength of 1550 nm.

Unless otherwise noted herein, optical properties (such as dispersion, dispersion slope, etc.) are reported for the LP01 mode.

A waveguide fiber telecommunications link, or simply a link, is made up of a transmitter of light signals, a receiver of light signals, and a length of waveguide fiber or fibers having respective ends optically coupled to the transmitter and receiver to propagate light signals therebetween. The length of waveguide fiber can be made up of a plurality of shorter lengths that are spliced or connected together in end to end series arrangement. A link can include additional optical components such as optical amplifiers, optical attenuators, optical isolators, optical switches, optical filters, or multiplexing or demultiplexing devices. One may denote a group of inter-connected links as a telecommunications system.

A span of optical fiber as used herein includes a length of optical fiber, or a plurality of optical fibers fused together serially, extending between optical devices, for example between two optical amplifiers, or between a multiplexing device and an optical amplifier. A span may comprise one or more sections of optical fiber as disclosed herein, and may further comprise one or more sections of other optical fiber, for example as selected to achieve a desired system performance or parameter such as residual dispersion at the end of a span.

Various wavelength bands, or operating wavelength ranges, or wavelength windows, can be defined as follows: "1310 nm band" is 1260 to 1360 nm; "E-band" is 1360 to 1460 nm; "S-band" is 1460 to 1530 nm; "C-band" is 1530 to 1565 nm; "L-band" is 1565 to 1625 nm; and "U-band" is 1625 to 1675 nm.

When an optical wave propagates in an optical waveguide in which acoustic modes are present, the frequency of the scattered light is determined by phase and wave-vector matching conditions:

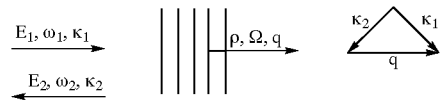

where $E_1$ and $E_2$ are electrical fields of the incident and reflected optical waves, respectively, $\omega_1$ and $\omega_2$ are the respective frequencies, $\kappa_1$ and $\kappa_2$ are the respective optic wave vectors, $\rho$ is material density, $\Omega$ is acoustic frequency, and q is acoustic wave vector.

The phase matching conditions are:

$\omega_1 = \omega_2 + \Omega$ $q = \kappa_1 - \kappa_2$ $|q| = \kappa_1 + \kappa_2 \cong 2\kappa_1$ The Brillouin frequency is:

$\Omega = |q|v$ $\Omega = 2nv\omega_1/c$

The Brillouin frequency for bulk silica is around 11 GHz and v is velocity of sound.

The electric fields that describe 3-dimensional Brillouin scattering are:

Incident field: $\tilde{E}_1(z,t) = f(r)A_1(z,t) \exp[i(k_1 z - \omega_1 t)] + c.c.$ Reflected field: $\tilde{E}_2(z,t) = f(r)A_2(z,t) \exp[i(k_2 z - \omega_2 t)] + c.c.$ where f(r) is the transverse component of the electric field corresponding to the fundamental mode field and $A_1(z,t)$ is the envelope of the electric field. The term "c.c." denotes the complex conjugate of the first term. The material density change can be represented by:

$$\tilde{\rho}(r, \theta, t, z) = \rho_0 + \sum_n a_n f_a^n(r, \theta) \exp[i(q_n z - \Omega_n t)] + c.c.$$

where $q_n$ is the wave number, $\rho_0$ is the mean material density, and $\Omega_n$ is the acoustic frequency of the acoustic mode $L_{0n}$ and where c.c. is the complex conjugate. For the material density change, the sum is over "n" weakly guided acoustic modes, and $f_n^a$ (r) is the acoustic envelope function, and $a_n$ is the modal coefficient for mode "n". The material density obeys the acoustic wave equation represented by:

$$\frac{\partial^2 \tilde{\rho}}{\partial t^2} - \Gamma' \nabla^2 \frac{\partial \tilde{\rho}}{\partial t} - v^2(r) \nabla^2 \tilde{\rho} = \frac{\gamma_e \nabla^2 \langle E^2 \rangle}{8\pi}$$

where $\Gamma'$ is the damping parameter, $\gamma_e$ is the electrostrictive constant and $v$ is the velocity of sound.

The acoustic field is then given by $$\tilde{\rho}(r, t, z) = k\left(\sum_n b_n f_n^a(r)\right) A_1 A_2^* \exp[i(qz - \Omega t)]$$

$$= k \rho_a(r) A_1 A_2^* \exp[i(qz - \Omega t)]$$

where $$b_n = \int \int f^2(r) f_n^a(r) r dr d\phi$$

and $$k = \frac{-i\gamma_e}{8\pi} \frac{q^2}{(i\Gamma - \Omega)\Gamma}$$

where $f_n^a(r)$ is the transverse component of the acoustic mode $L_{0n}$, k is a constant proportional to electrostriction coefficient of the fiber, and $\rho_a(r)$ is the total tranverse component of the acoustic field.

The refractive index change caused by the acoustic field is approximately proportional to the amplitude of the acoustic field: $\Delta n \propto \tilde{\rho}$, and using standard perturbation theory, the change in the propagation constant is $$\Delta \beta = \frac{k_0 \int_0^\infty \Delta n |f(r)|^2 r dr}{\int_0^\infty |f(r)|^2 r dr}$$

$$= \frac{-k_0 n_{2eff}}{A_{eff}^{acoust}} A_1 A_2^* \exp[i(qz - \Omega t)] + c.c$$

The nonlinear and effective Kerr coefficients for this process are:

$$\gamma = \frac{2\pi n_{2eff}}{\lambda A_{eff}^{acoust}} \quad n_{2eff} = \frac{-i\gamma_e^2 q^2}{4(4\pi)^3 \rho_0 n(i\Gamma - \Omega)\Gamma}$$

where the acousto-optic effective area of $L_{0n}$ mode is defined as:

$$A_{eff}^{ac} = \frac{2\pi \left[\int_0^\infty [f(r)]^2 r dr\right]^2}{\int_0^\infty [f(r)]^2 b_n f_n(r) r dr}$$

Values for the acousto-optic effective area are calculated at the Brillouin frequency of the optical fiber.

The optical effective area is:

$$A_{eff}^{optical} = \frac{2\pi \left[\int_0^\infty f^2(r) r dr\right]^2}{\int_0^\infty f^4(r) r dr}$$

These two effective areas have the same numerator, but the denominator of the acousto-optic effective area is a measure of the overlap between the acoustic and optical fields. Since this overlap term is in the denominator, a small overlap leads to a large acousto-optic effective area.

The SBS gain factor is determined by equations similar to those in Raman amplification:

$$\frac{\partial A_1}{\partial z} = i\gamma |A_2|^2 A_1$$

$$\frac{\partial A_2}{\partial z} = -i\gamma^* |A_1|^2 A_2$$

$$P_j = |A_j|^2$$

$$\frac{dP_1}{dZ} = -g P_1 P_2$$

$$\frac{dP_2}{dZ} = -g P_1 P_2$$

$$g = 2 \operatorname{Im}(\gamma) = \frac{k_0 \gamma_e^2 q^2}{2 A_{eff}^{acoust} (4\pi)^3 \rho_0 n \Omega \Gamma}$$

where $k_0$ is the optical wave number, $\gamma_e^2$ is the electrostrictive coefficient, $\rho_0$ is the density, n is the refractive index, $\Omega$ is the Brillouin frequency, and $\Gamma$ is the Brillouin linewidth. The SBS threshold is inversely proportional to the product of the SBS gain factor and the linewidth $\Gamma$, so the SBS gain factor and the linewidth should be as large as possible.

We have designed waveguides with robust optical properties and large acousto-optic effective areas. Measurements of a large number of fabricated optical fibers have verified the connection between acousto-optic effective area and the SBS gain factor given above.

An optical waveguide fiber which is optically single-moded at a particular wavelength may be multi-moded acoustically at the same optical wavelength because the acoustic wavelength corresponding to Brillouin frequency is of the order of 0.55 microns, which is quite small compared to typical optical waveguide fiber dimensions. In the case of spontaneous Brillouin scattering at relatively low launch powers, the incident optical field is Brillouin scattered by each of the acoustic modes and Brillouin gain spectrum shows peaks corresponding to optical field interaction with each of the acoustic modes. At relatively high launch powers, the SBS threshold is exceeded, and one of the acoustic modes typically becomes dominant while the other acoustic modes do not survive the mode competition, leading to the onset of stimulated Brillouin scattering.

As coupling between the optical mode field and the acoustic mode field(s) increases, more optical power is undesirably reflected opposite to the direction of optical signal transmission.

As disclosed herein, the coupling between the optical and acoustical modes is preferably reduced via the refractive index profiles of the optical fiber disclosed herein. Preferably, the optical mode field remains extended while acoustical fields become more tightly confined to reduce overlap between the optical mode field and the acoustical fields.

The optical fiber disclosed herein tends to pull the mode field of the dominant acoustic mode field (typically $L_{01}$) in toward the centerline of the optical fiber, resulting in reduced coupling between the acoustic and optical fields. The optical fiber disclosed herein also preferably tends to pull the mode field of the next dominant acoustic mode field (typically $L_{02}$) in toward the centerline of the optical fiber, resulting in reduced coupling between this next dominant acoustic mode field and the optical field.

Generally, the acoustic field in an optical fiber is more localized (typically much more localized) near the centerline of the fiber compared to the optical field. Accordingly, the behavior of the acoustic field is greatly affected in the central portion of the core of the optical fiber, for example by density variations in the central 2 micron radial region of the optical fiber and consequently within the refractive index profile of the core of the fiber.

We have found that, in order to achieve high SBS threshold optical fiber, the minimum acousto-optic area of the optical fiber should be as large as possible. However, we have also found that the acousto-optic area of the dominant acoustic mode (typically $L_{01}$) and the acousto-optic area of the second most dominant acoustic mode (typically $L_{02}$) generally should be as close to one another in magnitude as possible. Without being limited by any particular theory, the relative closeness in value of the acousto-optic areas of these two modes appears to allow division of the optical-acoustic coupling between the two acoustic modes, thereby reducing coupling overall synergistically in a manner not possible by simply having one acousto-optic area which is very large in magnitude while the other acousto-optic area is much smaller than the very large acousto-optic area. Also, the optical field may couple to more than two acoustic modes, thereby providing additional paths for the dissipation of the reflected signal.

The Brillouin frequency for optical fiber as disclosed herein is preferably between about 10 to 12 GHz.

The optical fiber disclosed herein comprises a core and a cladding layer (or cladding) surrounding and directly adjacent the core. The cladding has a refractive index profile, $\Delta_{CLAD}(r)$. Preferably, $\Delta_{CLAD}(r)=0$ throughout the cladding. The core comprises a refractive index profile, $\Delta_{CORE}(r)$. The core has a maximum relative refractive index, $\Delta_{MAX}$, in %, occurring at a radius $r_{\Delta MAX}$. In preferred embodiments, the core is comprised of a plurality of core portions, each having respective refractive index profiles, for example $\Delta_{CORE1}(r)$, $\Delta_{CORE2}(r)$, and so on. Each core portion may have a maximum relative refractive index for that core portion, i.e. a local maximum, reported in %, for example $\Delta_{1MAX}$ for a first core portion, $\Delta_{2MAX}$ for a second portion, and so on. Likewise, a core portion may have a minimum relative refractive index, such as $\Delta_{2MIN}$, etc. A maximum or minimum relative refractive index may occur at a particular radius, such as $r_{\Delta 1MAX}$ or $r_{\Delta 2MIN}$ and so on. For the embodiments disclosed herein, the core is defined herein to end at a radius $r_{CORE}$.

We have found that a higher dopant concentration at or near the optical fiber centerline, and in particular in a central portion of the core of the optical fiber, forces the acoustic modes to be more tightly confined.

Preferably, the core is comprised of silica doped with germanium, i.e. germania doped silica. Doping of the core, and in particular the central portion of the core, advantageously reduces sound velocity in the optical fiber core relative to its cladding, resulting in total internal reflection of the acoustic field. Dopants other than germanium, singly or in combination, may be employed within the core, and particularly at or near the centerline, of the optical fiber disclosed herein to obtain the desired refractive index and density. Although high refractive index values (or high levels of updopant) tend to bring the acoustical mode field toward the centerline, such values also tend to decrease the optical effective area. In preferred embodiments, the core of the optical fiber disclosed herein has a non-negative refractive index profile, more preferably a positive refractive index profile, wherein the core is surrounded by and directly adjacent to a cladding layer.

Preferably, the refractive index profile of the optical fiber disclosed herein is non-negative from the centerline to the outer radius of the core, $r_{CORE}$. In preferred embodiments, the optical fiber contains no index-decreasing dopants in the core.

In some preferred embodiments, the relative refractive index of the core has values, $\Delta_{CORE}(r)$, which lie between an upper boundary curve and a lower boundary curve. For example, the upper boundary curve (denoted by "U1" in FIGS. 1 and 2) is a straight line defined by at least two points, including a first upper point having a $\Delta$ of 0.6% at a radius of 0 and a second upper point having a $\Delta$ of 0% at a radius of 14.25 $\mu$m, and the lower boundary curve (denoted by "L" in FIGS. 1 and 2) is a straight line defined by at least two points, including a first lower point having a $\Delta$ of 0.25% at a radius of 0 and a second lower point having a $\Delta$ of 0% at a radius of 6 $\mu$m.

The core comprises a first portion extending from the centerline to a radius of about 1 $\mu$m.

In preferred embodiments, $\Delta_{1MAX}>0.4\%$, and preferably, the optical effective area at 1550 nm is greater than 80 $\mu$m$^2$, more preferably between 80 and 120 $\mu$m$^2$, even more preferably between 80 and 110 $\mu$m$^2$. Without being limited by any particular theory, such values of $\Delta_{1MAX}$ appear to enhance localization or "pulling in" of the acoustic modes toward the centerline of the fiber. Additionally, we have found that such values of $\Delta_{1MAX}$ help to reduce microbending losses in the fiber.

1$^{st}$ Set of Preferred Embodiments

Table 1 lists an illustrative first set of preferred embodiments, Examples 1 and 2. FIG. 1 shows the corresponding refractive index profiles of Examples 1–2 in curves 1–2, respectively.

TABLE 1

|  |  | Example: | |
| --- | --- | --- | --- |
|  |  | Ex 1 | Ex 2 |
| Dispersion at 1310 nm | ps/nm-km | −1.81 | −2.17 |
| Dispersion Slope at 1310 nm | ps/nm$^2$-km | 0.094 | 0.094 |
| Dispersion at 1550 nm | ps/nm-km | 16.56 | 16.16 |
| Dispersion Slope at 1550 nm | ps/nm$^2$-km | 0.064 | 0.064 |
| Kappa | nm | 259 | 252 |
| Zero Dispersion Wavelength | nm | 1329 | 1333 |
| Attenuation at 1550 nm | dB/km | 0.1858 | 0.1854 |
| Pin Array Bending at 1550 nm | dB | 9.55 | 26.16 |
| A$_{eff}$ at 1310 nm | $\mu$m$^2$ | 67.6 | 70.2 |
| MFD at 1310 nm | $\mu$m | 9.53 | 9.72 |
| A$_{eff}$ at 1550 nm | $\mu$m$^2$ | 90 | 95.2 |
| MFD at 1550 nm | $\mu$m | 11.0 | 10.36 |
| LP11 cutoff (theoretical) | nm | 1431 | 1331 |
| AOEA$_{L01}$ | $\mu$m$^2$ | 197 | 218 |
| AOEA$_{L02}$ | $\mu$m$^2$ | 233 | 235 |

TABLE 1-continued

|  |  | Example: | |
|---|---|---|---|
|  |  | Ex 1 | Ex 2 |
| Ratio: $AOEA_{L01}/AOEA_{L02}$ |  | 1.18 | 1.08 |
| SBS Threshold (absolute) | dBm | 10.3 | 10.7 |
| SBS Threshold Improvement over SMF-28® optical fiber | dB | 3.5 | 3.9 |
| α |  | 0.67 | 0.57 |
| Δ(r = 0) | % | 0.53 | 0.52 |
| Δ(r = 1) | % | 0.41 | 0.39 |
| Δ(0) − Δ(1) | % | 0.12 | 0.13 |
| $\Delta_{MAX}$ | % | 0.53 | 0.52 |
| $r_{\Delta MAX}$ | μm | 0 | 0 |
| $\Delta_{MAX}$ − Δ(1) | % | 0.12 | 0.13 |
| Δ(r = 2 μm) | % | 0.33 | 0.30 |
| Δ(r = 2.5 μm) | % | 0.29 | 0.26 |
| Δ(r = 3 μm) | % | 0.26 | 0.23 |
| Δ(r = 3.5 μm) | % | 0.23 | 0.20 |
| Δ(r = 4 μm) | % | 0.20 | 0.17 |
| Δ(r = 4.5 μm) | % | 0.17 | 0.14 |
| Δ(r = 5 μm) | % | 0.14 | 0.12 |
| Δ(r = 5.5 μm) | % | 0.11 | 0.09 |
| Δ(r = 6 μm) | % | 0.08 | 0.07 |
| $r_{CORE}$ | μm | 7.6 | 7.4 |

Optical fibers such as those illustrated by Examples 1–2 disclosed herein have an optical mode effective area at 1550 nm which is greater than 90 μm², a first acoustical mode $L_{01}$ having a first acousto-optic effective area, $AOEA_{L01}$, which is not less than 170 μm² at the Brillouin frequency of the fiber; and a second acoustical mode $L_{02}$ having a second acousto-optic effective area, $AOEA_{L02}$, which is not less than 170 μm² at the Brillouin frequency of the fiber, wherein $0.4 < AOEA_{L01}/AOEA_{L02} < 2.5$.

In preferred embodiments, optical fibers such as those illustrated by Examples 1–2 disclosed herein preferably have: a dispersion at 1550 nm of greater than 15 ps/nm-km, more preferably between 15 and 21 ps/nm-km, even more preferably between 15 and 17 ps/nm-km; a dispersion slope at 1550 nm of less than 0.07 ps/nm²-km, more preferably between 0.05 and 0.07 ps/nm²-km; kappa between 230 and 290 nm; dispersion zero wavelength less than 1400 nm, more preferably less than 1340 nm, even more preferably between 1310 and 1340 nm, still more preferably between 1320 and 1340 nm; an optical effective area at 1550 nm greater than 90 μm², more preferably between 90 μm² and 100 μm²; an optical mode field diameter at 1550 nm of greater than 10 μm, preferably between 10 and 11 μm; pin array bend loss at 1550 nm less than 20 dB, more preferably less than 15 dB, even more preferably less than 10 dB; a dispersion at 1310 nm having a magnitude less than 5 ps/nm-km, more preferably less than 3 ps/nm-km; and a dispersion slope at 1310 nm of less than 0.10 ps/nm²-km. Preferably, the attenuation at 1550 nm is less than 0.2 dB/km, more preferably less than 0.195 dB/km, even more preferably less than 0.190 dB/km, and still more preferably less than 0.188 dB/km. Preferably, the core has an alpha-profile with an α<1, more preferably with an α between 0.5 and 1.

2$^{nd}$ Set of Preferred Embodiments

Figure 2:
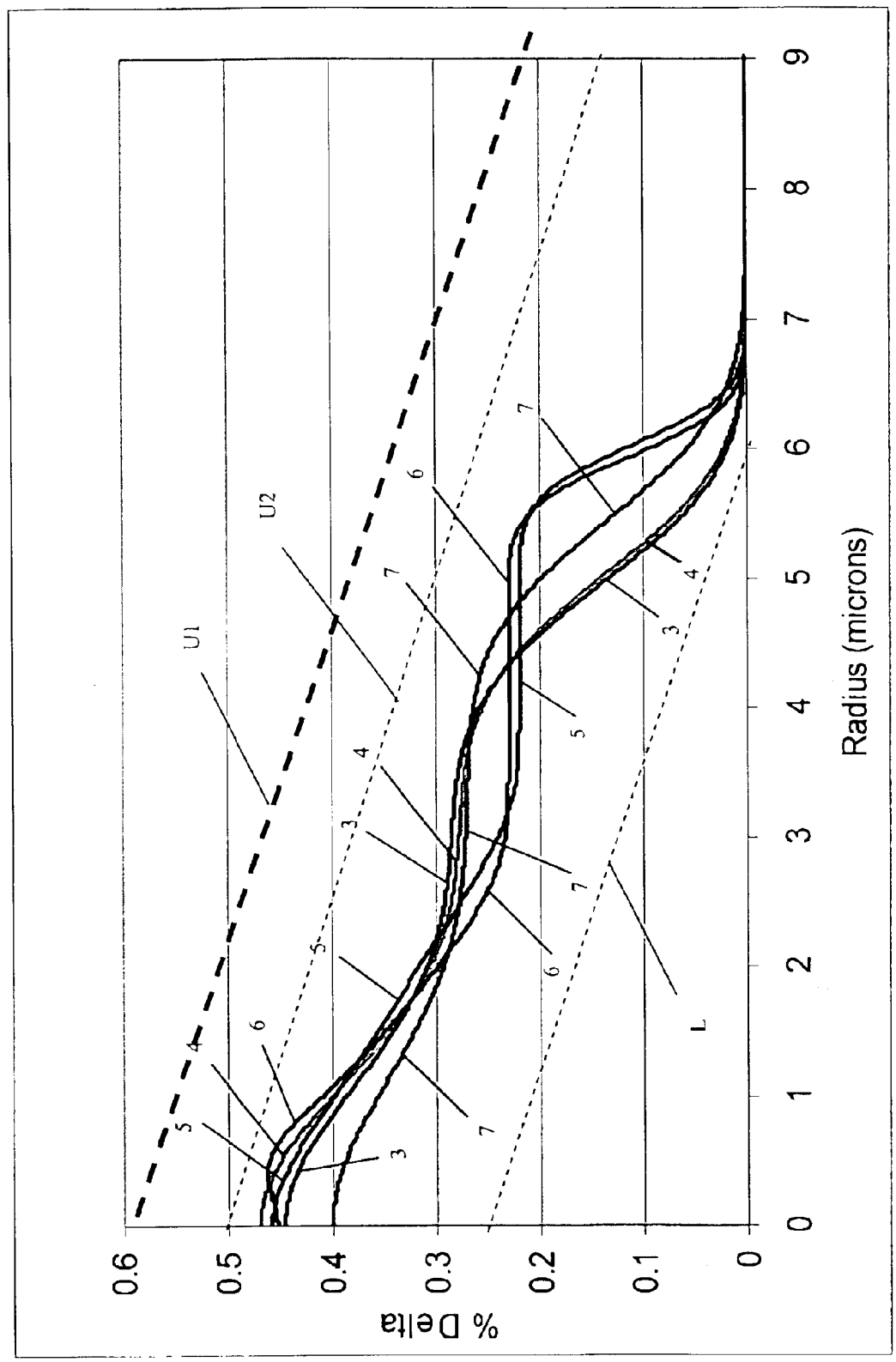
FIG. 2 shows refractive index profiles corresponding to a second set of preferred embodiments of an optical waveguide fiber as disclosed herein.

Tables 2A & 2B list an illustrative second set of preferred embodiments, Examples 3 through 7 and 7A through 7E. FIG. 2 shows the corresponding refractive index profiles of Examples 3 through 7 in curves 3–7, respectively. FIGS. 2A, 2B, and 2C show the corresponding refractive index profiles of Examples 7A, 7B–7C, and 7D–7E, respectively.

TABLE 2A

|  |  | Example: | | | | |
|---|---|---|---|---|---|---|
|  |  | Ex 3 | Ex 4 | Ex 5 | Ex 6 | Ex 7 |
| Dispersion at 1310 nm | ps/nm-km | 0.18 | −0.066 | 0.01 | 0.085 | 1.41 |
| Dispersion at 1550 nm | ps/nm-km | 17.7 | 17.6 | 18.3 | 18.4 | 19.1 |
| Dispersion Slope at 1550 nm | ps/nm²-km | 0.061 | 0.061 | 0.063 | 0.063 | 0.061 |
| Kappa | nm | 290 | 289 | 290 | 292 | 313 |
| MFD1550 | μm | 10.96 | 10.96 | 10.19 | 11.6 | 11.76 |
| Attenuation at 1550 nm | dB/km | 0.1869 | 0.1866 | 0.1855 | 0.1856 | 0.1858 |
| Pin Array at 1550 nm | dB | 8.9 | 8.7 | 7.7 | 8.3 | 9.3 |
| LP11 cutoff (theoretical) | nm | 1406 | 1410 | 1532 | 1528 | 1524 |
| Zero Dispersion Wavelength | nm | 1308 | 1311 | 1310 | 1294 | 1294 |
| $A_{eff}$ at 1550 nm | μm² | 90.6 | 90.4 | 100.8 | 101.8 | 105.7 |
| $AOEA_{L01}$ | μm² | 190 | 204 | 224 | 243 | 218 |
| $AOEA_{L02}$ | μm² | 190 | 181 | 271 | 243 | 214 |
| $AOEA_{MIN}$ | μm² | 190 | 181 | 224 | 243 | 214 |
| SBS Threshold (absolute) | dBm | 10.2 | 9.9 | 10.9 | 11.1 | 10.7 |
| SBS Threshold Improvement over SMF-28® optical fiber | dB | 3.3 | 3.1 | 4.1 | 4.3 | 3.9 |
| Ratio: $AOEA_{L01}/AOEA_{L02}$ |  | 1.00 | 1.13 | 1.21 | 1.00 | 1.019 |
| Δ(r = 0) | % | 0.45 | 0.47 | 0.44 | 0.45 | 0.40 |
| $\Delta_1$(r = 1) | % | 0.39 | 0.40 | 0.41 | 0.41 | 0.36 |
| |Δ(0) − Δ(1)| | % | 0.06 | 0.07 | 0.03 | 0.04 | 0.04 |
| $\Delta_{MAX}$ (=$\Delta_{1MAX}$) | % | 0.45 | 0.47 | 0.45 | 0.46 | 0.40 |
| $r_{\Delta MAX}$(=$r_{\Delta 1MAX}$) | μm | 0 | 0 | 0.5 | 0.4 | 0 |
| $\Delta_{MAX}$ − Δ(1) | % | 0.06 | 0.07 | 0.04 | 0.05 | 0.04 |
| $\Delta_{MAX}$ − Δ(3.5) | % | 0.17 | 0.20 | 0.22 | 0.23 | 0.13 |
| Δ(r = 1.5 μm) | % | 0.34 | 0.34 | 0.36 | 0.35 | 0.32 |
| Δ(r = 2 μm) | % | 0.31 | 0.31 | 0.31 | 0.30 | 0.29 |
| Δ(r = 2.5 μm) | % | 0.29 | 0.29 | 0.26 | 0.26 | 0.28 |

TABLE 2A-continued

|  |  | Ex 3 | Ex 4 | Ex 5 | Ex 6 | Ex 7 |
|---|---|---|---|---|---|---|
| $\Delta(r = 3\ \mu m)$ | % | 0.29 | 0.28 | 0.24 | 0.23 | 0.27 |
| $\Delta(r = 3.5\ \mu m)$ | % | 0.28 | 0.27 | 0.23 | 0.23 | 0.27 |
| $\Delta(r = 4\ \mu m)$ | % | 0.26 | 0.26 | 0.23 | 0.23 | 0.26 |
| $\Delta(r = 4.5\ \mu m)$ | % | 0.21 | 0.21 | 0.23 | 0.23 | 0.25 |
| $\Delta(r = 5\ \mu m)$ | % | 0.13 | 0.14 | 0.23 | 0.23 | 0.20 |
| $\Delta(r = 5.5\ \mu m)$ | % | 0.06 | 0.07 | 0.21 | 0.21 | 0.13 |
| $\Delta(r = 6\ \mu m)$ | % | 0.02 | 0.02 | 0.10 | 0.09 | 0.06 |
| $r_{CORE}$ | $\mu m$ | 6.5 | 6.5 | 6.6 | 6.6 | 6.9 |

TABLE 2B

|  |  | Ex 7A | Ex 7B | Ex 7C | Ex 7D | Ex 7E |
|---|---|---|---|---|---|---|
| Dispersion at 1310 nm | ps/nm-km | −0.21 | 1.12 | 1.88 | 0.12 | −0.70 |
| Dispersion at 1550 nm | ps/nm-km | 18.2 | 19.6 | 20.0 | 18.6 | 17.6 |
| Dispersion Slope at 1550 nm | ps/nm²-km | 0.063 | 0.064 | 0.063 | 0.064 | 0.064 |
| Kappa | nm | 289 | 306 | 317 | 291 | 275 |
| MFD1550 | $\mu m$ | 11.56 | 12.30 | 12.35 | 11.82 | 12.00 |
| Attenuation at 1550 nm | dB/km | 0.185 | 0.184 | 0.185 | 0.185 | 0.185 |
| Pin Array at 1550 nm | dB | 9.2 | 4.2 | 4.1 | 6.8 | 21.0 |
| LP11 cutoff (theoretical) | nm | 1515 | 1746 | 1739 | 1602 | 1468 |
| Zero Dispersion Wavelength | nm | 1312 | 1244 | 1232 | 1260 | 1274 |
| $A_{eff}$ at 1550 nm | $\mu m^2$ | 101.1 | 115.6 | 117.6 | 105.2 | 106.8 |
| $AOEA_{L01}$ | $\mu m^2$ | 264 | 289 | 267 | 379 | 228 |
| $AOEA_{L02}$ | $\mu m^2$ | 221 | 264 | 243 | 163 | 290 |
| $AOEA_{MIN}$ | $\mu m^2$ | 221 | 264 | 243 | 163 | 228 |
| SBS Threshold (absolute) | dBm | 10.2 | 11.8 | 11.5 | 9.7 | 11.2 |
| SBS Threshold Improvement over SMF-28 ® optical fiber | dB | 3.4 | 5 | 4.7 | 2.9 | 4.4 |
| Ratio: $AOEA_{L01}/AOEA_{L02}$ |  | 1.2 | 1.09 | 1.10 | 2.3 | 0.79 |
| $\Delta(r = 0)$ | % | 0.49 | 0.44 | 0.40 | 0.52 | 0.43 |
| $\Delta(r = 0.5)$ | % | 0.465 | 0.43 | 0.39 | 0.52 | 0.39 |
| $\Delta_1(r = 1)$ | % | 0.41 | 0.39 | 0.36 | 0.38 | 0.36 |
| $\|\Delta(0) - \Delta(1)\|$ | % | 0.08 | 0.05 | 0.04 | 0.15 | 0.08 |
| $\Delta_{MAX}$ | % | 0.49 | 0.44 | 0.40 | 0.52 | 0.43 |
| $r_{\Delta MAX}$ | $\mu m$ | 0 | 0 | 0 | 0 | 0 |
| $\Delta_{2MIN}$ | % | 0.25 | 0.27 | 0.28 | 0.29 | 0.27 |
| $r_{\Delta 2MIN}$ | $\mu m$ | 2.5 | 2.5 | 2.5 | 2.5 | 2.5 |
| $\Delta_{MAX} - \Delta(1)$ | % | 0.08 | 0.05 | 0.04 | 0.15 | 0.08 |
| $\Delta(r = 1.5\ \mu m)$ | % | 0.36 | 0.35 | 0.33 | 0.29 | 0.32 |
| $\Delta(r = 2\ \mu m)$ | % | 0.29 | 0.31 | 0.30 | 0.29 | 0.29 |
| $\Delta(r = 2.5\ \mu m)$ | % | 0.25 | 0.27 | 0.28 | 0.29 | 0.27 |
| $\Delta(r = 3\ \mu m)$ | % | 0.24 | 0.25 | 0.26 | 0.28 | 0.24 |
| $\Delta(r = 3.5\ \mu m)$ | % | 0.24 | 0.24 | 0.25 | 0.26 | 0.21 |
| $\Delta(r = 4\ \mu m)$ | % | 0.23 | 0.24 | 0.25 | 0.24 | 0.19 |
| $\Delta(r = 4.5\ \mu m)$ | % | 0.23 | 0.24 | 0.25 | 0.19 | 0.17 |
| $\Delta(r = 5\ \mu m)$ | % | 0.21 | 0.23 | 0.25 | 0.15 | 0.14 |
| $\Delta(r = 5.5\ \mu m)$ | % | 0.16 | 0.23 | 0.23 | 0.15 | 0.12 |
| $\Delta(r = 6\ \mu m)$ | % | 0.10 | 0.20 | 0.20 | 0.15 | 0.10 |
| $\Delta(r = 6.5\ \mu m)$ | % | 0.04 | 0.15 | 0.13 | 0.15 | 0.08 |
| $\Delta(r = 7\ \mu m)$ | % | 0.01 | 0.08 | 0.06 | 0.05 | 0.06 |
| $\Delta(r = 7.5\ \mu m)$ | % | 0.00 | 0.03 | 0.02 | 0.00 | 0.04 |
| $\Delta(r = 8\ \mu m)$ | % | 0.00 | 0.01 | 0.00 | 0.00 | 0.02 |
| $r_{CORE}$ | $\mu m$ | 7.3 | 8.1 | 7.9 | 7.2 | 8.3 |

Optical fibers such as those illustrated by Examples 3–7 and 7A–7E disclosed herein have an optical mode effective area at 1550 nm which is greater than 90 $\mu m^2$, a first acoustical mode $L_{01}$ having a first acousto-optic effective area, $AOEA_{L01}$, which is not less than 170 $\mu m^2$; and a second acoustical mode $L_{02}$ having a second acousto-optic effective area, $AOEA_{L02}$, which is not less than 170 $\mu m^2$, wherein $0.4 < AOEA_{L01}/AOEA_{L02} < 2.5$. In preferred embodiments, $0.5 < AOEA_{L01}/AOEA_{L02} < 2$, more preferably $0.6 < AOEA_{L01}/AOEA_{L02} < 1.5$. Preferably, $\Delta_{CORE}(r)$ lies between an upper boundary curve (denoted by "U2" in FIGS. 1 and 2) which is a straight line defined by at least two points, including a first upper point having $\Delta_{CORE}(r=0)= 0.6\%$ and a second upper point having a $\Delta_{CORE}(r=14.25\ \mu m)=0\%$, more preferably including a first upper point having $\Delta_{CORE}(r=0)=0.5\%$ and a second upper point having a $\Delta_{CORE}(r=11.25\ \mu m)=0\%$ at a radius of 11.25 $\mu m$, and a lower boundary curve (denoted by "L" in FIGS. 1 and 2)

which is a straight line defined by at least two points, including a first lower point having a $\Delta_{CORE}(r=0)=0.25\%$ and a second lower point having a $\Delta_{CORE}(r=6\ \mu m)=0\%$. Preferably, the core comprises a first portion extending from the centerline to a radius of 1 μm, wherein the relative refractive index $\Delta_{CORE1}(r)$ is greater than 0.25% and less than 0.5% (but less than the upper boundary) throughout the first portion. In preferred embodiments, $\Delta_{CORE1}(r)$ is greater than 0.3% and less than 0.5% (but less than the upper boundary) throughout the first portion. Preferably, the core further comprises a second portion surrounding and directly adjacent to the first portion, the second portion extending to a radius of 2.5 μm, wherein $\Delta_{CORE2}(r)$ is between 0.20% and 0.45% (but less than the upper boundary) throughout the second portion. In preferred embodiments, $\Delta_{CORE2}(r)$ is greater than 0.3% and less than 0.45% (but less than the upper boundary) from r=1 to r=1.5 μm, and in preferred embodiments, $\Delta_{CORE2}(r)$ is greater than 0.2% and less than 0.35% for all radii from r=1.5 to r=2.5 μm. Preferably, the core further comprises a third portion surrounding and directly adjacent to the second portion, the third portion extending to a radius of 4.5μm, wherein $\Delta_{CORE3}(r)$ is between 0.15% and 0.35% (but less than the upper boundary) throughout the third portion. In preferred embodiments, $\Delta_{CORE3}(r)$ is between 0.20% and 0.30% throughout the third portion. In preferred embodiments, the absolute magnitude of the difference in $\Delta_{CORE3}(r)$ between any radii in the third portion is less than 0.1%. In preferred embodiments, the average dΔ/dR has an absolute magnitude <0.1%/μm, more preferably <0.5%/nm, between r=2 and r=4 μm. In preferred embodiments, the average dΔ/dR has an absolute magnitude less than 0.1%, more preferably <0.05%/μm between r=2.5 and r=3.5 μm. Preferably ($\Delta_{MAX}$-Δ(3.5))>0.1%, more preferably >0.15%, and even more preferably >0.2%. In preferred embodiments, ($\Delta_{MAX}$-Δ(3.5)) is between about 0.1% and 0.3%. In other preferred embodiments, ($\Delta_{MAX}$-Δ(3.5)) is between about 0.15% and 0.25%. Preferably, the core further comprises a fourth portion surrounding and directly adjacent to the third portion, the fourth portion extending to a radius of 6 μm, wherein $\Delta_{CORE4}(r)$ is between 0.10% and 0.30%, more preferably between 0.2% and 0.3%, (but less than the upper boundary) throughout the fourth portion. In preferred embodiments, $\Delta_{CORE4}(r)$ is between 0.15% and 0.30% (but less than the upper boundary) from r=4.5 to r=5. In preferred embodiments, $\Delta_{CORE4}(r)$ is between 0.15% and 0.30% more preferably between 0.2% and 0.3% (but less than the upper boundary) from r=5 to r=6. Preferably, especially for larger optical effective areas, $\Delta_{CORE}(r=5.5)>0.1\%$, more preferably >0.15%, even more preferably >0.2%. Preferably, $\Delta_{CORE}(r=6)>0.0\%$, more preferably $\Delta_{CORE}(r=6)>0.05\%$, especially for larger optical effective area embodiments. Preferably, the core further comprises a fifth portion surrounding and directly adjacent to the fourth portion, the fifth portion extending to a radius of 9 μm and having $\Delta_{CORE5}(r)$ between 0.0% and 0.2% (but less than the upper boundary), wherein at least part of the fifth portion has $\Delta_{CORE5}(r)>0\%$. In preferred embodiments, $\Delta_{CORE5}(r)$ is between 0.0% and 0.15% in the fifth portion. In preferred embodiments, Δ(r= 5.5 μm)>0.1%. Preferably, Δ(r=6 μm)>0%. Preferably, the outermost radius of the core, $r_{CORE}$, is greater than 6 μm, more preferably greater than 6 μm and less than 15 μm, even more preferably greater than 6 μm and less than 12 μm. In preferred embodiments, $r_{CORE}$ is between 6 μm and 10 μm.

In preferred embodiments, optical fibers such as those illustrated by Examples 3–7 and 7A–7E disclosed herein preferably have: a dispersion at 1550 nm of greater than 15 ps/nm-km, more preferably between 15 and 22 ps/nm-km, even more preferably between 16 and 21 ps/nm-km; a dispersion slope at 1550 nm of less than 0.07 ps/nm²-km, more preferably between 0.05 and 0.07 ps/nm²-km; kappa between 270 and 330 nm; dispersion zero less than 1340 nm, more preferably less than 1320 nm, even more preferably between 1220 and 1320 nm; an optical effective area at 1550 nm greater than 90 μm², more preferably greater than 95 m², even more preferably between 90 μm² and 120 μm²; an optical mode field diameter at 1550 nm of greater than 10 μm, more preferably between 10 and 13 μm, even more preferably between 10 and 12.5 μm; pin array bend loss at 1550 nm less than about 20 dB, more preferably less than 15 dB, even more preferably less than 10 dB; a dispersion at 1310 nm having a magnitude less than 5 ps/nm-km, more preferably less than 3 ps/nm-km; and a dispersion slope at 1310 nm of less than 0.10 ps/nm²-km. Preferably, the attenuation at 1550 nm is less than 0.20 dB/km, more preferably less than 0.19 dB/km, even more preferably less than 0.187 dB/km.

Figure 3:
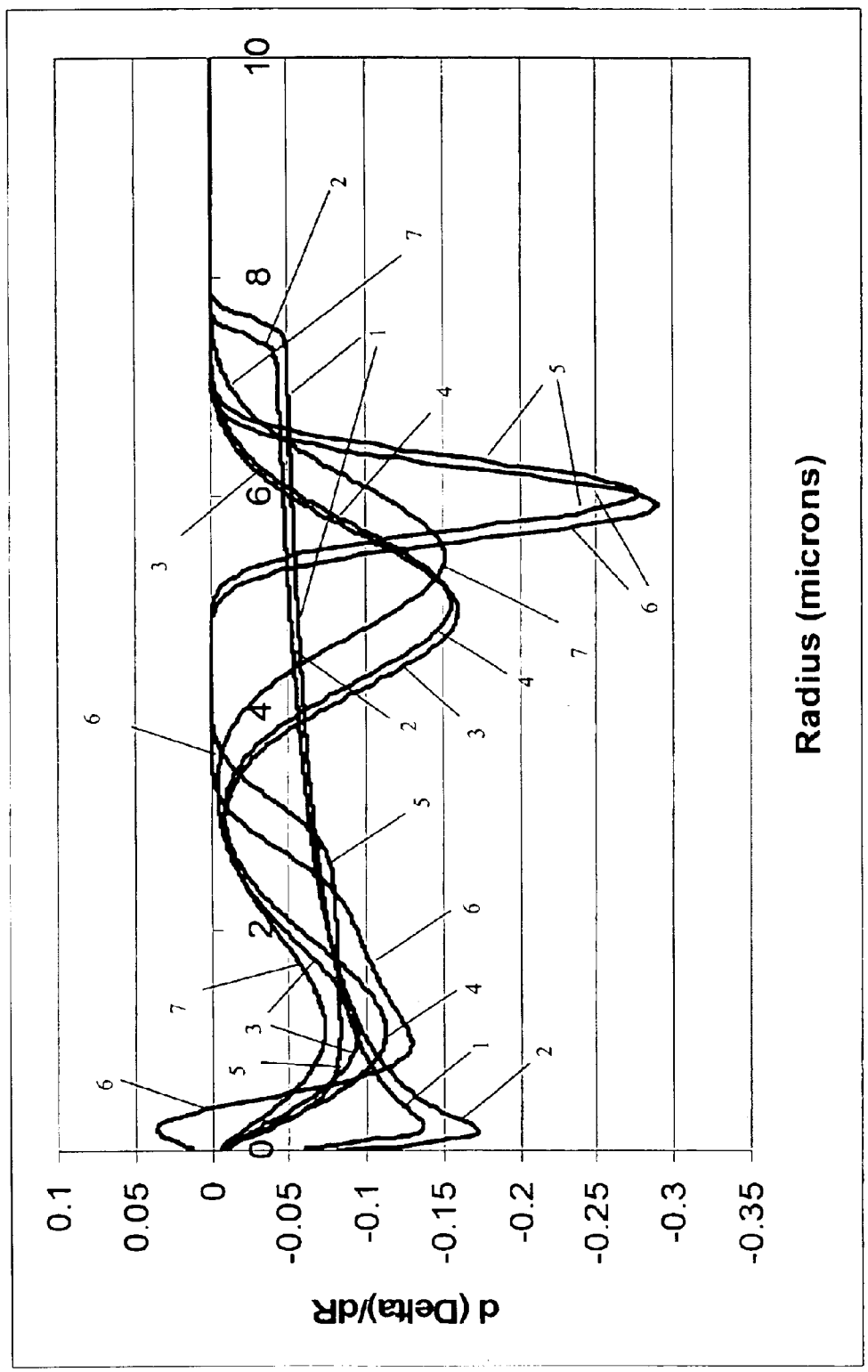
FIG. 3 shows the change in refractive index with respect to radius for the preferred embodiments of FIGS. 1 and 2.

FIG. 3 graphically illustrates the change in refractive index with respect to fiber radius, dΔ/dr for the optical fibers represented by Examples 1–7.

Preferably, the relative refractive index in the first portion of the optical fibers disclosed herein is slowly varying in order to reduce density variations that may adversely affect attenuation and polarization mode dispersion (PMD). Thus, the slope of the relative refractive index profile, dΔ/dr, is preferably greater than −0.20%/μm for all radii in the first portion, even more preferably greater than −0.15%/μm for all radii in the first portion (r=0 to r=1 μm). In some embodiments, the absolute magnitude of the difference between $\Delta_{MAX}$ and $\Delta_{CORE}(r=1\ \mu m)$ is preferably less than 0.2%, more preferably less than 0.15%, and even more preferably less than 0.1%. Preferably, the relative refractive index in the third portion of the core of the optical fibers disclosed herein is relatively flat, i.e. of relatively constant value, in order to improve bending and to minimize the shift of the zero dispersion wavelength away from a wavelength of around 1310 nm. Preferably, the absolute magnitude of the difference in Δ(r) between any radii between r=2.5 and r=4.5 is less than 0.1%. Preferably, the average dΔ/dr has an absolute magnitude <0.1%/μm between r=2 and r=4 μm. Preferably, the average dΔ/dr has an absolute magnitude <0.05%/μm between r=2.5 and r=3.5 μm.

$AOEA_{L01}$ may be greater than $AOEA_{L02}$, or $AOEA_{L02}$ may be greater than $AOEA_{L01}$, or $AOEA_{L01}$ may be substantially equal to $AOEA_{L02}$.

In preferred embodiments, $AOEA_{L01}$ and $AOEA_{L02}$ are both less than 400 μm². In other preferred embodiments, $AOEA_{L01}$ and $AOEA_{L02}$ are both less than 300 μm².

In preferred embodiments, $0.5<AOEA_{L01}/AOEA_{L02}<2$. In other preferred embodiments, $0.6<AOEA_{L01}/AOEA_{L02}<1.5$.

Cladding, or a cladding layer, shown in FIGS. 1 and 2 where $\Delta_{CLAD}=0$, surrounds and is directly adjacent the outer region of the core.

Examples 3 through 7 and 7A–7E can thus be described as having a core comprising an inner region (or central region) and an outer region surrounding and directly adjacent to the inner region. The outer region of the core preferably has a positive refractive index throughout. In preferred embodiments, the presence of the outer region surrounding and directly adjacent the inner region assists in providing desired dispersion values at a desired wavelength or within a desired wavelength range. Preferably, the core comprises a first portion extending from the centerline to a radius of 1 µm, the first portion having a relative refractive index greater than 0.25% and less than 0.6%, more preferably greater than 0.25% and less than about 0.5%. In the first portion, the refractive index preferably smoothly decreases after reaching a maximum value $\Delta_{MAX}=\Delta_{1MAX}$. In some preferred embodiments, the first portion comprises the maximum $\Delta_{CORE}$ for the entire fiber and the relative refractive index profile in the first portion comprises a substantially flat part, and the third portion comprises $\Delta_{3MAX}$ which is less than $\Delta_{MAX}$ and the relative refractive index profile in the third portion comprises a substantially flat part. In some preferred embodiments, a substantial part of the third portion has a substantially flat relative refractive index profile $\Delta_{CORE3}(r)$.

Table 3 lists the characteristics of two sample optical fibers as disclosed herein, Examples 8 & 9, made via an outside vapor deposition (OVD) process.

TABLE 3

|  |  | Example: | |
|---|---|---|---|
|  |  | Ex 8 | Ex 9 |
| Length | km | 24.0 | 24.0 |
| Attenuation at 1310 nm | dB/km | 0.326 | 0.328 |
| Attenuation at 1380 nm | dB/km | 0.319 | 0.320 |
| Attenuation at 1550 nm | dB/km | 0.190 | 0.191 |
| 2 m Fiber Cutoff Wavelength | nm | 1412 | 1379 |
| Cabled Cutoff Wavelength | nm | 1273 | 1246 |
| AOEA$_{L01}$ | µm² | 235 | 235 |
| AOEA$_{L02}$ | µm² | 266 | 266 |
| Ratio: AOEA$_{L01}$/AOEA$_{L02}$ |  | 0.88 | 0.88 |
| A$_{eff}$ at 1550 nm | µm² | 103 | 101 |

TABLE 3-continued

|  |  | Example: | |
|---|---|---|---|
|  |  | Ex 8 | Ex 9 |
| MFD at 1550 nm | µm | 11.52 | 11.4 |
| Zero Dispersion Wavelength | nm | 1310 | 1308 |
| Dispersion at 1310 nm | ps/nm-km | −0.014 | 0.062 |
| Dispersion at 1550 nm | ps/nm-km | 18.0 | 18.1 |
| Dispersion at 1625 nm | ps/nm-km | 22.5 | 22.6 |
| Dispersion Slope at 1550 nm | ps/nm²-km | 0.062 | 0.063 |
| Kappa | nm | 290 | 287 |
| PMD | ps/sqrt(km) | 0.019 | 0.016 |
| Pin Array at 1550 nm | dB | 2.1 | 3.4 |
| Pin Array at 1620 nm | dB | 3.1 | 5.2 |
| 20 mm dia Macrobend | dB/turn | 0.73 | 0.58 |

The relative refractive index profiles of Examples 8–9 were substantially similar to the profile described in Example 5 above and as represented by curve 5 in FIG. 2. An absolute SBS threshold of about 11.9 dBm was obtained for Examples 8 and 9 which were spliced together and measured together as a 48 km length of fiber, which is an SBS threshold improvement of about 5.1 dB over a similar length of SMF-28® or SMF-28e® optical fiber.

3$^{rd}$ Set of Preferred Embodiments

Tables 4A and 4B list an illustrative third set of preferred embodiments, Examples 10 through 15 and Examples 15A through 15D. FIGS. 6–11 show the corresponding refractive index profiles of Examples 10 through 15 in curves 10–15, respectively, and FIGS. 11A–11D show the corresponding refractive index profiles of Examples 15A through 15D in curves 15A–15D, respectively.

TABLE 4A

|  |  | Example: | | | | | |
|---|---|---|---|---|---|---|---|
|  |  | Ex 10 | Ex 11 | Ex 12 | Ex 13 | Ex 14 | Ex 15 |
| Dispersion at 1310 nm | ps/nm-km | −0.74 | −0.54 | −0.38 | −0.39 | −0.25 | −0.049 |
| Dispersion at 1550 nm | ps/nm-km | 17.2 | 16.9 | 17.3 | 17.3 | 17.5 | 17.4 |
| Dispersion at 1625 nm | ps/nm-km | 21.7 | 21.2 | 21.7 | 21.7 | 21.9 | 21.7 |
| Dispersion Slope at 1310 nm | ps/nm²-km | 0.093 | 0.090 | 0.091 | 0.091 | 0.092 | 0.090 |
| Dispersion Slope at 1550 nm | ps/nm²-km | 0.062 | 0.060 | 0.061 | 0.061 | 0.061 | 0.060 |
| Kappa | nm | 277 | 282 | 284 | 284 | 287 | 290 |
| MFD1310 | µm | 9.72 | 9.31 | 9.48 | 9.47 | 9.93 | 9.4 |
| MFD1550 | µm | 11.15 | 10.63 | 10.81 | 10.79 | 11.35 | 10.68 |
| Attenuation at 1550 nm | dB/km | 0.1870 | 0.1884 | 0.1886 | 0.1876 | 0.1863 | 0.1875 |
| Pin Array at 1550 nm | dB | 15.1 | 9.5 | 9.2 | 7.95 | 19.2 | 7.1 |
| LP11 cutoff (theoretical) | nm | 1368 | 1348 | 1381 | 1396 | 1362 | 1390 |
| Cabled Cutoff | nm | 1218 | 1198 | 1231 | 1246 | 1212 | 1240 |
| Zero Dispersion Wavelength | nm | 1318 | 1316 | 1314 | 1314 | 1313 | 1311 |
| A$_{eff}$ at 1310 nm | µm² | 71.5 | 66.0 | 68.6 | 68.2 | 74.9 | 67.7 |
| A$_{eff}$ at 1550 nm | µm² | 93.1 | 84.8 | 88.0 | 87.5 | 96.7 | 86.0 |
| AOEA$_{L01}$ | µm² | 228 | 174 | 191 | 183 | 273 | 181 |
| AOEA$_{L02}$ | µm² | 201 | 189 | 181 | 194 | 186 | 180 |
| AOEA$_{MIN}$ | µm² | 201 | 174 | 181 | 183 | 186 | 180 |
| Ratio: AOEA$_{L01}$/AOEA$_{L02}$ |  | 1.13 | 0.92 | 1.05 | 0.95 | 1.47 | 1.00 |
| SBS Threshold (absolute) | dBm | 9.9 | 9.3 | 9.5 | 9.5 | 9.6 | 9.5 |
| SBS Threshold Improvement over SMF-28 ® optical fiber | dB | 3.1 | 2.5 | 2.7 | 2.7 | 2.8 | 2.7 |
| $\Delta(r=0)$ | % | 0.16 | 0.14 | 0.13 | 0.14 | 0.58 | 0.47 |
| $\Delta_1(r=1)$ | % | 0.40 | 0.43 | 0.44 | 0.43 | 0.37 | 0.40 |

TABLE 4A-continued

|  |  | Ex 10 | Ex 11 | Ex 12 | Ex 13 | Ex 14 | Ex 15 |
|---|---|---|---|---|---|---|---|
| $|\Delta(0) - \Delta(1)|$ | % | 0.24 | 0.29 | 0.31 | 0.29 | 0.21 | 0.07 |
| $\Delta_{MAX}$ (= $\Delta_{1MAX}$) | % | 0.53 | 0.51 | 0.50 | 0.51 | 0.58 | 0.47 |
| $r_{\Delta MAX}$ (= $r_{\Delta 1MAX}$) | $\mu m$ | 0.45 | 0.33 | 0.55 | 0.33 | 0 | 0 |
| $\Delta_{2MIN}$ | % | 0.26 | 0.29 | 0.26 | 0.29 | 0.26 | 0.31 |
| $r_{\Delta 2MIN}$ | $\mu m$ | 2.5 | 2.5 | 2.5 | 2.5 | 2.5 | 2.5 |
| $\Delta_{MAX} - \Delta_{2MIN}$ | % | 0.27 | 0.22 | 0.24 | 0.22 | 0.32 | 0.16 |
| $\Delta_{MAX} - \Delta(3.5)$ | % | 0.30 | 0.24 | 0.24 | 0.24 | 0.35 | 0.18 |
| $\Delta_{MAX} - \Delta(1)$ | % | 0.13 | 0.08 | 0.06 | 0.08 | 0.21 | 0.07 |
| $\Delta(r = 1.5\ \mu m)$ | % | 0.34 | 0.36 | 0.36 | 0.36 | 0.32 | 0.35 |
| $\Delta(r = 2\ \mu m)$ | % | 0.29 | 0.31 | 0.29 | 0.31 | 0.29 | 0.32 |
| $\Delta(r = 2.5\ \mu m)$ | % | 0.26 | 0.29 | 0.26 | 0.29 | 0.26 | 0.31 |
| $\Delta(r = 3\ \mu m)$ | % | 0.23 | 0.28 | 0.26 | 0.28 | 0.23 | 0.30 |
| $\Delta(r = 3.5\ \mu m)$ | % | 0.23 | 0.27 | 0.26 | 0.27 | 0.23 | 0.29 |
| $\Delta(r = 4\ \mu m)$ | % | 0.23 | 0.25 | 0.26 | 0.25 | 0.23 | 0.26 |
| $\Delta(r = 4.5\ \mu m)$ | % | 0.23 | 0.20 | 0.26 | 0.20 | 0.23 | 0.19 |
| $\Delta(r = 5\ \mu m)$ | % | 0.22 | 0.13 | 0.14 | 0.13 | 0.22 | 0.11 |
| $\Delta(r = 5.5\ \mu m)$ | % | 0.01 | 0 | 0 | 0.06 | 0.01 | 0.04 |
| $\Delta(r = 6\ \mu m)$ | % | 0 | 0 | 0 | 0.02 | 0 | 0.01 |
| $r_{CORE}$ | $\mu m$ | 5.6 | 5.4 | 5.4 | 6.8 | 5.6 | 6.6 |

TABLE 4B

|  |  | Ex 15A | Ex 15B | Ex 15C | Ex 15D |
|---|---|---|---|---|---|
| Dispersion at 1310 nm | ps/nm-km | −0.4 | −0.6 | −0.3 | −1.0 |
| Dispersion at 1550 nm | ps/nm-km | 17.1 | 16.8 | 17.2 | 17.0 |
| Dispersion at 1625 nm | ps/nm-km | 21.5 | 21.1 | 21.6 | 21.5 |
| Dispersion Slope at 1310 nm | ps/nm$^2$-km | 0.091 | 0.090 | 0.090 | 0.093 |
| Dispersion Slope at 1550 nm | ps/nm$^2$-km | 0.061 | 0.060 | 0.061 | 0.062 |
| MFD1310 | $\mu m$ | 9.36 | 9.52 | 9.59 | 9.23 |
| MFD1550 | $\mu m$ | 10.67 | 10.92 | 10.96 | 10.55 |
| Attenuation at 1550 nm | dB/km | 0.1843 | 0.1841 | 0.1839 | 0.1837 |
| Pin Array at 1550 nm | dB | 7.5 | 17.4 | 13.2 | 4.6 |
| LP11 cutoff (theoretical) | nm | 1384 | 1313 | 1355 | 1425 |
| Cabled Cutoff | nm | 1234 | 1163 | 1205 | 1275 |
| Zero Dispersion Wavelength | nm | 1315 | 1317 | 1314 | 1321 |
| $A_{eff}$ at 1310 nm | $\mu m^2$ | 66.8 | 68.8 | 70.1 | 64.4 |
| $A_{eff}$ at 1550 nm | $\mu m^2$ | 85.6 | 89.2 | 90.1 | 83.3 |
| $AOEA_{L01}$ | $\mu m^2$ | 239 | 223 | 234 | 232 |
| $AOEA_{L02}$ | $\mu m^2$ | 146 | 167 | 162 | 172 |
| $AOEA_{MIN}$ | $\mu m^2$ | 146 | 167 | 162 | 172 |
| Ratio: $AOEA_{L01}/AOEA_{L02}$ |  | 1.63 | 1.33 | 1.44 | 1.35 |
| SBS Threshold (absolute) | dBm | 10.9 | 10.6 | 10.8 | 10.8 |
| SBS Threshold Improvement over SMF-28 ® optical fiber | dB | 4.1 | 3.8 | 4.0 | 4.0 |
| $\Delta(r = 0)$ | % | 0.55 | 0.49 | 0.50 | 0.67 |
| $\Delta_1(r = 1)$ | % | 0.41 | 0.38 | 0.38 | 0.43 |
| $|\Delta(0) - \Delta(1)|$ | % | 0.14 | 0.11 | 0.12 | 0.24 |
| $\Delta_{MAX}$ (= $\Delta_{1MAX}$) | % | 0.55 | 0.49 | 0.50 | 0.67 |
| $r_{\Delta MAX}$ (= $r_{\Delta 1MAX}$) | $\mu m$ | 0 | 0 | 0 | 0 |
| $\Delta_{2MIN}$ | % | 0.31 | 0.29 | 0.29 | 0.34 |
| $r_{\Delta 2MIN}$ | $\mu m$ | 2.5 | 2.5 | 2.5 | 2.5 |
| $\Delta_{MAX} - \Delta_{2MIN}$ | % | 0.24 | 0.20 | 0.21 | 0.33 |
| $\Delta_{MAX} - \Delta(3.5)$ | % | 0.26 | 0.22 | 0.23 | 0.42 |
| $\Delta_{MAX} - \Delta(1)$ | % | 0.14 | 0.11 | 0.12 | 0.24 |
| $\Delta(r = 1.5\ \mu m)$ | % | 0.34 | 0.32 | 0.32 | 0.38 |
| $\Delta(r = 2\ \mu m)$ | % | 0.31 | 0.29 | 0.29 | 0.34 |
| $\Delta(r = 2.5\ \mu m)$ | % | 0.30 | 0.28 | 0.29 | 0.31 |
| $\Delta(r = 3\ \mu m)$ | % | 0.30 | 0.28 | 0.28 | 0.28 |
| $\Delta(r = 3.5\ \mu m)$ | % | 0.29 | 0.27 | 0.27 | 0.25 |
| $\Delta(r = 4\ \mu m)$ | % | 0.26 | 0.23 | 0.24 | 0.23 |
| $\Delta(r = 4.5\ \mu m)$ | % | 0.19 | 0.16 | 0.18 | 0.22 |
| $\Delta(r = 5\ \mu m)$ | % | 0.11 | 0.09 | 0.11 | 0.22 |
| $\Delta(r = 5.5\ \mu m)$ | % | 0.05 | 0.03 | 0.05 | 0.03 |

TABLE 4B-continued

|  |  | Example: | | | |
| --- | --- | --- | --- | --- | --- |
|  |  | Ex 15A | Ex 15B | Ex 15C | Ex 15D |
| $\Delta(r = 6\,\mu m)$ | % | 0.01 | 0.01 | 0.01 | 0 |
| $r_{CORE}$ | $\mu m$ | 6.3 | 6.2 | 6.3 | 5.7 |

Optical fibers such as those illustrated by Examples 10–15 and 15A–15D disclosed herein have an optical mode effective area at 1550 nm which is greater than about 80 $\mu m^2$, a first acoustical mode $L_{01}$ having a first acousto-optic effective area, $AOEA_{L01}$, which is not less than 170 $\mu m^2$; and a second acoustical mode $L_{02}$ having a second acousto-optic effective area, $AOEA_{L02}$, which is not less than 170 $\mu m^2$, wherein $0.4 < AOEA_{L01}/AOEA_{L02} < 2.5$. Preferably, the optical mode effective area at 1550 nm is greater than about 85 $\mu m^2$, even more preferably between about 85 and 110 $\mu m^2$. In some preferred embodiments, the optical mode effective area at 1550 nm is between about 85 and 100 $\mu m^2$. In some preferred embodiments, such as in FIGS. 10–13, the core may comprise a refractive index profile having a so-called centerline dip. The centerline dip may occur as a result of one or more methods of manufacturing optical fiber. Preferably, the core comprises a first portion extending from the centerline to a radius of 1 $\mu m$ and preferably having a maximum relative refractive index $\Delta_{MAX} = \Delta_{1MAX}$ (in percent) less than 0.7%, more preferably less than 0.6%, occurring at a radius $r_{\Delta MAX}$, which may be at the centerline or spaced therefrom. The relative refractive index $\Delta_{CORE1}(r)$ is preferably greater than 0.25% and less than 0.7% for all radii between $r_{\Delta MAX}$ and r=1 $\mu m$. In preferred embodiments, $\Delta_{CORE1}(r)$ is greater than 0.3% and less than 0.6% for all radii between $r_{\Delta MAX}$ and r=1 $\mu m$. Preferably, the core further comprises a second portion surrounding and directly adjacent to the first portion, the second portion extending to a radius of 2.5 $\mu m$, wherein $\Delta_{CORE2}(r)$ is between 0.15% and 0.5%, more preferably between 0.15% and 0.45%, throughout the second portion. In preferred embodiments, $\Delta_{CORE2}(r)$ is greater than 0.3% and less than 0.45% from r=1 to r=1.5 $\mu m$, and in preferred embodiments, $\Delta_{CORE2}(r)$ is greater than about 0.2% and less than 0.35% from r=1.5 to r=2.5 $\mu m$. Preferably, the core further comprises a third portion surrounding and directly adjacent to the second portion, the third portion extending to a radius of 4.5 $\mu m$, wherein $\Delta_{CORE3}(r)$ is between 0.15% and 0.35% throughout the third portion. In preferred embodiments, $\Delta_{CORE3}(r)$ is between 0.20% and 0.30% throughout the third portion. At r=4 $\mu m$, preferably $\Delta_{CORE3} > 0.2\%$. Preferably, $\Delta_{CORE3}(r)$ is between 0.15% and 0.35%, more preferably between 0.15% and 0.3%, throughout the third portion. In preferred embodiments, the absolute magnitude of the difference in $\Delta_{CORE3}(r)$ between any radii in the third portion is less than 0.1%. In other preferred embodiments, the absolute magnitude of the difference in $\Delta_{CORE3}(r)$ between any radii in the third portion is less than 0.05%. In preferred embodiments, the average $d\Delta/dR$ has an absolute magnitude $<0.1\%/\mu m$ between r=2 and r=4 $\mu m$. In preferred embodiments, the average $d\Delta/dR$ has an absolute magnitude $<0.05\%/\mu m$ between r=2.5 and r=3.5 $\mu m$. Preferably $(\Delta_{MAX}-\Delta(3.5)) > 0.1\%$, more preferably $>0.15\%$, even more preferably $>0.2\%$. In preferred embodiments, $(\Delta_{MAX}-\Delta(3.5))$ is between 0.10%–0.5%. In other preferred embodiments, $(\Delta_{MAX}-\Delta(3.5))$ is between 0.15%–0.4%. In other preferred embodiments, $(\Delta_{MAX}-\Delta(3.5))$ is between 0.2%–0.4%.

Preferably, the core further comprises a fourth portion surrounding and directly adjacent to the third portion, the fourth portion extending to a radius of between 5 and 12 $\mu m$, more preferably between 5 and 10 $\mu m$, wherein $\Delta_{CORE4}(r)$ is between 0 and 0.30% throughout the fourth portion. In preferred embodiments, $\Delta_{CORE4}(r)$ for increasing radii in the fourth portion decreases from a maximum positive relative refractive index of less than or equal to 0.30% to a minimum of between 0 and 0.03%. Preferably, the cladding surrounds and is directly adjacent to the fourth portion. Preferably, the core ends and the cladding layer begins at $r_{CORE} > 5\,\mu m$, more preferably between 5 and 12 $\mu m$, and even more preferably between 5 and 10 $\mu m$.

In preferred embodiments, optical fibers such as those illustrated by Examples 10–15 and 15A–15D disclosed herein preferably have: a dispersion at 1550 nm of greater than 15 ps/nm-km, more preferably between 15 and 22 ps/nm-km, even more preferably between 16 and 21 ps/nm-km; a dispersion slope at 1550 nm of less than 0.07 ps/nm²-km, more preferably between 0.05 and 0.07 ps/nm²-km; kappa between 250 and 300 nm; dispersion zero less than 1340 nm, more preferably less than 1320 nm, even more preferably between 1290 and 1320 nm; an optical effective area at 1550 nm greater than 80 $\mu m^2$, more preferably greater than 85 $\mu m^2$, even more preferably between 85 $\mu m^2$ and 110 $\mu m^2$; an optical mode field diameter at 1550 nm of greater than 10 $\mu m$, more preferably between 10 and 13 $\mu m$, even more preferably between 10 and 12 $\mu m$; pin array bend loss at 1550 nm less than 20 dB, more preferably less than 15 dB, even more preferably less than 10 dB; a dispersion at 1310 nm having a magnitude less than 5 ps/nm-km, more preferably less than 3 ps/nm-km; and a dispersion slope at 1310 nm of less than 0.10 ps/nm²-km. Preferably, the attenuation at 1550 nm is less than 0.2 dB/km, more preferably less than 0.195 dB/km, even more preferably less than 0.190 dB/km, and still more preferably less than 0.185 dB/km.

Preferably, the relative refractive index in the third portion of the core of the optical fibers disclosed herein is relatively flat, i.e. of relatively constant value, in order to improve bending and to minimize the shift of the zero dispersion wavelength away from a wavelength of around 1310 nm. Preferably, the absolute magnitude of the difference in $\Delta(r)$ between any radii between r=2.5 and r=4.5 is less than 0.1%. Preferably, the average $d\Delta/dr$ has an absolute magnitude $<0.1\%/\mu m$ for a radial distance of at least 0.5 $\mu m$ and located between r=2 and r=4 $\mu m$. Preferably, $d\Delta/dr$ has an absolute magnitude $<0.05\%/\mu m$ occurring between r=2.5 and r=3.5 $\mu m$.

$AOEA_{L01}$ may be greater than $AOEA_{L02}$, or $AOEA_{L02}$ may be greater than $AOEA_{L01}$, or $AOEA_{L01}$ may be substantially equal to $AOEA_{L02}$.

In preferred embodiments, $AOEA_{L01}$ and $AOEA_{L02}$ are both less than 400 $\mu m^2$. In other preferred embodiments, $AOEA_{L01}$ and $AOEA_{L02}$ are both less than 300 $\mu m^2$.

In preferred embodiments, $0.5 < AOEA_{L01}/AOEA_{L02} < 2$. In other preferred embodiments, $0.6 < AOEA_{L01}/AOEA_{L02} < 1.5$.

Cladding, or a cladding layer, shown in FIGS. 6–11 where $\Delta_{CLAD}=0$, surrounds and is directly adjacent the outer region of the core at $r_{CORE}$.

Examples 10 through 15 and 15A through 15D can thus be described as having a core comprising an inner region (or central region) and an outer region surrounding and directly adjacent to the inner region. The outer region of the core preferably has a positive refractive index. In preferred embodiments, the presence of the outer region surrounding and directly adjacent the inner region assists in providing desired dispersion values at a desired wavelength or within a desired wavelength range. Preferably, the core comprises a first portion extending from the centerline to a radius of 1 μm, the first portion having a maximum relative refractive index greater than 0.25% and less than 0.7%. Curves 10–13 illustrated in FIGS. 10–13 show a so-called "centerline dip" that may occur as a result of one or more optical fiber manufacturing techniques. The centerline dip is shown as having a minimum relative refractive index between 0.1% and 0.3%, although the centerline dip may assume other values which are less than the maximum relative refractive index. In the first portion, the refractive index preferably smoothly decreases after reaching a maximum value $\Delta_{MAX}$. Preferably, the first portion comprises the maximum $\Delta_{CORE}$ for the entire fiber. Preferably, the third portion comprises $\Delta_{3MAX}$ which is less than $\Delta_{MAX}$ (and less than $\Delta_{1MAX}$) and the relative refractive index profile in the third portion comprises a substantially flat part. More preferably, a substantial part of the third portion (e.g. a radial width of greater than 1 μm) has a substantially flat relative refractive index profile $\Delta_{CORE3}(r)$.

$4^{th}$ Set of Preferred Embodiments

Tables 5A and 5B lists an illustrative fourth set of preferred embodiments, Examples 16 through 20 and 20C through 20F. FIGS. 12–15 show the corresponding refractive index profiles of Examples 16–20 in curves 16–20, respectively. FIGS. 15A–15F show the corresponding refractive index profiles of Examples 20A–20F in curves 20A–20F, respectively.

TABLE 5A

| | | Example: | | | | |
|---|---|---|---|---|---|---|
| | | Ex 16 | Ex 17 | Ex 18 | Ex 19 | Ex 20 |
| Dispersion at 1310 nm | ps/nm-km | 0.04 | −0.32 | −0.44 | 0.14 | −0.28 |
| Dispersion at 1550 nm | ps/nm-km | 17.4 | 16.9 | 17.2 | 17.5 | 17.3 |
| Dispersion at 1625 nm | ps/nm-km | 21.7 | 21.2 | 21.5 | 21.8 | 21.6 |
| Dispersion Slope at 1310 nm | ps/nm²-km | 0.090 | 0.089 | 0.091 | 0.090 | 0.091 |
| Dispersion Slope at 1550 nm | ps/nm²-km | 0.060 | 0.059 | 0.0605 | 0.060 | 0.060 |
| Kappa | nm | 290 | 286 | 284 | 292 | 288 |
| MFD1310 | μm | 9.49 | 9.34 | 9.415 | 9.57 | 9.52 |
| MFD1550 | μm | 10.77 | 10.66 | 10.73 | 10.86 | 10.85 |
| Attenuation at 1550 nm | dB/km | 0.193 | 0.194 | 0.194 | 0.1925 | 0.193 |
| Pin Array at 1550 nm | dB | 10.4 | 12.4 | 10.2 | 11.9 | 12.1 |
| LP11 cutoff (theoretical) | nm | 1369 | 1330 | 1369 | 1367 | 1366 |
| Cabled cutoff | nm | 1219 | 1200 | 1219 | 1217 | 1216 |
| Zero Dispersion Wavelength | nm | 1310 | 1316 | 1314 | 1308 | 1313 |
| $A_{eff}$ at 1310 nm | μm² | 70.9 | 68.4 | 69.7 | 72.4 | 71.7 |
| $A_{eff}$ at 1550 nm | μm² | 89.2 | 86.8 | 88.5 | 90.9 | 90.7 |
| $AOEA_{L01}$ | μm² | 232 | 225 | 239 | 298 | 315 |
| $AOEA_{L02}$ | μm² | 236 | 219 | 254 | 224 | 243 |
| $AOEA_{MIN}$ | μm² | 232 | 219 | 239 | 224 | 243 |
| Ratio: $AOEA_{L01}/AOEA_{L02}$ | | 0.98 | 1.03 | 0.94 | 1.33 | 1.30 |
| SBS Threshold (absolute) | dBm | 10.6 | 10.3 | 10.7 | 10.4 | 10.8 |
| SBS Threshold Improvement over SMF-28 ® optical fiber | dB | 3.8 | 3.51 | 3.9 | 3.6 | 4.0 |
| $\Delta(r = 0)$ | % | 0.14 | 0.14 | 0.14 | 0.58 | 0.62 |
| $\Delta_1(r = 1)$ | % | 0.44 | 0.44 | 0.47 | 0.41 | 0.43 |
| $\Delta(0) - \Delta(1)$ | % | −0.31 | −0.30 | −0.33 | 0.17 | 0.19 |
| $\Delta_{MAX} (= \Delta_{1MAX})$ | % | 0.53 | 0.54 | 0.57 | 0.58 | 0.62 |
| $r_{\Delta MAX} (= r_{\Delta 1MAX})$ | μm | 0.53 | 0.55 | 0.53 | 0.00 | 0.00 |
| $\Delta_{MAX} - \Delta(1)$ | % | 0.09 | 0.10 | 0.10 | 0.17 | 0.19 |
| $\Delta_{2MIN}$ | % | 0.22 | 0.22 | 0.20 | 0.22 | 0.20 |
| $r_{\Delta 2MIN}$ | μm | 2.5 | 2.5 | 2.5 | 2.5 | 2.5 |
| $\Delta_{3MAX}$ | % | 0.36 | 0.36 | 0.37 | 0.36 | 0.37 |
| $\Delta_{1MAX} - \Delta_{2MIN}$ | % | 0.31 | 0.32 | 0.37 | 0.36 | 0.42 |
| $\Delta_{3MAX} - \Delta_{2MIN}$ | % | 0.14 | 0.14 | 0.17 | 0.14 | 0.17 |
| $|\Delta_{1MAX} - \Delta_{3MAX}|$ | % | 0.17 | 0.18 | 0.20 | 0.22 | 0.25 |
| $\Delta(r = 1.5 \mu m)$ | % | 0.34 | 0.33 | 0.34 | 0.32 | 0.32 |
| $\Delta(r = 2 \mu m)$ | % | 0.24 | 0.23 | 0.23 | 0.24 | 0.22 |
| $\Delta(r = 2.5 \mu m)$ | % | 0.22 | 0.22 | 0.20 | 0.22 | 0.20 |
| $\Delta(r = 3 \mu m)$ | % | 0.25 | 0.31 | 0.23 | 0.25 | 0.23 |
| $\Delta(r = 3.5 \mu m)$ | % | 0.36 | 0.36 | 0.37 | 0.36 | 0.37 |
| $\Delta(r = 4 \mu m)$ | % | 0.36 | 0.36 | 0.37 | 0.36 | 0.37 |
| $\Delta(r = 4.5 \mu m)$ | % | 0.24 | 0.10 | 0.25 | 0.24 | 0.25 |

TABLE 5A-continued

|  |  | Ex 16 | Ex 17 | Ex 18 | Ex 19 | Ex 20 |
|---|---|---|---|---|---|---|
| $\Delta(r = 5\ \mu m)$ | % | 0 | 0 | 0 | 0 | 0 |
| $\Delta(r = 5.5\ \mu m)$ | % | 0 | 0 | 0 | 0 | 0 |
| $\Delta(r = 6\ \mu m)$ | % | 0 | 0 | 0 | 0 | 0 |
| $r_{CORE}$ | $\mu m$ | 4.9 | 4.9 | 4.9 | 4.9 | 4.9 |

TABLE 5B

|  |  | Ex 20C | Ex 20D | Ex 20E | Ex 20F |
|---|---|---|---|---|---|
| Dispersion at 1310 nm | ps/nm-km | −0.51 | −0.33 | −0.48 | −0.20 |
| Dispersion at 1550 nm | ps/nm-km | 16.6 | 16.7 | 16.5 | 16.7 |
| Dispersion at 1625 nm | ps/nm-km | 20.9 | 20.9 | 20.7 | 20.9 |
| Dispersion Slope at 1310 nm | ps/nm²-km | 0.089 | 0.088 | 0.088 | 0.088 |
| Dispersion Slope at 1550 nm | ps/nm²-km | 0.059 | 0.059 | 0.059 | 0.058 |
| Kappa | nm | 281 | 283 | 280 | 288 |
| MFD1310 | $\mu m$ | 9.06 | 9.04 | 9.03 | 9.07 |
| MFD1550 | $\mu m$ | 10.33 | 10.29 | 10.30 | 10.32 |
| Attenuation at 1550 nm | dB/km | 0.196 | 0.197 | 0.198 | 0.198 |
| Pin Array at 1550 nm | dB | 8.5 | 7.9 | 9.3 | 8.8 |
| LP11 cutoff (theoretical) | nm | 1330 | 1330 | 1320 | 1327 |
| Cabled cutoff | nm | 1210 | 1210 | 1199 | 1207 |
| Zero Dispersion Wavelength | nm | 1319 | 1317 | 1318 | 1315 |
| $A_{eff}$ at 1310 nm | $\mu m^2$ | 64.7 | 64.4 | 65.0 | 65.7 |
| $A_{eff}$ at 1550 nm | $\mu m^2$ | 81.9 | 81.2 | 81.9 | 82.3 |
| $AOEA_{L01}$ | $\mu m^2$ | 242 | 203 | 271 | 260 |
| $AOEA_{L02}$ | $\mu m^2$ | 245 | 259 | 232 | 235 |
| $AOEA_{MIN}$ | $\mu m^2$ | 242 | 203 | 232 | 235 |
| Ratio: $AOEA_{L01}/AOEA_{L02}$ |  | 0.99 | 0.78 | 1.17 | 1.10 |
| SBS Threshold (absolute) | dBm | 11.0 | 10.0 | 11.4 | 11.2 |
| SBS Threshold Improvement over SMF-28® optical fiber | dB | 4.2 | 3.2 | 4.6 | 4.4 |
| $\Delta(r = 0)$ | % | 0.44 | 0.16 | 0.59 | 0.56 |
| $\Delta_1(r = 1)$ | % | 0.43 | 0.43 | 0.41 | 0.40 |
| $\Delta(0) - \Delta(1)$ | % | 0.02 | −0.28 | 0.18 | 0.16 |
| $\Delta_{MAX} = \Delta_{1MAX}$ | % | 0.57 | 0.56 | 0.60 | 0.57 |
| $r_{\Delta MAX} = r_{\Delta 1MAX}$ | $\mu m$ | 0.4 | 0.5 | 0.2 | 0.2 |
| $\Delta_{2MIN}$ | % | 0.24 | 0.26 | 0.23 | 0.24 |
| $r_{\Delta 2MIN}$ | $\mu m$ | 2.5 | 2.5 | 2.5 | 2.5 |
| $\Delta_{MAX} - \Delta(1)$ | % | 0.14 | 0.13 | 0.19 | 0.17 |
| $\Delta_{3MAX}$ | % | 0.48 | 0.50 | 0.50 | 0.50 |
| $r_{\Delta 3MAX}$ | $\mu m$ | 3.65 | 3.7 | 3.45 | 3.55 |
| $\Delta_{1MAX} - \Delta_{2MIN}$ | % | 0.33 | 0.30 | 0.37 | 0.33 |
| $\Delta_{3MAX} - \Delta_{2MIN}$ | % | 0.24 | 0.24 | 0.27 | 0.26 |
| $|\Delta_{1MAX} - \Delta_{3MAX}|$ | % | 0.09 | 0.06 | 0.10 | 0.07 |
| $\Delta(r = 1.5\ \mu m)$ | % | 0.33 | 0.34 | 0.32 | 0.32 |
| $\Delta(r = 2\ \mu m)$ | % | 0.26 | 0.27 | 0.25 | 0.26 |
| $\Delta(r = 2.5\ \mu m)$ | % | 0.24 | 0.26 | 0.23 | 0.24 |
| $\Delta(r = 3\ \mu m)$ | % | 0.27 | 0.26 | 0.33 | 0.33 |
| $\Delta(r = 3.5\ \mu m)$ | % | 0.47 | 0.48 | 0.50 | 0.50 |
| $\Delta(r = 4\ \mu m)$ | % | 0.38 | 0.39 | 0.29 | 0.29 |
| $\Delta(r = 4.5\ \mu m)$ | % | 0.01 | 0.00 | 0.00 | 0.00 |
| $\Delta(r = 5\ \mu m)$ | % | 0.00 | 0.00 | 0.00 | 0.00 |
| $\Delta(r = 5.5\ \mu m)$ | % | 0.00 | 0.00 | 0.00 | 0.00 |
| $\Delta(r = 6\ \mu m)$ | % | 0.00 | 0.00 | 0.00 | 0.00 |
| $r_{CORE}$ | $\mu m$ | 4.55 | 4.45 | 4.45 | 4.45 |

Another preferred embodiment in the fourth set of preferred embodiments is illustrated in FIG. 15A which shows the refractive index profile of Example 20A in curve 20A, the optical fiber having the following characteristics: dispersion at 1310 nm of 2.06 ps/nm-km, dispersion at 1550 nm of 19.7 ps/nm-km, dispersion slope at 1550 nm of 0.061 ps/nm²-km, kappa of 323 nm, mode field diameter at 1550 nm (MFD1550) of $\mu m$, attenuation at 1550 nm of 0.193 dB/km, pin array at 1550 nm of 7.2 dB, LP11 cutoff (theoretical) of 1578 nm, zero dispersion wavelength of 1287 nm, $A_{eff}$ at 1550 nm of 111.9 $\mu m^2$, $AOEA_{L01}$ of 3.75 $\mu m^2$, $AOEA_{L02}$ of 349 $\mu m^2$, $AOEA_{MIN}$ of 349 $\mu m^2$, ratio $AOEA_{L01}/AOEA_{L02}$ of 1.07, relative refractive index difference Δ of 0.50, 0.43, 0.36, 0.30, 0.25, 0.22, 0.22, 0.22, 0.35, 0.37, 0.37, 0.04, 0, and 0% at radii of 0, 0.5, 1, 1.5, 2, 2.5, 3, 3.5, 4, 4.5, 5, 5.5, 6, and 6.5, respectively, $\Delta_{MAX}-\Delta$ (r=1) of 0.14%, $\Delta_{MAX}$ of 0.50%, $r_{\Delta MAX}$ of 0 μm, and $r_{CORE}$ of 5.7 μm.

Another preferred embodiment in the fourth set of preferred embodiments is illustrated in FIG. 15B which shows the refractive index profile of Example 20B in curve 20B, the optical fiber having the following characteristics: dispersion at 1310 nm of –0.64 ps/nm-km, dispersion slope at 1310 nm of 0.0889 ps/nm²-km, dispersion at 1550 nm of 16.6 ps/nm-km, dispersion slope at 1550 nm of 0.0596 ps/nm²-km, kappa of 279 nm, dispersion at 1625 nm of 20.9 ps/nm-km, mode field diameter at 1550 nm (MFD 1550) of 10.65 μm, cabled cutoff of 1196 μm, attenuation at 1380 nm of 0.293 dB/km, attenuation at 1550 nm of 0.191 dB/km, pin array at 1550 nm of 11.4 dB, lateral load attenuation at 1550 nm of 0.73 dB, LP11 cutoff (theoretical) of 1333 nm, zero dispersion wavelength of 1317 nm, $A_{eff}$ at 1550 nm of 86.8 μm², $AOEA_{L01}$ of 216 μm², $AOEA_{L02}$ of 200 μm², $AOEA_{MIN}$ of 200 μm², ratio $AOEA_{L01}/AOEA_{L02}$ of 1.08, relative refractive index difference $\Delta$ of 0.40, 0.54, 0.45, 0.32, 0.23, 0.23, 0.36, 0.38, 0.30, 0.06, 0.03, 0.02, 0.01, 0.01, 0.01, 0.01 and 0.01% at radii of 0, 0.5, 1, 1.5, 2, 2.5, 3, 3.5, 4, 4.5, 5, 5.5, 6, 6.5, 7, 7.5, and 8 μm, respectively, $\Delta_{MAX}-\Delta$(r=1) of 0.09%, $\Delta_{MAX}$ of 0.54%, $r_{\Delta MAX}$ of 0.43 μm, and $r_{CORE}$ of 8.2 μm. Example 20B was fabricated using an OVD process. The measured absolute SBS threshold on a 50 km fiber length was 10.45 dBm, or about a 3.65 dB improvement over a similar length of SMF-28® or SMF-28e® optical fiber manufactured by Corning Incorporated.

Figure 15:
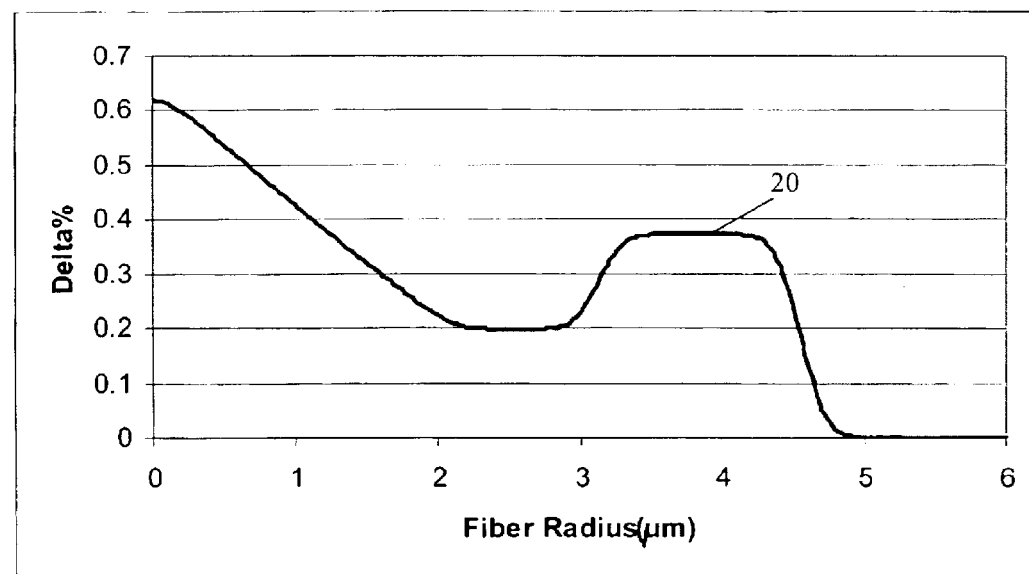
Figure 15C:
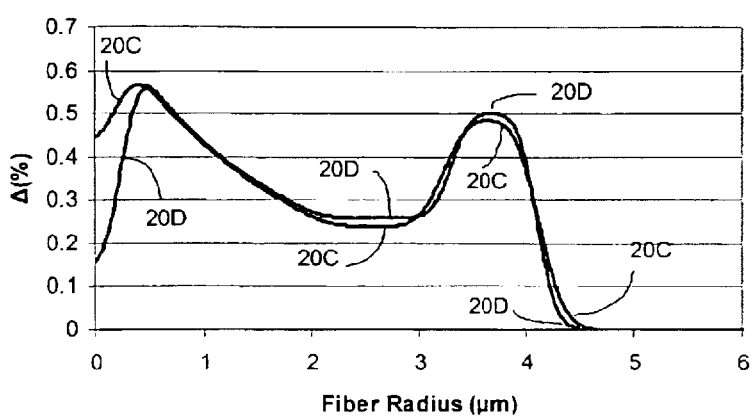
Figure 15D:
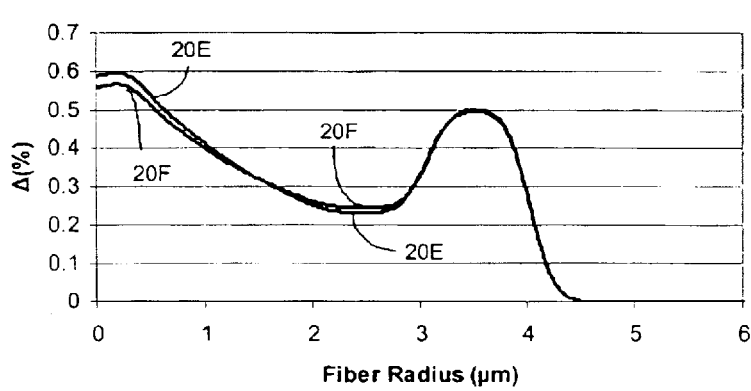
Figure 15E:
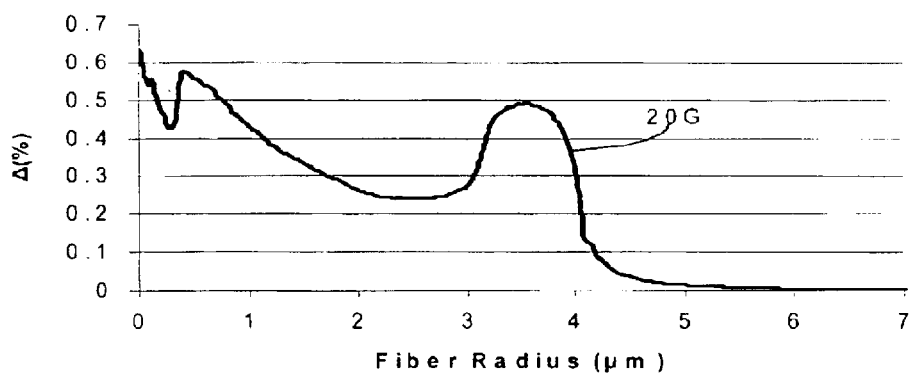

Another preferred embodiment in the fourth set of preferred embodiments is illustrated in FIG. 15E which shows the refractive index profile of Example 20G in curve 20G, which was fabricated using an OVD method. Example 20G exhibited optical characteristics similar to Example 20C. Measured values of the optical fiber of Example 20G included: an attenuation at 1310 nm of 0.334 dB/km; an attenuation at 1380 nm of 0.310 dB/km; an attenuation at 1550 nm of 0.192 dB/km; MFD at 1310 nm of 9.14 μm²; cabled cutoff of 1180 nm; zero dispersion at 1317 nm dispersion slope at zero dispersion of 0.0884 ps/nm²-km; macrobend loss of 1.27 dB/m for 5 turns around a 20 mm diameter mandrel for a 5 m sample; lateral load microbend loss of 0.55 dB/m for a 5 m sample; an absolute SBS threshold of 11.0 dBm and an SBS threshold improvement of about 4.2 dB over a similar length of SMF-28® or SMF-28e® optical fiber manufactured by Corning Incorporated. Example 20G has a $\Delta_{MAX}$ (=$\Delta_{1MAX}$) of 0.64% at r=0, and $\Delta_{3MAX}$ of 0.49% at about r=3.6.

Figure 15F:
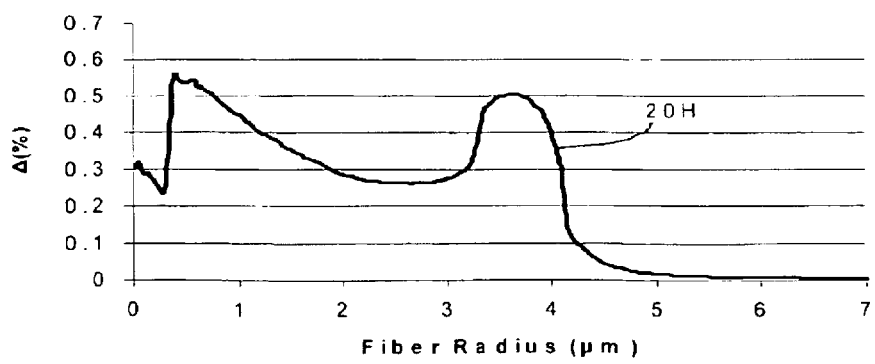

Another preferred embodiment in the fourth set of preferred embodiments is illustrated in FIG. 15F which shows the refractive index profile of Example 20H in curve 20H, which was fabricated using an OVD method. Example 20H exhibited optical characteristics similar to Example 20D. Measurements of the optical fiber of Example 20H included: an attenuation at 1310 nm of 0.335 dB/km; an attenuation at 1380 nm of 0.320 dB/km; an attenuation at 1550 nm of 0.195 dB/km; MFD at 1310 nm of 9.10 μm²; cabled cutoff of 1185 nm; zero dispersion at 1314 nm dispersion slope at zero dispersion of 0.0878 ps/nm²-km; macrobend loss of 3.24 dB/m for 5 turns around a 20mm diameter mandrel for a 5 m sample; lateral load microbend loss of 0.53 dB/m for a 5 m sample; an absolute SBS threshold of 11.0 dBm and an SBS threshold improvement of about 4.2 dB over a similar length of SMF-28® or SMF-28e® optical fiber. Example 20H has a $\Delta_{MAX}$ (=$\Delta_{1MAX}$) of 0.56% at about r=0.4 μm, and $\Delta_{3MAX}$ of about 0.51% at about r=3.6.

The optical fibers illustrated by Examples 16–20 and 20A–20H have an optical mode effective area at 1550 nm which is greater than about 80 μm², a first acoustical mode $L_{01}$ having a first acousto-optic effective area, $AOEA_{L01}$, which is not less than 170 μm²; and a second acoustical mode $L_{02}$ having a second acousto-optic effective area, $AOEA_{L02}$, which is not less than 170 μm², wherein $0.4 < AOEA_{L01}/AOEA_{L02} < 2.5$. Preferably, the optical mode effective area at 1550 nm is greater than about 80 μm², even more preferably between about 80 and 110 μm². In some preferred embodiments, the optical mode effective area at 1550 nm is between about 80 and 100 μm². In other preferred embodiments, the optical mode effective area at 1550 nm is between about 80 and 95 μm². In some preferred embodiments, such as in FIGS. 12, 13, 15B, 15C, 15E and 15F the core may comprise a relative refractive index profile having a so-called centerline dip which may occur as a result of one or more optical fiber manufacturing techniques. However, the centerline dip in any of the refractive index profiles disclosed herein is optional. Preferably, the core comprises a first portion extending from the centerline to a radius of 1 μm and preferably having a maximum relative refractive index $\Delta_{MAX}=\Delta_{1MAX}$ (in percent) less than 0.7%, more preferably less than 0.6%, occurring at a radius $r_{\Delta MAX}$. The relative refractive index $\Delta_{CORE1}(r)$ is preferably greater than about 0.25% and less than about 0.7% for all radii between $r_{\Delta MAX}$ and r=1 μm. In preferred embodiments, $\Delta_{CORE1}(r)$ is greater than 0.3% and less than 0.6% for all radii between $r_{\Delta MAX}$ and r=1 μm. Preferably, the core further comprises a second portion surrounding and directly adjacent to the first portion, the second portion extending to a radius of 2.5 μm, wherein $\Delta_{CORE2}(r)$ is between 0.15% and 0.5%, more preferably between 0.15% and 0.45%, throughout the second portion. In preferred embodiments, $\Delta_{CORE2}(r)$ is greater than 0.3% and less than 0.45% from r=1 to r=1.5 μm, and in preferred embodiments, $\Delta_{CORE2}(r)$ is greater than about 0.1% and less than about 0.35% from r=1.5 to r=2.5 μm. The second portion comprises a minimum relative refractive index, $\Delta_{2MIN}$ (in percent), preferably less than 0.3%, more preferably less than 0.25%. Preferably, $(\Delta_{1MAX}-\Delta_{2MIN}) > 0.25\%$. In preferred embodiments, the difference between $\Delta_{1MAX}$ and $\Delta_{2MIN}$ ($\Delta_{1MAX}-\Delta_{2MIN}$) is greater than 0.3%. In other preferred embodiments, $(\Delta_{1MAX}-\Delta_{2MIN}) > 0.35\%$. In some preferred embodiments, $(\Delta_{1MAX}-\Delta_{2MIN})$ is between about 0.3% and about 0.5%. In other preferred embodiments, $(\Delta_{1MAX}-\Delta_{2MIN})$ is between about 0.3% and 0.4%. Preferably, the core further comprises a third portion surrounding and directly adjacent to the second portion, the third portion extending to a radius of 4.5 μm. In preferred embodiments, at r=4 μm, $\Delta_{CORE3} >$ about 0.2%. The third portion comprises a maximum relative refractive index $\Delta_{3MAX}$ (in percent) which is greater than $\Delta_{2MIN}$ and less than $\Delta_{1MAX}$. Preferably, the difference between $\Delta_{3MAX}$ and $\Delta_{2MIN}$ ($\Delta_{3MAX}-\Delta_{2MIN}$) is greater than 0.10%. In some preferred embodiments, ($\Delta_{3MAX}-\Delta_{2MIN}$) is between about 0.1% and 0.3%. In other preferred embodiments, ($\Delta_{3MAX}-\Delta_{2MIN}$) is between about 0.1% and 0.2%. In other preferred embodiments, ($\Delta_{3MAX}-\Delta_{2MIN}$) is between about 0.2% and 0.3%. In one subset of preferred embodiments, ($\Delta_{1MAX}-\Delta_{2MIN}$) is between about 0.3% and 0.4% and ($\Delta_{3MAX}-\Delta_{2MIN}$) is between about 0.1% and 0.2%. In another subset of preferred embodiments ($\Delta_{1MAX}-\Delta_{2MIN}$) is between about 0.3% and 0.4% and ($\Delta_{3MAX}-\Delta_{2MIN}$) is between about 0.2% and 0.3%. Preferably, $\Delta_{CORE3}(r)$ is between 0% and about 0.6%, more preferably between 0% and 0.55%, and even more preferably between 0% and 0.5%. In some preferred embodiments, $\Delta_{CORE3}(r)$ is between about 0.1% and about 0.5% in the third portion. Preferably, the core further comprises a fourth portion surrounding and directly adjacent to the third portion, the fourth portion extending to a radius of between 4.5 and 12 μm, more preferably between 4.5 and 10 μm. $\Delta_{CORE4}(r)$ is between 0% and 0.4% throughout the fourth portion. In preferred embodiments, $\Delta_{CORE4}(r)$ for increasing radius decreases from a maximum positive relative refractive index of less than or equal to 0.4% to a minimum between 0 and 0.03%. Preferably, the relative refractive index is less than 0.03% for all radii between 6 μm and 25 μm. Preferably, the cladding surrounds and is directly adjacent to the fourth portion. Preferably, the core ends and the cladding begins at $r_{CORE}$>4.5 μm, more preferably between 4.5 and 12 μm, and even more preferably between 5 and 10 μm.

In preferred embodiments, optical fibers such as those illustrated by Examples 16–20 and 20A–20H disclosed herein preferably have: a dispersion at 1550 nm of greater than 15 ps/nm-km, more preferably between 15 and 22 ps/nm-km, even more preferably between 16 and 21 ps/nm-km; a dispersion slope at 1550 nm of less than 0.07 ps/nm²-km, more preferably between 0.05 and 0.07 ps/nm²-km; kappa of 270 to 330 nm; dispersion zero less than 1340 nm, more preferably less than 1320 nm, even more preferably between 1270 and 1320 nm; an optical effective area at 1550 nm greater than 80 μm², and in some preferred embodiments greater than 85 μm², and in other preferred embodiments between 85 μm² and 110 μm²; an optical mode field diameter at 1550 nm of greater than 10 μm, more preferably between 10 and 13 μm, even more preferably between 10 and 12 μm; pin array bend loss at 1550 nm less than 20 dB, more preferably less than 15 dB, even more preferably less than 10 dB; a dispersion at 1310 nm having a magnitude less than 5 ps/nm-km, more preferably less than 3 ps/nm-km; and a dispersion slope at 1310 nm of less than 0.10 ps/nm²-km. Preferably, the lateral load loss is less than 1 dB/m, more preferably less than 0.7 dB/m. Preferably the 20 mm macrobend loss is less than 5 dB/m, more preferably less than 2 dB/m.

In preferred embodiments, the part of the relative refractive index that includes $\Delta_{3MAX}$ in the third portion of the core is relatively flat, i.e. of relatively constant value. Preferably, the absolute magnitude of the difference in $\Delta(r)$ between any radii between r=3.5 μm and r=4 μm is less than 0.1%, more preferably less than 0.05%. Preferably, the part of the relative refractive index that includes $\Delta_{2MIN}$ is relatively flat, i.e. of relatively constant value. Preferably, $d\Delta/dr$ has an absolute magnitude <0.05%/μm occurring between r=2 and r=3 μm.

$AOEA_{L01}$ may be greater than $AOEA_{L02}$, or $AOEA_{L02}$ may be greater than $AOEA_{L01}$, or $AOEA_{L01}$ may be substantially equal to $AOEA_{L02}$.

In preferred embodiments, $AOEA_{L01}$ and $AOEA_{L02}$ are both less than 400 μm². In other preferred embodiments, $AOEA_{L01}$ and $AOEA_{L02}$ are both less than 300 μm².

In preferred embodiments, $0.5<AOEA_{L01}/AOEA_{L02}<2$. In other preferred embodiments, $0.6<AOEA_{L01}/AOEA_{L02}<1.5$.

Cladding, or a cladding layer, shown in FIGS. 12–15 and FIGS. 15A–15F where $\Delta_{CLAD}$=0, surrounds and is directly adjacent the outer region of the core at $r_{CORE}$.

Examples 16 through 20 and 20A–20H can thus be described as having a core comprising an inner region (or central region), an intermediate region (or moat region) surrounding and directly adjacent to the inner region, and an outer region (or ring region) surrounding and directly adjacent to the intermediate region. The core preferably has a positive refractive index throughout. Preferably, the inner region comprises the maximum $\Delta_{CORE}$ (i.e. $\Delta_{1MAX}$) for the entire fiber, the intermediate region comprises $\Delta_{2MIN}$, and the outer region comprises $\Delta_{3MAX}$, where $\Delta_{1MAX}>\Delta_{3MAX}>\Delta_{2MIN}>0$. Preferably, the relative refractive index profile in the first portion comprises a substantially flat part. The third portion comprises $\Delta_{3MAX}$ which is less than $\Delta_{1MAX}$. Preferably, the relative refractive index profile in the third portion comprises a substantially flat part, and more preferably, a substantial part of the third portion has a substantially flat relative refractive index profile $\Delta_{CORE3}(r)$.

In one subset of preferred embodiments, the optical fiber disclosed herein comprises: an inner region, or central core region; an intermediate region, or moat region, surrounding and directly adjacent to the inner region; and an outer region, or ring region, surrounding and directly adjacent to the intermediate region; wherein the optical effective area at 1550 nm is preferably greater than 80 μm², more preferably between 80 μm² and 90 μm²; the dispersion at 1550 nm is preferably greater than 16 ps/nm-km, more preferably between 16 and 19 ps/nm-km; the zero dispersion wavelength is preferably less than 1320 nm, more preferably between 1270 and 1320 nm; and the dispersion slope at 1550 nm is preferably less than 0.07 ps/nm²-km. Preferably, cladding ($\Delta$=0%) surrounds and is directly adjacent to the outer periphery of the outer region, or ring region.

Table 6 lists the measured characteristics of two sample optical fibers as disclosed herein, Examples 21–23, made via an outside vapor deposition (OVD) process.

TABLE 6

|  |  | Example: | | |
|---|---|---|---|---|
|  |  | Ex 21 | Ex 22 | Ex 23 |
| Length | Km | 50 | 50 | 50 |
| Attenuation at 1380 nm | dB/km | 0.295 | 0.295 | 0.295 |
| Attenuation at 1420 nm | dB/km | 0.251 | 0.251 | 0.251 |
| Attenuation at 1550 nm | dB/km | 0.191 | 0.191 | 0.191 |
| 2 m Fiber Cutoff Wavelength | Nm | 1377 | 1349 | 1368 |
| Cabled Cutoff Wavelength | Nm | 1259 | 1243 | 1237 |
| MFD at 1310 nm | μm | 9.56 | 9.60 | 9.63 |
| 32 mm dia Macrobend @ 1550 μm | dB/turn | 0.006 | 0.006 | 0.006 |
| 32 mm dia Macrobend @ 1625 μm | dB/turn | 0.024 | 0.019 | 0.013 |
| SBS Threshold Improvement over SMF-28 ® optical fiber | dB | 4.1 | 3.8 | 4.1 |
| SBS Threshold (absolute) | dBm | 10.9 | 10.6 | 10.9 |

Figure 12:
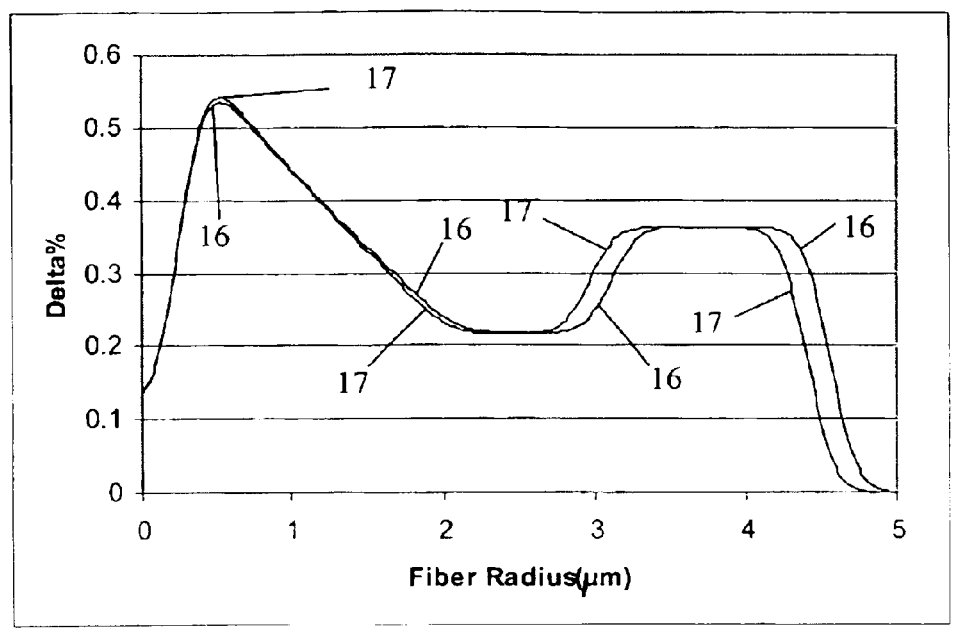
Figure 13:
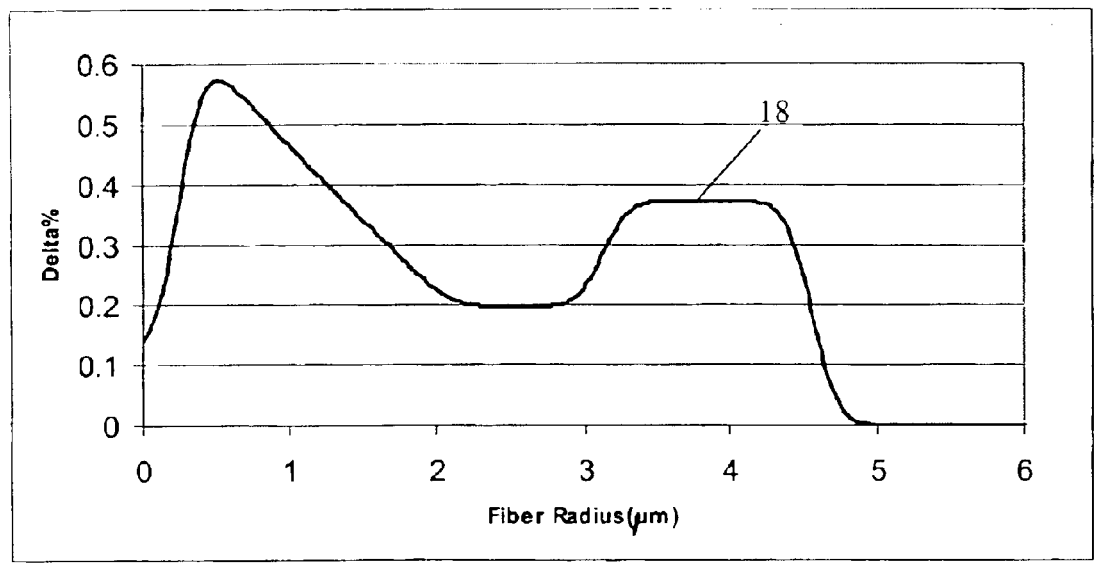
Figure 14:
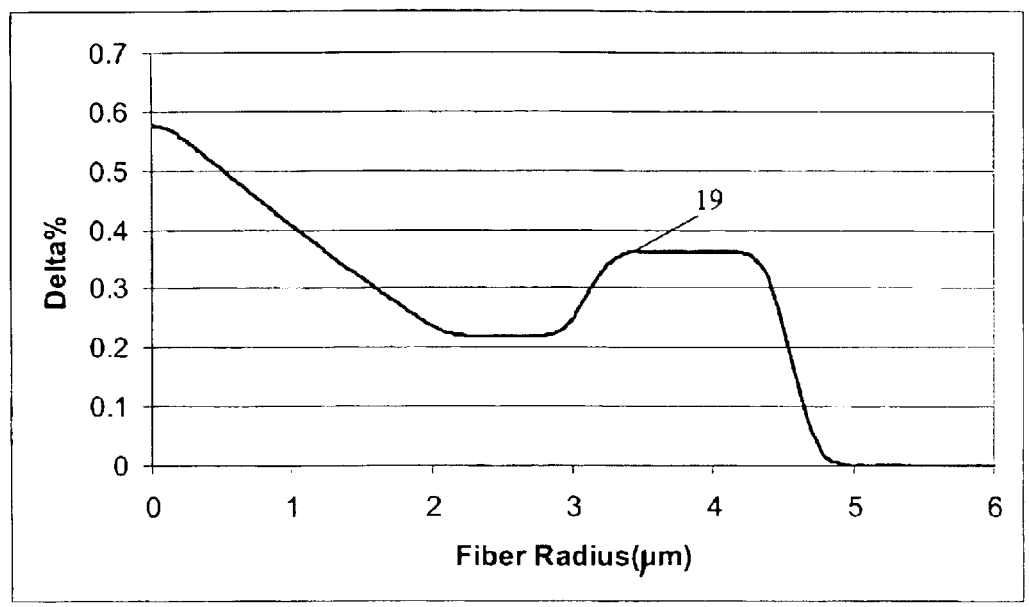

The relative refractive index profiles of Examples 21–23 were similar to the profiles described in Example 16 & 17 above and as represented by curves 16 & 17 in FIG. 12.

5$^{th}$ Set of Preferred Embodiments

Figure 16:
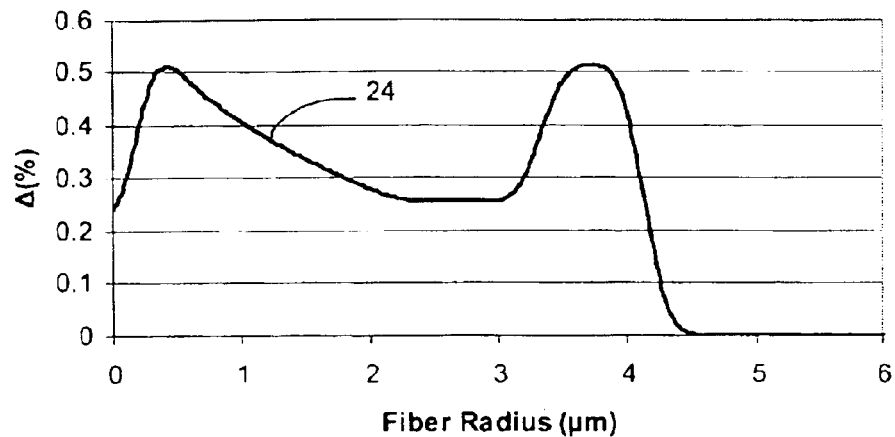
FIG. 16 shows respective refractive index profiles corresponding to a fifth set of preferred embodiments of an optical waveguide fiber as disclosed herein.

FIG. 16 schematically represents an illustrative fifth set of preferred embodiments with a corresponding refractive index profile of Example 24 in curve 24. The optical fiber of Example 24 has the following characteristics: dispersion at 1310 nm of 0.07 ps/nm-km, dispersion slope at 1310 nm of 0.0877 ps/nm²-km, dispersion at 1550 nm of 17.0 ps/nm-km, dispersion slope at 1550 nm of 0.058 ps/nm²-km, kappa of 293 nm, dispersion at 1625 nm of 21.2 ps/nm-km, mode field diameter at 1550 nm (MFD1550) of 10.40 μm, attenuation at 1550 nm of 0.198 dB/km, pin array at 1550 nm of 8.2 dB, lateral load loss at 1550 nm of 0.5 dB, LP11 cutoff (theoretical) of 1344 nm, zero dispersion wavelength of 1312 nm, $A_{eff}$ at 1550 nm of 83.5 $\mu$m$^2$, $AOEA_{L01}$ of 202 $\mu$m$^2$, $AOEA_{L02}$ of 283 $\mu$m$^2$, $AOEA_{MIN}$ of 202 $\mu$m$^2$, ratio $AOEA_{L01}/AOEA_{L02}$ 0.71, absolute SBS threshold of 10.3 dBm, an SBS threshold improvement of about 3.5 dB over a similar length of SMF-28® or SMF-28e® optical fiber, relative refractive index difference $\Delta$ of 0.24, 0.50, 0.41, 0.34, 0.28, 0.26, 0.26, 0.48, 0.43, and 0.00% at radii of 0, 0.5, 1, 1.5, 2, 2.5, 3, 3.5, 4, and 4.5, respectively, $\Delta_{MAX}$-$\Delta$ (r=1) of 0.10% $\Delta_{MAX}$ of 0.51%, $r_{\Delta MAX}$ of 3.725 $\mu$m, and $r_{CORE}$ of 4.5 $\mu$m. Example 24 has a $\Delta_{1MAX}$ of 0.51% at about r=0.45 $\mu$m, $\Delta_{2MIN}$ of about 0.26%, and $\Delta_{MAX}$=$\Delta_{3MAX}$ of about 0.51% at about $r_{3MAX}$=3.7 $\mu$m, $\Delta_{1MAX}$-$\Delta_{2MIN}$ of 0.25%, $\Delta_{3MAX}$-$\Delta_{2MIN}$ of 0.25% and $|\Delta_{1MAX}$-$\Delta_{3MAX}|$ of 0%.

The optical fibers illustrated by Example 24 have an optical mode effective area at 1550 nm which is greater than about 80 $\mu$m$^2$, a first acoustical mode $L_{01}$ having a first acousto-optic effective area, $AOEA_{L01}$, which is not less than 170 $\mu$m$^2$; and a second acoustical mode $L_{02}$ having a second acousto-optic effective area, $AOEA_{L02}$, which is not less than 170 $\mu$m$^2$, wherein $0.4<AOEA_{L01}/AOEA_{L02}<2.5$. Preferably, the optical mode effective area at 1550 nm is greater than about 80 $\mu$m$^2$, even more preferably between about 80 and 100 $\mu$m$^2$. In some preferred embodiments, the optical mode effective area at 1550 nm is between about 80 and 90 $\mu$m$^2$. In other preferred embodiments, the optical mode effective area at 1550 nm is between about 80 and 85 $\mu$m$^2$. In some preferred embodiments, such as in FIG. 16, the core may comprise a relative refractive index profile having a so-called centerline dip which may occur as a result of one or more optical fiber manufacturing techniques. However, the centerline dip in any of the refractive index profiles disclosed herein is optional. Preferably, the core comprises a first portion extending from the centerline to a radius of 1 $\mu$m and preferably having a maximum relative refractive index in the first portion $\Delta_{1MAX}$ (in percent) less than 0.7%, more preferably less than 0.6%, occurring at a radius $r_{\Delta 1MAX}$ between 0 and 1 $\mu$m. The relative refractive index $\Delta_{CORE1}(r)$ is preferably greater than 0.15% and less than 0.7% for all radii between $r_{\Delta MAX}$ and r=1 $\mu$m. In preferred embodiments, $\Delta_{CORE1}(r)$ is greater than 0.3% and less than 0.6% for all radii between $r_{\Delta MAX}$ and r=1 $\mu$m. Preferably, the core further comprises a second portion surrounding and directly adjacent to the first portion, the second portion extending to a radius of 2.5 $\mu$m, wherein $\Delta_{CORE2}(r)$ is between 0.15% and 0.5%, more preferably between 0.15% and 0.45%, throughout the second portion. In preferred embodiments, $\Delta_{CORE2}(r)$ is greater than 0.3% and less than 0.45% from r=1 to r=1.5 $\mu$m, and in preferred embodiments, $\Delta_{CORE2}(r)$ is greater than about 0.1% and less than 0.35% from r=1.5 to r=2.5 $\mu$m. The second portion comprises a minimum relative refractive index, $\Delta_{2MIN}$ (in percent), preferably less than 0.3%, more preferably less than 0.25%. In preferred embodiments, the difference between $\Delta_{1MAX}$ and $\Delta_{2MIN}$, i.e. ($\Delta_{1MAX}$-$\Delta_{2MIN}$), is greater than 0.1%, more preferably >0.2%. In other preferred embodiments, ($\Delta_{1MAX}$-$\Delta_{2MIN}$)>0.35%. Preferably, the core further comprises a third portion surrounding and directly adjacent to the second portion, the third portion extending to a radius of 4.5 $\mu$m. At r=4 $\mu$m, $\Delta_{CORE3}$>0.2%, more preferably $\Delta_{CORE3}$>0.3%. The third portion comprises a maximum relative refractive index $\Delta_{3MAX}$ (in percent) which is greater than $\Delta_{2MIN}$ and about equal to $\Delta_{1MAX}$. Preferably, the absolute magnitude of the difference between $\Delta_{1MAX}$ and $\Delta_{3MAX}$ is less than 0.1%, more preferably less than 0.05%. Preferably, the difference between $\Delta_{3MAX}$ and $\Delta_{2MIN}$, i.e. ($\Delta_{3MAX}$-$\Delta_{2MIN}$), is greater than 0.10%, more preferably >0.2%. In preferred embodiments, ($\Delta_{1MAX}$-$\Delta_{2MIN}$)>0.2% and ($\Delta_{3MAX}$-$\Delta_{2MIN}$)>0.2%. In a subset of preferred embodiments, ($\Delta_{1MAX}$-$\Delta_{2MIN}$) is between 0.2% and 0.3% and ($\Delta_{3MAX}$-$\Delta_{2MIN}$) is between 0.2% and 0.3%. Preferably, $\Delta_{CORE3}(r)$ is between 0% and 0.6%. Preferably, the core further comprises a fourth portion surrounding and directly adjacent to the third portion, the fourth portion extending to a radius of between 4.5 and 12 $\mu$m, more preferably between 4.5 and 10 $\mu$m. The fourth portion may comprise a so-called diffusion tail of decreasing relative refractive index. The Example in FIG. 16 is depicted as having a negligible diffusion tail. $\Delta_{CORE4}(r)$ is between 0% and 0.4% throughout the fourth portion. In preferred embodiments, $\Delta_{CORE4}(r)$ for increasing radius decreases from a maximum positive relative refractive index of less than or equal to 0.1% to a minimum between 0 and 0.03%. Preferably, the relative refractive index is less than 0.03% for all radii between 6 $\mu$m and 25 $\mu$m. Preferably, the cladding surrounds and is directly adjacent to the fourth portion. Preferably, the core ends and the cladding begins at $r_{CORE}$>4 $\mu$m, more preferably between 4.5 and 12 $\mu$m, and even more preferably between 5 and 10 $\mu$m.

In preferred embodiments, optical fibers such as those illustrated by Example 24 disclosed herein preferably have: a dispersion at 1550 nm of greater than 15 ps/nm-km, more preferably between 15 and 22 ps/nm-km, even more preferably between 16 and 21 ps/nm-km; a dispersion slope at 1550 nm of less than 0.07 ps/nm$^2$-km, more preferably between 0.05 and 0.07 ps/nm$^2$-km; kappa of 270 to 330 nm; dispersion zero less than 1340 nm, more preferably less than 1320 nm, even more preferably between 1270 and 1320 nm; an optical effective area at 1550 nm greater than 80 $\mu$m$^2$, more preferably between 80 $\mu$m$^2$ and 100 $\mu$m$^2$, even more preferably between 80 $\mu$m$^2$ and 90 $\mu$m$^2$; an optical mode field diameter at 1550 nm of greater than 10 $\mu$m, more preferably between 10 and 13 $\mu$m, even more preferably between 10 and 12 $\mu$m; pin array bend loss at 1550 nm less than 20 dB, more preferably less than 15 dB, even more preferably less than 10 dB; a dispersion at 1310 nm having a magnitude less than 5 ps/nm-km, more preferably less than 3 ps/nm-km; and a dispersion slope at 1310 nm of less than 0.10 ps/nm$^2$-km. Preferably, the lateral load loss is less than 1 dB/m, more preferably less than 0.7 dB/m.

Preferably, the part of the relative refractive index that includes $\Delta_{3MAX}$ in the third portion of the core is relatively flat, i.e. of relatively constant value. Preferably, the absolute magnitude of the difference in $\Delta(r)$ between any radii between r=3.5 $\mu$m and r=4 $\mu$m is less than 0.1%, more preferably less than 0.05%. Preferably, the part of the relative refractive index that includes $\Delta_{2MIN}$ is relatively flat, i.e. of relatively constant value. Preferably, $d\Delta/dr$ has an absolute magnitude <0.05%/$\mu$m occurring between r=2 and r=3 $\mu$m.

$AOEA_{L01}$ may be greater than $AOEA_{L02}$, or $AOEA_{L02}$ may be greater than $AOEA_{L01}$, or $AOEA_{L01}$ may be substantially equal to $AOEA_{L02}$.

In preferred embodiments, $AOEA_{L01}$ and $AOEA_{L02}$ are both less than 400 $\mu$m$^2$. In other preferred embodiments, $AOEA_{L01}$ and $AOEA_{L02}$ are both less than 300 $\mu$m$^2$.

In preferred embodiments, $0.5<AOEA_{L01}/AOEA_{L02}<2$. In other preferred embodiments, $0.6<AOEA_{L01}/AOEA_{L02}<1.5$.

Cladding, or a cladding layer, shown in FIG. 16 where $\Delta_{CLAD}$=0, surrounds and is directly adjacent the outer region of the core at $r_{CORE}$.

Example 24 can thus be described as having a core comprising an inner region (or central region), an intermediate region (or moat region) surrounding and directly adjacent to the inner region, and an outer region (or ring region) surrounding and directly adjacent to the intermediate region. The core preferably has a positive refractive index throughout. Preferably, either the inner region or the outer region comprises the maximum $\Delta_{CORE}$ (i.e. $\Delta_{MAX}=\Delta_{1MAX}$ or $\Delta_{MAX}=\Delta_{3MAX}$) for the entire fiber, and the intermediate region comprises $\Delta_{2MIN}$. In some preferred embodiments, $\Delta_{1MAX}>\Delta_{3MAX}$. In other preferred embodiments $\Delta_{3MAX}>\Delta_{1MAX}$. In other preferred embodiments $\Delta_{1MAX}\approx\Delta_{3MAX}$. In still other preferred embodiments, In other preferred embodiments $\Delta_{1MAX}=\Delta_{3MAX}$. Preferably, $\Delta_{1MAX}>0$, $\Delta_{3MAX}>0$, $\Delta_{2MIN}>0$, $\Delta_{1MAX}>\Delta_{2MIN}$, $\Delta_{3MAX}>\Delta_{2MIN}$, and $|\Delta_{1MAX}-\Delta_{3MAX}|<0.10\%$, more preferably $<0.05\%$, that is, $\Delta_{1MAX}$ is about equal to $\Delta_{3MAX}$. Preferably, the relative refractive index profile in the first portion comprises a substantially flat part. Preferably, the relative refractive index profile in the third portion comprises a substantially flat part, and more preferably, a substantial part of the third portion has a substantially flat relative refractive index profile $\Delta_{CORE}(r)$.

$6^{th}$ Set of Preferred Embodiments

Figure 17:
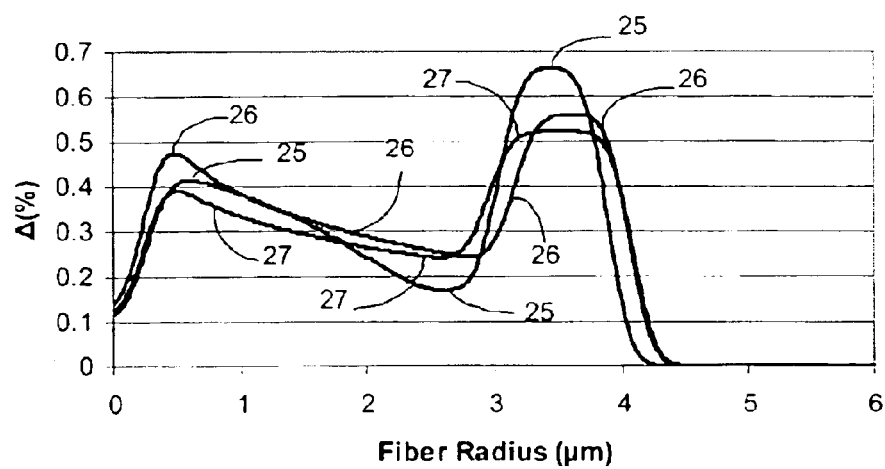
FIG. 17 shows respective refractive index profiles corresponding to a sixth set of preferred embodiments of an optical waveguide fiber as disclosed herein.

Table 7 lists an illustrative sixth set of preferred embodiments, Examples 25 through 27. FIG. 17 shows the corresponding refractive index profiles of Examples 25–27 in curves 25–27, respectively.

TABLE 7

| | | Example: | | |
|---|---|---|---|---|
| | | Ex 25 | Ex 26 | Ex 27 |
| Dispersion at 1310 nm | ps/nm-km | −0.06 | 0.54 | 0.59 |
| Dispersion at 1550 nm | ps/nm-km | 16.9 | 17.4 | 17.5 |
| Dispersion at 1625 nm | ps/nm-km | 21.1 | 21.6 | 21.7 |
| Dispersion Slope at 1310 nm | ps/nm²-km | 0.0881 | 0.0872 | 0.0878 |
| Dispersion Slope at 1550 nm | ps/nm²-km | 0.0584 | 0.0581 | 0.0584 |
| Kappa | nm | 289 | 299 | 300 |
| MFD1310 | μm | 9.19 | 9.16 | 9.31 |
| MFD1550 | μm | 10.44 | 10.34 | 10.51 |
| Attenuation at 1550 nm | dB/km | 0.213 | 0.203 | 0.204 |
| Pin Array at 1550 nm | dB | 9.9 | 5.95 | 7.6 |
| LP11 cutoff(theoretical) | nm | 1355 | 1380 | 1390 |
| Cabled cutoff | nm | 1235 | 1265 | 1277 |
| Zero Dispersion Wavelength | nm | 1311 | 1304 | 1306 |
| $A_{eff}$ at 1310 nm | μm² | 71.6 | 69.0 | 73.7 |
| $A_{eff}$ at 1550 nm | μm² | 87.3 | 84.2 | 88.6 |
| $AOEA_{L01}$ | μm² | 268 | 237 | 215 |
| $AOEA_{L02}$ | μm² | 220 | 219 | 220 |
| $AOEA_{MIN}$ | μm² | 220 | 219 | 215 |
| Ratio: $AOEA_{L01}/AOEA_{L02}$ | | 1.22 | 1.08 | 0.98 |
| SBS Threshold (absolute) | dBm | 11.4 | 10.9 | 10.5 |
| SBS Threshold Improvement over SMF-28 ® optical fiber | dB | 4.6 | 4.1 | 3.7 |
| $\Delta(r=0)$ | % | 0.12 | 0.14 | 0.12 |
| $\Delta_1(r=1)$ | % | 0.38 | 0.38 | 0.33 |
| $\Delta(0)-\Delta(1)$ | % | −0.27 | −0.24 | −0.21 |
| $\Delta_{1MAX}$ | % | 0.41 | 0.47 | 0.39 |
| $r_{\Delta1MAX}$ | μm | 0.6 | 0.5 | 0.5 |
| $\Delta_{2MIN}$ | % | 0.17 | 0.25 | 0.24 |
| $r_{\Delta2MIN}$ | μm | 2.5 | 2.5 | 2.5 |
| $\Delta_{3MAX}=\Delta_{MAX}$ | % | 0.66 | 0.56 | 0.52 |
| $r_{\Delta3MAX}$ | μm | 3.45 | 3.6 | 3.5 |
| $r_{\Delta MAX}$ | μm | 3.45 | 3.6 | 3.5 |
| $\Delta MAX - \Delta(1)$ | % | 0.28 | 0.18 | 0.19 |
| $\Delta_{1MAX} - \Delta_{2MIN}$ | % | 0.24 | 0.22 | 0.15 |
| $\Delta_{3MAX} - \Delta_{2MIN}$ | % | 0.49 | 0.31 | 0.28 |
| $|\Delta_{1MAX} - \Delta_{3MAX}|$ | % | 0.25 | 0.09 | 0.11 |
| $\Delta(r=1.5\ \mu m)$ | % | 0.32 | 0.33 | 0.29 |
| $\Delta(r=2\ \mu m)$ | % | 0.24 | 0.29 | 0.27 |
| $\Delta(r=2.5\ \mu m)$ | % | 0.17 | 0.26 | 0.24 |
| $\Delta(r=3\ \mu m)$ | % | 0.37 | 0.28 | 0.41 |
| $\Delta(r=3.5\ \mu m)$ | % | 0.66 | 0.56 | 0.52 |
| $\Delta(r=4\ \mu m)$ | % | 0.14 | 0.37 | 0.38 |
| $\Delta(r=4.5\ \mu m)$ | % | 0.00 | 0.00 | 0.00 |
| $\Delta(r=5\ \mu m)$ | % | 0.00 | 0.00 | 0.00 |
| $\Delta(r=5.5\ \mu m)$ | % | 0.00 | 0.00 | 0.00 |
| $\Delta(r=6\ \mu m)$ | % | 0.00 | 0.00 | 0.00 |
| $r_{CORE}$ | μm | 4.35 | 4.4 | 4.4 |

The optical fibers illustrated by Examples 25–27 have an optical mode effective area at 1550 nm which is greater than about 80 $\mu m^2$, a first acoustical mode $L_{01}$ having a first acousto-optic effective area, $AOEA_{L01}$, which is not less than 170 $\mu m^2$; and a second acoustical mode $L_{02}$ having a second acousto-optic effective area, $AOEA_{L02}$, which is not less than 170 $\mu m^2$, wherein 0.4<$AOEA_{L01}$/$AOEA_{L02}$<2.5. Preferably, the optical mode effective area at 1550 nm is greater than about 80 $\mu m^2$, even more preferably between about 80 and 110 $\mu m^2$. In some preferred embodiments, the optical mode effective area at 1550 nm is between about 80 and 100 $\mu m^2$. In other preferred embodiments, the optical mode effective area at 1550 nm is between about 80 and 95 $\mu m^2$. In some preferred embodiments, such as in FIG. 17, the core may comprise a relative refractive index profile having a so-called centerline dip which may occur as a result of one or more optical fiber manufacturing techniques. However, the centerline dip in any of the refractive index profiles disclosed herein is optional. Preferably, the core comprises a first portion extending from the centerline to a radius of 1 $\mu m$ and preferably having a maximum relative refractive index $\Delta_{1MAX}$ (in percent) less than 0.7%, more preferably less than 0.6%, occurring at a radius $r_{\Delta 1MAX}$. The relative refractive index $\Delta_{CORE1}(r)$ is preferably greater than 0.25% and less than 0.7% for all radii between $r_{\Delta 1MAX}$ and r=1 $\mu m$. In preferred embodiments, $\Delta_{CORE1}(r)$ is greater than 0.3% and less than 0.6% for all radii between $r_{\Delta MAX}$ and r=1 $\mu m$. Preferably, the core further comprises a second portion surrounding and directly adjacent to the first portion, the second portion extending to a radius of 2.5 $\mu m$, wherein $\Delta_{CORE2}(r)$ is between 0.15% and 0.5%, more preferably between 0.15% and 0.45%, throughout the second portion. In preferred embodiments, $\Delta_{CORE2}(r)$ is greater than 0.25% and less than 0.45% from r=1 to r=1.5 $\mu m$, and in preferred embodiments, $\Delta_{CORE2}(r)$ is greater than about 0.1% and less than 0.4% from r=1.5 to r=2.5 $\mu m$. The second portion preferably comprises a minimum relative refractive index, $\Delta_{2MIN}$ (in percent), preferably less than 0.3%, more preferably less than 0.30% and greater than 0.1%. Preferably, the difference between $\Delta_{1MAX}$ and $\Delta_{2MIN}$, i.e. ($\Delta_{1MAX}$-$\Delta_{2MIN}$), is greater than 0.1%, more preferably >0.15%. In some preferred embodiments, ($\Delta_{1MAX}$-$\Delta_{2MIN}$)>0.2%. In one subset of preferred embodiments, ($\Delta_{1MAX}$-$\Delta_{2MIN}$) is between 0.1% and 0.3%. In another subset of preferred embodiments, ($\Delta_{1MAX}$-$\Delta_{2MIN}$) is between 0.15% and 0.25%. Preferably, the core further comprises a third portion surrounding and directly adjacent to the second portion, the third portion extending to a radius of 4.5 $\mu m$. At r=3.5$\mu m$, $\Delta_{CORE3}$>0.3%, preferably >0.4%, more preferably >0.5%. At r=4 $\mu m$, preferably $\Delta_{CORE3}$>0.1%. The third portion comprises a maximum relative refractive index $\Delta_{3MAX}$ (in percent) which is greater than $\Delta_{2MIN}$ and greater than $\Delta_{1MAX}$. $\Delta_{3MAX}$ is the maximum relative refractive index for the entire core ($\Delta_{MAX}$=$\Delta_{3MAX}$). Preferably, the difference between $\Delta_{3MAX}$ and $\Delta_{2MIN}$, i.e. ($\Delta_{3MAX}$-$\Delta_{2MIN}$), is greater than 0.20%, more preferably >0.25%. In preferred embodiments, ($\Delta_{3MAX}$-$\Delta_{2MIN}$) is between 0.2% and 0.6%. In other preferred embodiments, ($\Delta_{3MAX}$-$\Delta_{2MIN}$) is between 0.25% and 0.5%. In a subset of preferred embodiments ($\Delta_{1MAX}$-$\Delta_{2MIN}$) is between 0.15% and 0.25% and ($\Delta_{3MAX}$-$\Delta_{2MIN}$) is between 0.25% and 0.5%. Preferably, $\Delta_{CORE3}(r)$ is between 0% and 0.7% in the third portion. Preferably, the core further comprises a fourth portion surrounding and directly adjacent to the third portion, the fourth portion extending to a radius of between 4.5 and 12 $\mu m$, more preferably between 4.5 and 10 $\mu m$. The fourth portion may comprise a diffusion tail of decreasing relative refractive index. The Examples in FIG. 17 are depicted with a negligible diffusion tail. $\Delta_{CORE4}(r)$ is between 0% and 0.4% throughout the fourth portion. In preferred embodiments, $\Delta_{CORE4}(r)$ for increasing radius decreases from a maximum positive relative refractive index of less than or equal to 0.4% to a minimum between 0 and 0.03%. Preferably, the relative refractive index is less than 0.03% for all radii between 6 $\mu m$ and 25 $\mu m$. Preferably, the cladding surrounds and is directly adjacent to the fourth portion. Preferably, the core ends and the cladding begins at $r_{CORE}$>4 $\mu m$, more preferably >4.5 $\mu m$, even more preferably between 4.5 and 12 $\mu m$, and still more preferably between 5 and 10 $\mu m$.

In preferred embodiments, optical fibers such as those illustrated by Examples 25–27 disclosed herein preferably have: a dispersion at 1550 nm of greater than 15 ps/nm-km, more preferably between 15 and 22 ps/nm-km, even more preferably between 16 and 21 ps/nm-km; a dispersion slope at 1550 nm of less than 0.07 ps/nm²-km, more preferably between 0.05 and 0.07 ps/nm²-km; kappa of 270 to 330 nm; dispersion zero less than 1340 nm, more preferably less than 1320 nm, even more preferably between 1270 and 1320 nm; an optical effective area at 1550 nm greater than 80 $\mu m^2$, more preferably between 80 and 100 $\mu m^2$, even more preferably between 80 $\mu m^2$ and 90 $\mu m^2$; an optical mode field diameter at 1550 nm of greater than 10 $\mu m$, more preferably between 10 and 13 $\mu m$, even more preferably between 10 and 12 $\mu m$; pin array bend loss at 1550 nm less than 20 dB, more preferably less than 15 dB, even more preferably less than 10 dB; a dispersion at 1310 nm having a magnitude less than 5 ps/nm-km, more preferably less than 3 ps/nm-km; and a dispersion slope at 1310 nm of less than 0.10 ps/nm²-km.

Preferably, the part of the relative refractive index that includes $\Delta_{3MAX}$ in the third portion of the core is relatively flat, i.e. of relatively constant value. Preferably, the absolute magnitude of the difference in $\Delta(r)$ between any radii within 0.25 $\mu m$ of $r_{66\ 3MAX}$ is less than 0.1%, more preferably less than 0.05%. Preferably, the part of the relative refractive index that includes $\Delta_{2MIN}$ is relatively flat, i.e. of relatively constant value. Preferably, $d\Delta/dr$ has an absolute magnitude <0.05%/$\mu m$ occurring between r=2.5 and r=3 $\mu m$.

$AOEA_{L01}$ may be greater than $AOEA_{L02}$, or $AOEA_{L02}$ may be greater than $AOEA_{L01}$, or $AOEA_{L01}$ may be substantially equal to $AOEA_{L02}$.

In preferred embodiments, $AOEA_{L01}$ and $AOEA_{L02}$ are both less than 400 $\mu m^2$. In other preferred embodiments, $AOEA_{L01}$ and $AOEA_{L02}$ are both less than 300 $\mu m^2$.

In preferred embodiments, 0.5<$AOEA_{L01}$/$AOEA_{L02}$<2. In other preferred embodiments, 0.6<$AOEA_{L01}$/$AOEA_{L02}$<1.5.

Cladding, or a cladding layer, shown in FIG. 17 where $\Delta_{CLAD}$=0, surrounds and is directly adjacent the outer region of the core.

Examples 25–27 can thus be described as having a core comprising an inner region (or central region), an intermediate region (or moat region) surrounding and directly adjacent to the inner region, and an outer region (or ring region) surrounding and directly adjacent to the intermediate region. The core preferably has a positive refractive index throughout. Preferably, the outer region comprises the maximum $\Delta_{CORE}$ (i.e. $\Delta_{MAX}$=$\Delta_{3MAX}$) for the entire fiber, the intermediate region comprises $\Delta_{2MIN}$, and the inner region comprises $\Delta_{1MAX}$, where $\Delta_{3MAX}$>$\Delta_{1MAX}$, $\Delta_{1MAX}$>0, $\Delta_{3MAX}$>0, $\Delta_{2MIN}$>0, $\Delta_{1MAX}$>$\Delta_{2MIN}$, and $\Delta_{3MAX}$>$\Delta_{2MIN}$. Preferably, the relative refractive index profile in the first portion comprises a substantially flat part. Preferably, the relative refractive index profile in the third portion comprises a substantially flat part, and more preferably, a substantial part of the third portion has a substantially flat relative refractive index profile $\Delta_{CORE3}(r)$.

$7^{th}$ Set of Preferred Embodiments

Figure 18:
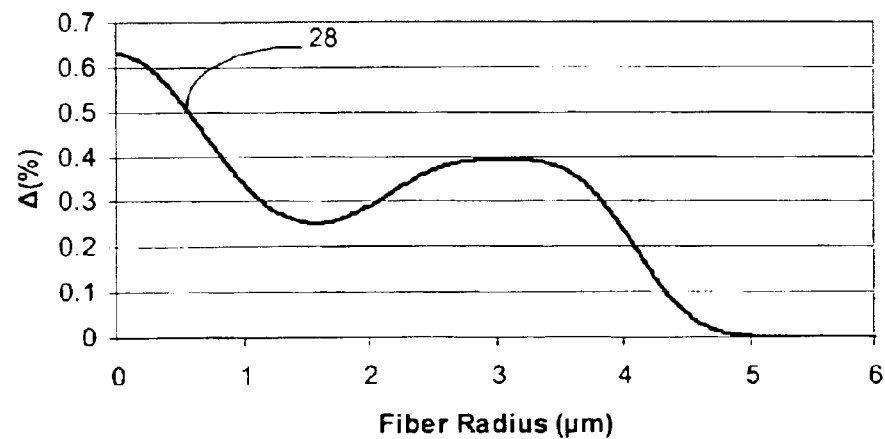
FIG. 18 shows respective refractive index profiles corresponding to a seventh set of preferred embodiments of an optical waveguide fiber as disclosed herein.

FIG. 18 schematically represents an illustrative seventh set of preferred embodiments with a corresponding refractive index profile of Example 28 in curve 28. The optical fiber of Example 28 has the following characteristics: dispersion at 1310 nm of −0.004 ps/nm-km, dispersion slope at 1310 nm of 0.0868 ps/nm²-km, dispersion at 1550 nm of 16.8 ps/nm-km, dispersion slope at 1550 nm of 0.058 ps/nm²-km, kappa at 1550 nm of 290 nm, dispersion at 1625 nm of 20.9 ps/nm-km mode field diameter at 1550 nm (MFD1550) of 10.29 $\mu$m, attenuation at 1550 nm of 0.193 dB/km, pin array at 1550 nm of 8.3 dB, lateral load loss at 1550 nm of 0.49 dB, LP11 cutoff (theoretical) of 1327nm, zero dispersion wavelength of 1313 nm, $A_{eff}$ at 1550 nm of 8.16 $\mu$m², $AOEA_{L01}$ of 324 $\mu$m², $AOEA_{L02}$ of 143 $\mu$m², $AOEA_{MIN}$ of 143 $\mu$m², ratio $AOEA_{L01}/AOEA_{L02}$ of 2.26, absolute SBS threshold of 12.1 dBm, an SBS threshold improvement of about 5.3 dB over a similar length of SMF-28® or SMF-28e® optical fiber, relative refractive index difference Δ of 0.63, 0.53, 0.34, 0.25, 0.29, 0.37, 0.39, 0.38, 0.24, 0.05, and 0.00% at radii of 0, 0.5, 1, 1.5, 2, 2.5, 3, 3.5, 4, 4.5, and 5, respectively, $\Delta_{MAX}-\Delta(r=1)$ of 0.29%, $\Delta_{MAX}=\Delta_{1MAX}$ of 0.63%, $r_{\Delta MAX}=r_{\Delta1MAX}$ of 0.0 $\mu$m, $\Delta_{2MIN}$ of about 0.25% at $r_{\Delta2MIN}$ of about 1.6 $\mu$m, $\Delta_{3MAX}$ of about 0.395% at about $r_{\Delta3MAX}=3.1$ $\mu$m, $\Delta_{1MAX}-\Delta_{2MIN}$ of 0.38%, $\Delta_{3MAX}-\Delta_{2MIN}$ of 0.145%, $|\Delta_{1MAX}-\Delta_{3MAX}|$ of 0.235%, and $r_{CORE}$ of 4.9 $\mu$m.

The optical fibers illustrated by Example 24 have an optical mode effective area at 1550 nm which is greater than about 80 $\mu$m², a first acoustical mode $L_{01}$ having a first acousto-optic effective area, $AOEA_{L01}$, which is not less than 200 $\mu$m²; and a second acoustical mode $L_{02}$ having a second acousto-optic effective area, $AOEA_{L02}$, which is not less than 100 $\mu$m², wherein $0.25<AOEA_{L01}/AOEA_{L02}<3.5$. Preferably, the optical mode effective area at 1550 nm is greater than about 80 $\mu$m², even more preferably between about 80 and 110 $\mu$m². In some preferred embodiments, the optical mode effective area at 1550 nm is between about 80 and 100 $\mu$m². In other preferred embodiments, the optical mode effective area at 1550 nm is between about 80 and 90 $\mu$m². In some preferred embodiments, the core may comprise a relative refractive index profile having a so-called centerline dip which may occur as a result of one or more optical fiber manufacturing techniques. However, the centerline dip in any of the refractive index profiles disclosed herein is optional. Preferably, the core comprises a first portion extending from the centerline to a radius of 1 $\mu$m and preferably having a maximum relative refractive index $\Delta_{1MAX}$ (in percent) less than 0.8%, more preferably less than 0.7%, occurring at a radius $r_{\Delta MAX}$. The relative refractive index $\Delta_{CORE1}(r)$ is preferably greater than 0.2% and less than 0.7% for all radii between $r_{\Delta MAX}$ and $r=1$ $\mu$m. In preferred embodiments, $\Delta_{CORE1}(r)$ is greater than 0.3% and less than 0.6% for all radii between $r_{\Delta MAX}$ and $r=1$ $\mu$m. Preferably, the core further comprises a second portion surrounding and directly adjacent to the first portion, the second portion extending to a radius of 2 $\mu$m, wherein $\Delta_{CORE2}(r)$ is between 0.15% and 0.5%, more preferably between 0.15% and 0.4%, throughout the second portion. In preferred embodiments, $\Delta_{CORE2}(r)$ is greater than 0.2% and less than 0.4% from r=1 to r=1.5 $\mu$m, and in preferred embodiments, $\Delta_{CORE2}(r)$ is greater than about 0.2% and less than 0.4% from r=1.5 to r=2.5 $\mu$m. The second portion comprises a minimum relative refractive index, $\Delta_{2MIN}$ (in percent), preferably less than 0.35%, more preferably less than 0.3%. Preferably, the difference between $\Delta_{1MAX}$ and $\Delta_{2MIN}$, i.e. ($\Delta_{1MAX}-\Delta_{2MIN}$), is greater than 0.2%, more preferably >0.3%. In preferred embodiments, ($\Delta_{1MAX}-\Delta_{2MIN}$) between 0.3% and 0.4%. Preferably, the core further comprises a third portion surrounding and directly adjacent to the second portion, the third portion extending to a radius of 4.5 $\mu$m. At r=3 $\mu$m, $\Delta_{CORE3}>0.3\%$. The third portion comprises a maximum relative refractive index $\Delta_{3MAX}$ (in percent) which is greater than $\Delta_{2MIN}$ and less than $\Delta_{1MAX}$. Preferably, the difference between $\Delta_{3MAX}$ and $\Delta_{2MIN}$, i.e. ($\Delta_{3MAX}-\Delta_{2MIN}$), is greater than 0.10%. In preferred embodiments, ($\Delta_{3MAX}-\Delta_{2MIN}$) is between 0.1% and 0.2%. Preferably, $\Delta_{CORE3}(r)$ is between 0.1% and 0.5%. Preferably, the core further comprises a fourth portion surrounding and directly adjacent to the third portion, the fourth portion extending to a radius of between 4.5 and 12 $\mu$m, more preferably between 4.5 and 10 $\mu$m. $\Delta_{CORE4}(r)$ is between 0% and 0.4% throughout the fourth portion. In preferred embodiments, $\Delta_{CORE4}(r)$ for increasing radius decreases from a maximum positive relative refractive index of less than or equal to 0.4% to a minimum between 0 and 0.03%. Preferably, the relative refractive index is less than 0.03% for all radii between 6 $\mu$m and 25 $\mu$m. Preferably, the cladding surrounds and is directly adjacent to the fourth portion. Preferably, the core ends and the cladding begins at $r_{CORE}>4.5$ $\mu$m, more preferably between 4.5 and 12 $\mu$m, and even more preferably between 5 and 10 $\mu$m.

In preferred embodiments, optical fibers such as those illustrated by Example 28 disclosed herein preferably have: a dispersion at 1550 nm of greater than 15 ps/nm-km, more preferably between 15 and 22 ps/nm-km, even more preferably between 16 and 21 ps/nm-km; a dispersion slope at 1550 nm of less than 0.07 ps/nm²-km, more preferably between 0.05 and 0.07 ps/nm²-km; kappa of 270 to 330 nm; dispersion zero less than 1340 nm, more preferably less than 1320 nm, even more preferably between 1270 and 1320 nm; an optical effective area at 1550 nm greater than 80 $\mu$m², more preferably between 80 $\mu$m² and 100 m²; an optical mode field diameter at 1550 nm of greater than 10 $\mu$m, more preferably between 10 and 13 $\mu$m, even more preferably between 10 and 12 $\mu$m; pin array bend loss at 1550 nm less than 20 dB, more preferably less than 15 dB, even more preferably less than 10 dB; a dispersion at 1310 nm having a magnitude less than 5 ps/nm-km, more preferably less than 3 ps/nm-km; and a dispersion slope at 1310 nm of less than 0.10 ps/nm²-km. Preferably, the lateral load loss is less than 1 dB/m, more preferably less than 0.7 dB/m.

Preferably, the part of the relative refractive index that includes $\Delta_{3MAX}$ in the third portion of the core is relatively flat, i.e. of relatively constant value. Preferably, the absolute magnitude of the difference in $\Delta(r)$ between any radii within 0.5 $\mu$m of $r_{\Delta3MAX}$ is less than 0.1%, more preferably less than 0.05%. Preferably, the part of the relative refractive index that includes $\Delta_{2MIN}$ is relatively flat, i.e. of relatively constant value. Preferably, $d\Delta/dr$ has an absolute magnitude <0.05%/$\mu$m occurring between r=1 and r=2 $\mu$m.

$AOEA_{L01}$ may be greater than $AOEA_{L02}$, or $AOEA_{L02}$ may be greater than $AOEA_{L01}$, or $AOEA_{L01}$ may be substantially equal to $AOEA_{L02}$.

In preferred embodiments, $AOEA_{L01}$ and $AOEA_{L02}$ are both less than 400 $\mu$m².

In preferred embodiments, $0.25<AOEA_{L01}/AOEA_{L02}<3.5$. In other preferred embodiments, $0.3<AOEA_{L01}/AOEA_{L02}<2.5$.

Cladding, or a cladding layer, shown in FIG. 18 where $\Delta_{CLAD}=0$, surrounds and is directly adjacent the outer region of the core at $r_{CORE}$.

Example 28 can thus be described as having a core comprising an inner region (or central region), an intermediate region (or moat region) surrounding and directly adjacent to the inner region, and an outer region (or ring region) surrounding and directly adjacent to the intermediate region. The core preferably has a positive refractive index throughout. Preferably, the inner region comprises the maximum $\Delta_{CORE}$ (i.e. $\Delta_{1MAX}$) for the entire fiber, the intermediate region comprises $\Delta_{2MIN}$, and the outer region comprises $\Delta_{3MAX}$, where $\Delta_{1MAX}>0$, $\Delta_{3MAX}>0$, $\Delta_{2MIN}>0$, $\Delta_{1MAX}>\Delta_{2MIN}$, $\Delta_{3MAX}>\Delta_{2MIN}$, and $\Delta_{1MAX}>\Delta_{3MAX}>\Delta_{2MAX}>0$. Preferably, the relative refractive index profile in the first portion comprises a substantially flat part. Preferably, the relative refractive index profile in the third portion comprises a substantially flat part, and more preferably, a substantial part of the third portion has a substantially flat relative refractive index profile $\Delta_{CORE3}(r)$.

8$^{th}$ Set of Preferred Embodiments

Figure 19:
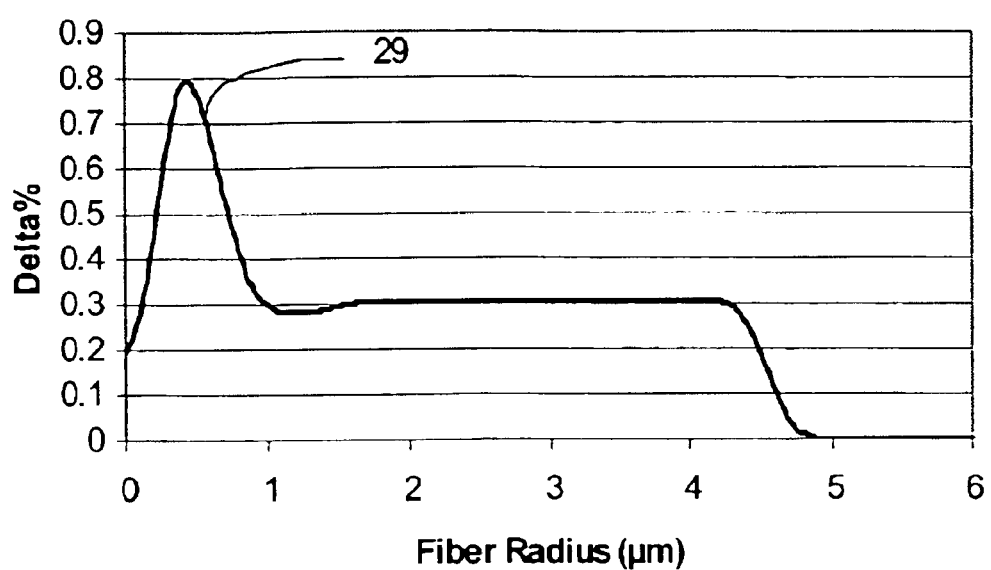
FIG. 19 shows respective refractive index profiles corresponding to a eighth set of preferred embodiments of an optical waveguide fiber as disclosed herein.

FIG. 19 schematically represents an illustrative eighth set of preferred embodiments with a corresponding refractive index profile of Example 29 in curve 29. The optical fiber of Example 29 has the following characteristics: dispersion at 1310 nm of −0.47 ps/nm-km, dispersion slope at 1310 nm of 0.0895 ps/nm$^2$-km, dispersion at 1550 nm of 16.8 ps/nm-km dispersion slope at 1310 nm of 0.095 ps/nm$^2$-km, dispersion at 1625 nm of 21.1 ps/nm-km mode field diameter at 1550 nm (MFD1550) of 10.8 μm, attenuation at 1550 nm of 0.191 dB/km, pin array at 1550 nm of 8.2 dB, lateral load loss at 1550 nm of 0.57 dB, LP11 cutoff (theoretical) of 1335 nm, zero dispersion wavelength of 1318 nm, $A_{eff}$ at 1550 nm of 83.4 μm$^2$, AOEA$_{L01}$ of 359 μm$^2$, AOEA$_{L02}$ of 118 μm$^2$, AOEA$_{MIN}$ of 118 μm$^2$, ratio AOEA$_{L01}$/AOEA$_{L02}$ of 3.04, absolute SBS threshold of 12.5 dBm, an SBS threshold improvement of about 5.7 dB over a similar length of SMF-28® or SMF-28e® optical fiber by Corning Incorporated, relative refractive index difference Δ of 0.19, 0.77, 0.30, 0.29, 0.31, 0.31, 0.31, 0.31, 0.31, 0.18, and 0.00% at radii of 0, 0.5, 1, 1.5, 2, 2.5, 3, 3.5, 4, 4.5, and 5, $\Delta_{MAX}=\Delta_{1MAX}$ of 0.80%, $\Delta_{MAX}-\Delta(r=1)$ of 0.50%, $\Delta_{MAX}-\Delta(r=3.5)$ of 0.50%, $r_{\Delta MAX}=r_{\Delta 1MAX}$ of 0.45 μm, $\Delta_{2MIN}$ of about 0.28% at $r_{\Delta 2MIN}$ of about 1.2 μm, $\Delta_{3MAX}$ of about 0.31%, $\Delta_{1MAX}-\Delta_{2MIN}$ of 0.52%, $\Delta_{3MAX}-\Delta_{2MIN}$ of 0.03%, $|\Delta_{1MAX}-\Delta_{3MAX}|$ of 0.49%, and $r_{CORE}$ of 4.85 μm.

The optical fibers illustrated by Example 29 have an optical mode effective area at 1550 nm which is greater than about 80 μm$^2$, a first acoustical mode $L_{01}$ having a first acousto-optic effective area, AOEA$_{L01}$, which is not less than 170 μm$^2$; and a second acoustical mode $L_{02}$ having a second acousto-optic effective area, AOEA$_{L02}$, which is not less than 100 μm$^2$, wherein 0.25<AOEA$_{L01}$/AOEA$_{L02}$<3.5. Preferably, the optical mode effective area at 1550 nm is greater than about 80 μm$^2$, even more preferably between about 80 and 110 μm$^2$. In some preferred embodiments, the optical mode effective area at 1550 nm is between about 80 and 100 μm$^2$. In other preferred embodiments, the optical mode effective area at 1550 nm is between about 80 and 95 μm$^2$. In some preferred embodiments, such as in FIG. 19, the core may comprise a relative refractive index profile having a so-called centerline dip which may occur as a result of one or more optical fiber manufacturing techniques. However, the centerline dip in any of the refractive index profiles disclosed herein is optional. Preferably, the core comprises a first portion extending from the centerline to a radius of 1 μm and preferably having a maximum relative refractive index $\Delta_{1MAX}$ (in percent) less than 1.0%, more preferably less than 0.9%, even more preferably between 0.6% and 0.9%, still more preferably between 0.7% and 0.85%, occurring at a radius $r_{\Delta MAX}$. The relative refractive index $\Delta_{CORE1}(r)$ is preferably greater than 0.15% and less than 0.9% for all radii between $r_{\Delta MAX}$ and r=1 μm. In preferred embodiments, $\Delta_{CORE1}(r)$ is greater than 0.2% and less than 0.85% for all radii between $r_{\Delta MAX}$ and r=1 μm. Preferably, the core further comprises a second portion surrounding and directly adjacent to the first portion, the second portion extending to a radius of 2 μm, wherein $\Delta_{CORE2}(r)$ is between 0.15% and 0.5%, more preferably between 0.2% and 0.4%, throughout the second portion. In preferred embodiments, $\Delta_{CORE2}(r)$ is greater than 0.25% and less than 0.35% from r=1 to r=1.5 μm, and in preferred embodiments, $\Delta_{CORE2}(r)$ is greater than about 0.25% and less than 0.3% from r=1.5 to r=2 μm. The second portion comprises a minimum relative refractive index, $\Delta_{2MIN}$ (in percent), preferably less than 0.4%, more preferably less than 0.3%. In preferred embodiments, the difference between $\Delta_{1MAX}$ and $\Delta_{2MIN}$, i.e. ($\Delta_{1MAX}-\Delta_{2MIN}$), is greater than 0.4%. In other preferred embodiments, ($\Delta_{1MAX}-\Delta_{2MIN}$)>0.45%. Preferably, the core further comprises a third portion surrounding and directly adjacent to the second portion, the third portion extending to a radius of 4.5 μm. At r=3 μm, $\Delta_{CORE3}$>0.2%. The third portion comprises a maximum relative refractive index $\Delta_{3MAX}$ (in percent) which is greater than $\Delta_{2MIN}$ and less than $\Delta_{1MAX}$. Preferably, the difference between $\Delta_{3MAX}$ and $\Delta_{2MIN}$, i.e. ($\Delta_{3MAX}-\Delta_{2MIN}$), is less than 0.10%. Preferably ($\Delta_{MAX}-\Delta(3.5)$)>0.4%, more preferably >0.45%. Preferably, ($\Delta_{MAX}-\Delta_{3MAX}$)>0.4%, more preferably >0.45%. In preferred embodiments, ($\Delta_{1MAX}-\Delta_{2MIN}$) is between 0.4% and 0.6%, ($\Delta_{1MAX}-\Delta_{3MAX}$) is between 0.4% and 0.6%, ($\Delta_{MAX}-\Delta(3.5)$) is between 0.4% and 0.6%, and ($\Delta_{3MAX}-\Delta_{2MIN}$)<0.10%. Preferably, $\Delta_{CORE3}(r)$ is between 0.1% and 0.4%. Preferably, the core further comprises a fourth portion surrounding and directly adjacent to the third portion, the fourth portion extending to a radius of between 4.5 and 12 μm, more preferably between 4.5 and 10 μm. $\Delta_{CORE4}(r)$ is between 0% and 0.4% throughout the fourth portion. In preferred embodiments, $\Delta_{CORE4}(r)$ for increasing radius decreases from a maximum positive relative refractive index of less than or equal to 0.4% to a minimum between 0 and 0.03%. Preferably, the relative refractive index is less than 0.03% for all radii between 6 μm and 25 μm. Preferably, the cladding surrounds and is directly adjacent to the fourth portion. Preferably, the core ends and the cladding begins at $r_{CORE}$>4.5 μm, more preferably between 4.5 and 12 μm, and even more preferably between 5 and 10 μm.

In preferred embodiments, optical fibers such as those illustrated by Example 29 disclosed herein preferably have: a dispersion at 1550 nm of greater than 15 ps/nm-km, more preferably between 15 and 22 ps/nm-km, even more preferably between 16 and 21 ps/nm-km; a dispersion slope at 1550 nm of less than 0.07 ps/nm$^2$-km, more preferably between 0.05 and 0.07 ps/nm$^2$-km; dispersion zero less than 1340 nm, more preferably less than 1320 nm, even more preferably between 1270 and 1320 nm; an optical effective area at 1550 nm greater than 80 μm$^2$, more preferably between 80 μm$^2$ and 90 μm$^2$; an optical mode field diameter at 1550 nm of greater than 10 μm, more preferably between 10 and 13 μm, even more preferably between 10 and 12 μm; pin array bend loss at 1550 nm less than 20 dB, more preferably less than 15 dB, even more preferably less than 10 dB; a dispersion at 1310 nm having a magnitude less than 5 ps/nm-km, more preferably less than 3 ps/nm-km; and a dispersion slope at 1310 nm of less than 0.10 ps/nm²-km. Preferably the lateral load loss is less than 1 dB/m, more preferably less than 0.7 dB/m.

Preferably, the part of the relative refractive index that includes $\Delta_{3MAX}$ in the third portion of the core is relatively flat, i.e. of relatively constant value. Preferably, the absolute magnitude of the difference in $\Delta(r)$ between any radii between r=2 μm and r=4 μm is less than 0.1%, more preferably less than 0.05%. Preferably, the part of the relative refractive index that includes $\Delta_{2MIN}$ is relatively flat, i.e. of relatively constant value. Preferably, $d\Delta/dr$ has an absolute magnitude <0.05%/μm occurring between r=1 and r=2 μm.

$AOEA_{L01}$ may be greater than $AOEA_{L02}$, or $AOEA_{L02}$ may be greater than $AOEA_{L01}$, or $AOEA_{L01}$ may be substantially equal to $AOEA_{L02}$. Preferably $AOEA_{L01}$ is substantially greater than $AOEA_{L02}$.

In preferred embodiments, $AOEA_{L01}$ and $AOEA_{L02}$ are both less than 400 μm².

In preferred embodiments, $0.25 < AOEA_{L01}/AOEA_{L02} < 3.5$. In other preferred embodiments, $0.3 < AOEA_{L01}/AOEA_{L02} < 3$.

Cladding, or a cladding layer, shown in FIG. 19 where $\Delta_{CLAD} = 0$, surrounds and is directly adjacent the outer region of the core at $r_{CORE}$.

Example 29 can thus be described as having a core comprising an inner region (or central region), an intermediate region (or moat region) surrounding and directly adjacent to the inner region, and an outer region (or ring region) surrounding and directly adjacent to the intermediate region. The core preferably has a positive refractive index throughout. Preferably, the inner region comprises the maximum $\Delta_{CORE}$ (i.e. $\Delta_{1MAX}$) for the entire fiber, the intermediate region comprises $\Delta_{2MIN}$, and the outer region comprises $\Delta_{3MAX}$, where $\Delta_{1MAX} > \Delta_{3MAX} > \Delta_{2MIN} > 0$, $\Delta_{1MAX} > \Delta_{2MIN}$, $\Delta_{3MAX} > \Delta_{2MIN}$. Preferably, the relative refractive index profile in the first portion comprises a substantially flat part. Preferably, the relative refractive index profile in the third portion comprises a substantially flat part, and more preferably, a substantial part of the third portion has a substantially flat relative refractive index profile $\Delta_{CORE3}(r)$.

Preferably, the optical fiber disclosed herein has an absolute threshold of greater than 9.5 dBm, more preferably greater than 10.0 dBm, even more preferably greater than 10.5 dBm, for fiber lengths greater than or equal to about 50 km.

Preferably, the optical fiber disclosed herein has an attenuation at 1380 μm which is not more than 0.3 dB/km greater than an attenuation at 1310 μm, more preferably not more than 0.1 dB/km greater, even more preferably not more than 0.05 dB/km greater. In preferred embodiments, the attenuation at 1380 nm is not more than the attenuation at 1310 nm. In other preferred embodiments, the attenuation at 1380 nm is less than 0.3 dB/km. In a preferred set of embodiments, the absolute SBS threshold is greater than $8.5 + 10\log[(1 - e^{-(0.19)(50)/4.343})/(1 - e^{-(\alpha)(L)/4.343})]$ dBm, preferably greater than $9 + 10\log[(1 - e^{-(0.19)(50)/4.343})/(1 - e^{-(\alpha)(L)/4.343})]$ dBm, even more preferably greater than $9.5 + 10\log[(1 - e^{-(0.19)(50)/4.343})/(1 - e^{-(\alpha)(L)/4.343})]$ dBm (where L is the length of the fiber in km and $\alpha$ is the attenuation of the fiber at 1550 nm) and the attenuation at 1380 μm is not more than 0.3 dB/km greater than an attenuation at 1310 μm, more preferably not more than 0.1 dB/km greater, even more preferably not more than 0.05 dB greater, and in preferred embodiments the attenuation at 1380 nm is not more than the attenuation at 1310 nm. In other preferred embodiments, the attenuation at 1380 nm is less than 0.3 dB/km. In some preferred embodiments, the optical effective area at 1550 nm is preferably greater than 80 μm², and in other preferred embodiments, the optical effective area at 1550 nm is greater than 80 μm² and less than 110 μm².

The optical fiber disclosed herein preferably exhibits a PMD of less than 0.1 ps/sqrt(km), more preferably 0.05 ps/sqrt(km), and even more preferably less than 0.02 ps/sqrt (km). In preferred embodiments, the pin array bend loss at 1550 nm is less than 5 dB, more preferably less than 3 dB. In preferred embodiments, the pin array bend loss at 1620 nm is less than 10 dB, more preferably less than 7 dB, more preferably less than 5 dB.

Preferably, the optical fiber disclosed herein has a cabled cutoff of less than 1300 nm, more preferably between 1200 and 1300 nm.

Preferably, the optical fiber disclosed herein is adapted to transmit optical signals in the 1260 nm to 1625 nm wavelength range.

Preferably, the fibers disclosed herein are made by a vapor deposition process. Even more preferably, the fibers disclosed herein are made by an outside vapor deposition (OVD) process. Thus, for example, known OVD laydown, consolidation, and draw techniques may be advantageously used to produce the optical waveguide fiber disclosed herein. Other processes, such as modified chemical vapor deposition (MCVD) or vapor axial deposition (VAD) or plasma chemical vapor deposition (PCVD) may be used. Thus, the refractive indices and the cross sectional profile of the optical waveguide fibers disclosed herein can be accomplished using manufacturing techniques known to those skilled in the art including, but in no way limited to, OVD, VAD and MCVD processes.

In a first subgroup of preferred embodiments, an optical fiber is disclosed herein for guiding at least one optical mode and a plurality of acoustical modes, including an $L_{01}$ acoustical mode and an $L_{02}$ acoustical mode, the optical fiber comprising: a core having a refractive index profile and a centerline; and a cladding layer surrounding and directly adjacent the core; wherein the effective area of said optical mode at 1550 nm is greater than 90 μm²; wherein the $L_{01}$ acoustical mode has a first acousto-optic effective area, $AOEA_{L01}$, not less than 170 μm² at the Brillouin frequency of the optical fiber; wherein the $L_{02}$ acoustical mode has a second acousto-optic effective area, $AOEA_{L02}$, not less than 170 μm² at the Brillouin frequency of the optical fiber; and wherein $0.4 < AOEA_{L01}/AOEA_{L02} < 2.5$.

In some preferred embodiments, the relative refractive index of the core has values between an upper boundary curve and a lower boundary curve; wherein the upper boundary curve is a straight line defined by at least two points, including a first upper point having a $\Delta$ of 0.6% at a radius of 0 and a second upper point having a $\Delta$ of 0% at a radius of 14.25 μm; and wherein the lower boundary curve is a straight line defined by at least two points, including a first lower point having a $\Delta$ of 0.25% at a radius of 0 and a second lower point having a $\Delta$ of 0% at a radius of 6 μm.

In some preferred embodiments, $AOEA_{L01}$ and $AOEA_{L02}$ are not less than 180 μm² at the Brillouin frequency of the optical fiber. In other preferred embodiments, $AOEA_{L01}$ and $AOEA_{L02}$ are not less than 190 μm² at the Brillouin frequency of the optical fiber.

In some preferred embodiments, the optical fiber has a zero dispersion at a wavelength below 1340 nm, more preferably in the range between 1320 and 1340 nm. In other preferred embodiments, the optical fiber has a zero dispersion at a wavelength below 1320 nm, more preferably in the range between 1290 and 1320 nm.

Preferably, the optical fiber has a dispersion of between 15 and 21 ps/nm-km at a wavelength of 1550 nm. In some preferred embodiments, dispersion is between 15 and 17 ps/nm-km at a wavelength of 1550 nm. In other preferred embodiments, the dispersion is between 17 and 20 ps/nm-km at a wavelength of 1550 nm.

Preferably, the optical fiber has an optical effective area of greater than 95 $\mu m^2$. In some preferred embodiments, the optical effective area is greater than 100 $\mu m^2$.

Preferably, the optical fiber has pin array bending loss at 1550 nm of less than 15 dB, more preferably less than 10 dB.

In some preferred embodiments, the upper boundary curve is a straight line defined by at least two points, including a first upper point having a Δ of 0.5% at a radius of 0 and a second upper point having a Δ of 0% at a radius of 11.25 $\mu m$.

Preferably, the core comprises a first portion extending from the centerline to a radius of 1 $\mu m$, the first portion having a relative refractive index greater than 0.25% and less than 0.5%. Preferably, dΔ/dR>−0.15%/$\mu m$ for all radii from r=0 to r=1 $\mu m$. Preferably, the absolute magnitude of the difference between Δ(r=0 $\mu m$) and Δ(r=1 $\mu m$) is less than 0.1%.

Preferably, the core further comprises a second portion surrounding and directly adjacent to the first portion, the second portion extending to a radius of 2.5 $\mu m$ and having Δ between 0.20% and 0.45%. Preferably, the second portion has a Δ between 0.3% and 0.45% for all radii between 1 and 1.5 $\mu m$. In some preferred embodiments, the second portion has a Δ between 0.2% and 0.35% for all radii between 1.5 and 2.5 $\mu m$.

Preferably, the core further comprises a third portion surrounding and directly adjacent to the second portion, the third portion extending to a radius of 4.5 $\mu m$ and having Δ between 0.15% and 0.35%. Preferably, the third portion has a Δ between 0.2% and 0.3% for all radii between 2.5 and 4.5 $\mu m$. Preferably, the absolute magnitude of the difference in Δ between any radii in the third portion is less than 0.1%. Preferably, the absolute magnitude of the difference in Δ between any radii between r=2.5 $\mu m$ and r=4.5 $\mu m$ is less than 0.1%.

Preferably, the core further comprises a fourth portion surrounding and directly adjacent to the third portion, the fourth portion extending to a radius of 6 $\mu m$ and having Δ between 0.1% and 0.3%. In some preferred embodiments, the fourth portion has a Δ between 0.2% and 0.3% for all radii between 4.5 and 5 $\mu m$. Preferably, the fourth portion has a Δ between 0.15% and 0.3% for all radii between 5 and 6 $\mu m$.

Preferably, the core furtherer comprises a fifth portion surrounding and directly adjacent to the fourth portion, the fifth portion extending to a radius of 9 $\mu m$ and having Δ between 0.0% and 0.15%. Preferably, Δ(r=5.5 $\mu m$)>0.1%. Preferably, Δ(r=6 $\mu m$)>0%.

In some preferred embodiments, $AOEA_{L01}$ and $AOEA_{L02}$ are less than 400 $\mu m^2$.

In some embodiments, $0.5<AOEA_{L01}/AOEA_{L02}<2$. In other embodiments, $0.6<AOEA_{L01}/AOEA_{L02}<1.5$.

In a second subgroup of preferred embodiments, an optical fiber is disclosed herein comprising: a core having a refractive index profile and a centerline; and a cladding layer surrounding and directly adjacent the core; wherein the optical effective area at 1550 nm is greater than 80 $\mu m^2$; wherein the absolute SBS threshold is greater than 9.5 dBm for a fiber length greater than about 50 km. Preferably, the optical effective area is between 80 and 110 $\mu m^2$. Preferably, the attenuation at 1380 nm is not more than 0.3 dB higher than an attenuation at 1310 nm. Preferably, the fiber exhibits a 32 mm-diameter bend loss at 1550 nm of not more than 0.03 dB/turn. Preferably, the fiber has a cabled cutoff of less than 1300 nm.

In a third subgroup of preferred embodiments, an optical fiber is disclosed herein comprising: a core having a refractive index profile and a centerline; and a cladding layer surrounding and directly adjacent the core; wherein the refractive index of the core is selected to provide an optical effective area at 1550 nm of greater than 80 $\mu m^2$; an absolute SBS threshold greater than 9.5 dBm for a fiber length greater than about 50 km; a cabled cutoff of less than 1300 nm and a 32 mm-diameter bend loss at 1550 nm of not more than 0.03 dB/turn.

In a fourth subgroup of preferred embodiments, an optical fiber is disclosed herein comprising: a core having a refractive index profile and a centerline; and a cladding layer surrounding and directly adjacent the core; wherein the absolute SBS threshold is greater than 8.5 dBm for a fiber length greater than about 50 km; and wherein an attenuation at 1380 $\mu m$ is not more than 0.3 dB greater than an attenuation at 1310 $\mu m$. Preferably, the attenuation at 1380 $\mu m$ is not more than 0.1 dB greater than the attenuation at 1310 $\mu m$. More preferably, the attenuation at 1380 $\mu m$ is not more than 0.05 dB greater than the attenuation at 1310 $\mu m$. In preferred embodiments, the attenuation at 1380 $\mu m$ is not more than the attenuation at 1310 $\mu m$. In some preferred embodiments, the attenuation at 1380 $\mu m$ is less than 0.3 dB. Preferably, the absolute SBS threshold greater than 9.0 dBm, more preferably greater than 9.5 dBm. Preferably, the optical effective area at 1550 nm is greater than 80 $\mu m^2$, more preferably greater than 80 $\mu m^2$ and less than 120 $\mu m^2$.

In a fifth subgroup of preferred embodiments, an optical fiber is disclosed herein comprising: a length; a core having a refractive index profile and a centerline; and a cladding layer surrounding and directly adjacent the core; wherein the optical fiber has an attenuation at 1550 nm; wherein the refractive index of the core is selected to provide: an optical effective area at 1550 nm greater than 80 $\mu m^2$; and an absolute SBS threshold in dBm greater than about $9.5+10\log[(1-e^{-(0.19)(50)/4.343})/(1-e^{-(\alpha)(L)/4.343})]$, wherein L is the length in km and α is the attenuation in dB/km at 1550 nm. Preferably, the optical effective area is between 80 and 110 $\mu m^2$. Preferably, the attenuation at 1380 nm is not more than 0.3 dB higher than an attenuation at 1310 nm. Preferably, the fiber exhibits a 32 mm-diameter bend loss at 1550 nm of not more than 0.03 dB/turn. Preferably, the fiber has a cabled cutoff of less than 1300 nm.

In a sixth subgroup of preferred embodiments, an optical fiber is disclosed herein comprising: a length; a core having a refractive index profile and a centerline; and a cladding layer surrounding and directly adjacent the core; wherein the optical fiber has an attenuation at 1550 nm; wherein the refractive index of the core is selected to provide: an optical effective area at 1550 nm of greater than 80 $\mu m^2$; an absolute SBS threshold in dBm greater than about $9.5+10\log[(1-e^{-(0.19)(50)/4.343})/(1-e^{-(\alpha)(L)/4.343})]$, wherein L is the length in km and α is the attenuation in dB/km at 1550 nm; a cabled cutoff of less than 1300 nm; and a 32 mm-diameter bend loss at 1550 nm of not more than 0.03 dB/turn.

In a seventh subgroup of preferred embodiments, an optical fiber is disclosed herein comprising: a core having a refractive index profile and a centerline; and a cladding layer surrounding and directly adjacent the core; wherein the absolute SBS threshold in dBm is greater than about $8.5 + 10\log[(1-e^{-(0.19)(50)/4.343})/(1-e^{-(\alpha)(L)/4.343})]$, wherein L is the length in km and $\alpha$ is the attenuation in dB/km at 1550 nm; and wherein an attenuation at 1380 μm is not more than 0.3 dB greater than an attenuation at 1310 μm. Preferably, the attenuation at 1380 μm is not more than 0.1 dB greater than the attenuation at 1310 μm, more preferably not more than 0.05 dB greater than the attenuation at 1310 μm. In some preferred embodiments, the attenuation at 1380 μm is not more than the attenuation at 1310 μm. In preferred embodiments, the attenuation at 1380 μm is less than 0.3 dB. In some preferred embodiments, the absolute SBS threshold in dBm is greater than about $9.0 + 10\log[(1-e^{-(0.19)(50)/4.343})/(1-e^{-(\alpha)(L)/4.343})]$, wherein L is the length in km and $\alpha$ is the attenuation in dB/km at 1550 nm. In other preferred embodiments, the absolute SBS threshold in dBm is greater than about $9.5 + 10\log[(1e^{-(0.19)(50)/4.343})/(1-e^{-(60)(L)/4.343})]$, wherein L is the length in km and $\alpha$ is the attenuation in dB/km at 1550 nm.

Preferably, the optical effective area at 1550 nm is greater than 80 μm². In preferred embodiments, the optical effective area at 1550 nm is greater than 80 μm² and less than 120 μm².

Figure 4:
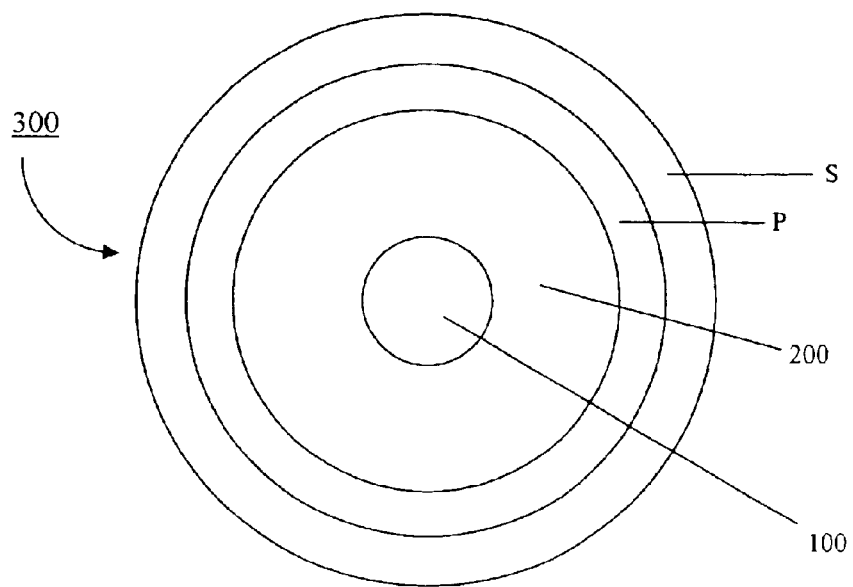
FIG. 4 is a schematic cross-sectional view of a preferred embodiment of an optical waveguide fiber as disclosed herein.

FIG. 4 is a schematic representation (not to scale) of an optical waveguide fiber 300 as disclosed herein having core 100 and an outer annular cladding or outer cladding layer or clad layer 200 directly adjacent and surrounding the core 100.

Preferably, the cladding contains no germania or fluorine dopants therein. More preferably, the cladding 200 of the optical fiber disclosed herein is pure or substantially pure silica. The clad layer 200 may be comprised of a cladding material which was deposited, for example during a laydown process, or which was provided in the form of a jacketing, such as a tube in a rod-in-tube optical preform arrangement, or a combination of deposited material and a jacket. The clad layer 200 may include one or more dopants. The clad layer 200 is surrounded by a primary coating P and a secondary coating S. The refractive index of the cladding 200 is used to calculate the relative refractive index percentage as discussed elsewhere herein.

Referring to the Figures, the clad layer 200 has a refractive index of $n_c$ surrounding the core which is defined to have a $\Delta(r)=0\%$, which is used to calculate the refractive index percentage of the various portions or regions of an optical fiber or optical fiber preform.

Figure 5:
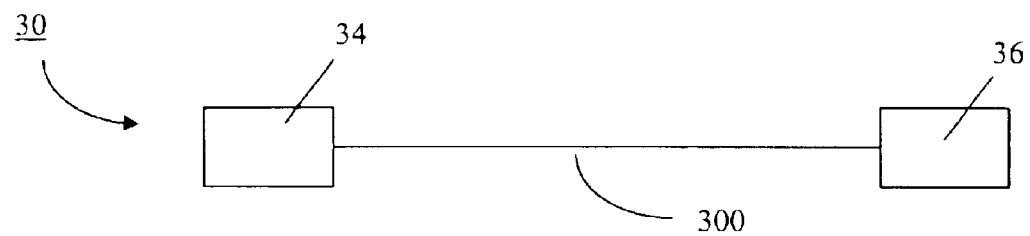
FIG. 5 is a schematic view of a fiber optic communication system employing an optical fiber as disclosed herein.

As shown in FIG. 5, an optical fiber 300 as disclosed herein may be implemented in an optical fiber communication system 30. System 30 includes a transmitter 34 and a receiver 36, wherein optical fiber 300 allows transmission of an optical signal between transmitter 34 and receiver 36. System 30 is preferably capable of 2-way communication, and transmitter 34 and receiver 36 are shown for illustration only. The system 30 preferably includes a link which has a section or a span of optical fiber as disclosed herein. The system 30 may also include one or more optical devices optically connected to one or more sections or spans of optical fiber as disclosed herein, such as one or more regenerators, amplifiers, or dispersion compensating modules. In at least one preferred embodiment, an optical fiber communication system according to the present invention comprises a transmitter and receiver connected by an optical fiber without the presence of a regenerator therebetween. In another preferred embodiment, an optical fiber communication system according to the present invention comprises a transmitter and receiver connected by an optical fiber without the presence of an amplifier therebetween. In yet another preferred embodiment, an optical fiber communication system according to the present invention comprises a transmitter and receiver connected by an optical fiber having neither an amplifier nor a regenerator nor a repeater therebetween.

Figure 6:
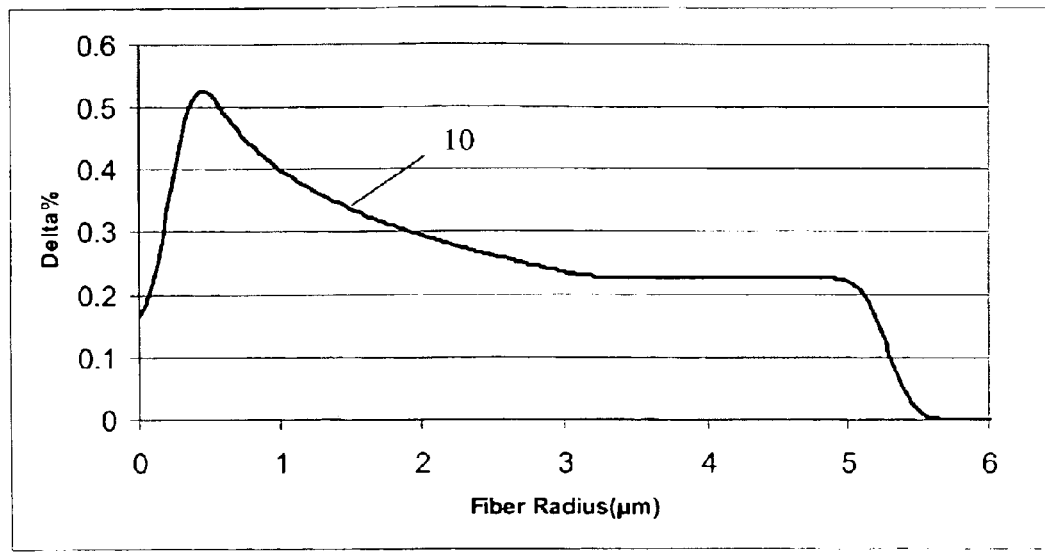
FIGS. 6–11 and FIGS. 11A–11D show respective refractive index profiles corresponding to a third set of preferred embodiments of an optical waveguide fiber as disclosed herein.
Figure 7:
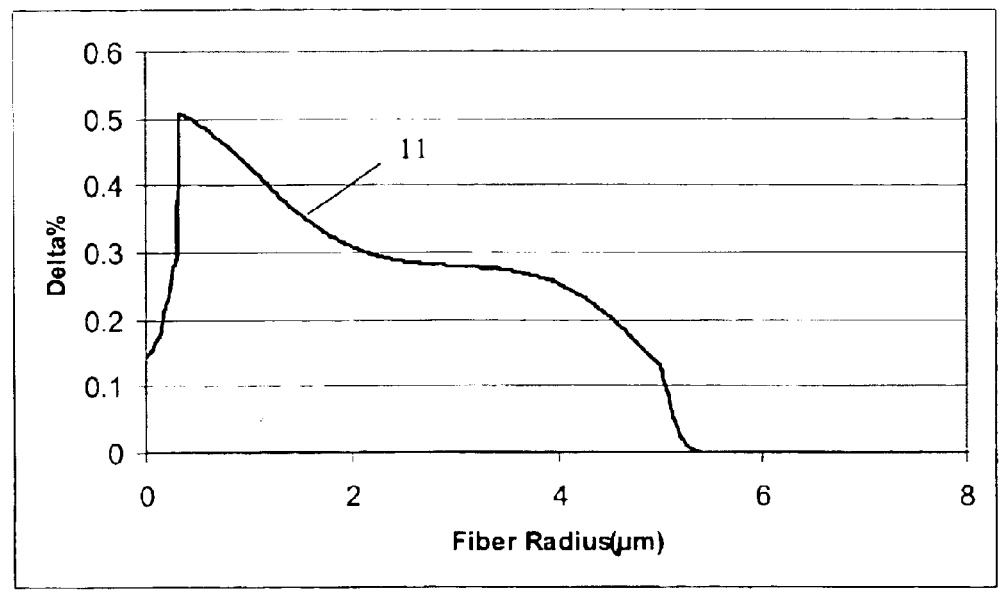
Figure 8:
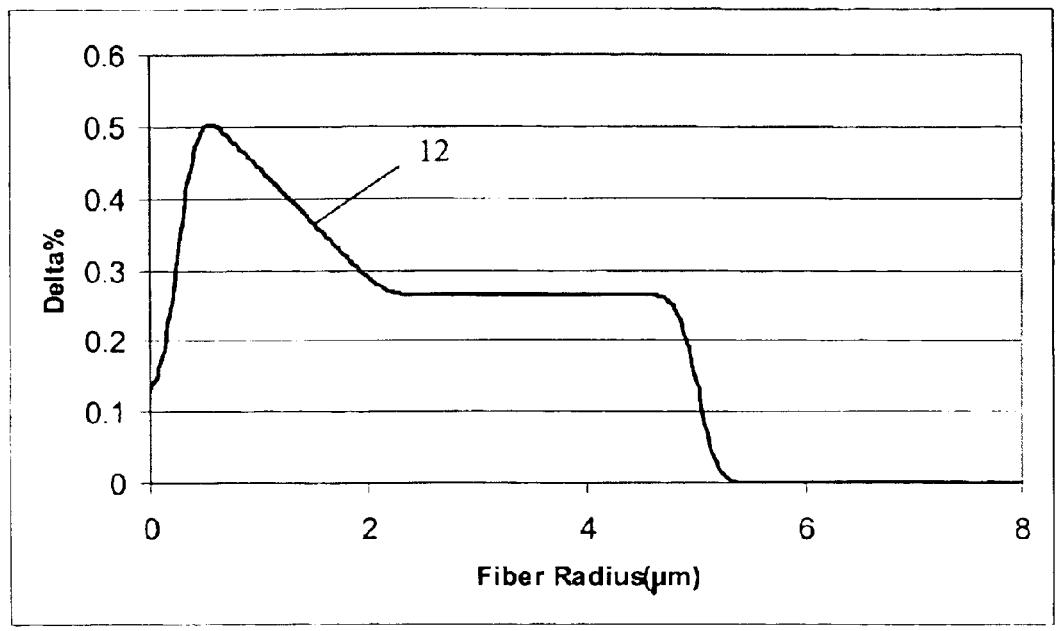
Figure 9:
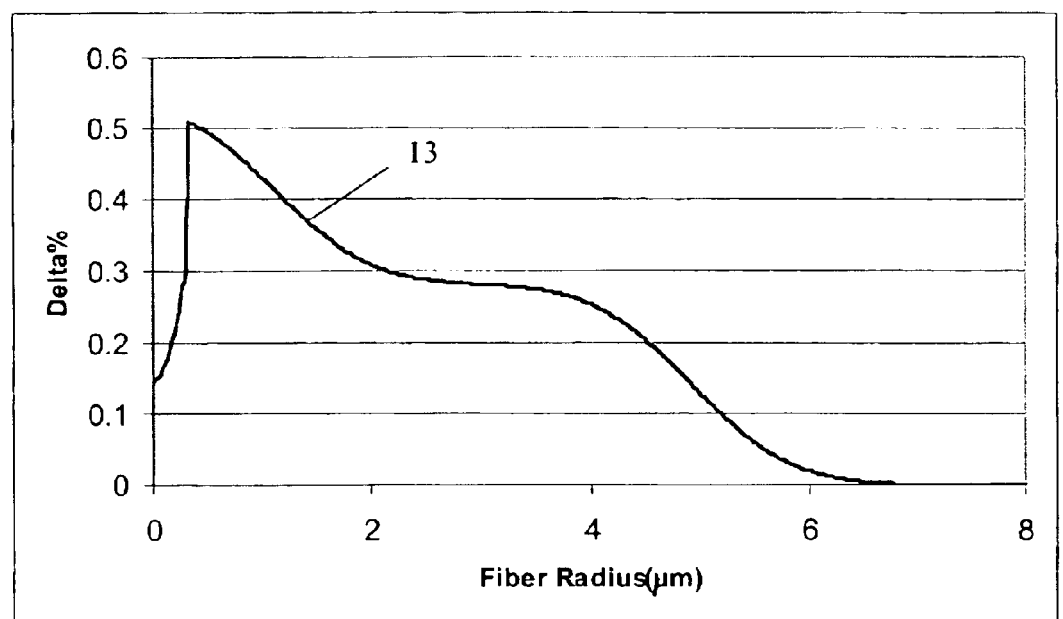
Figure 10:
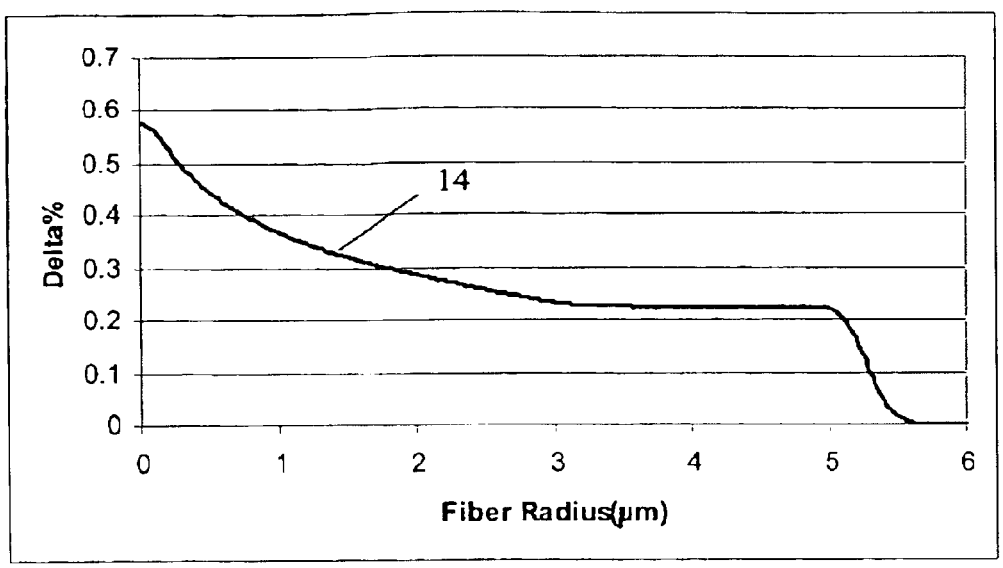
Figure 11:
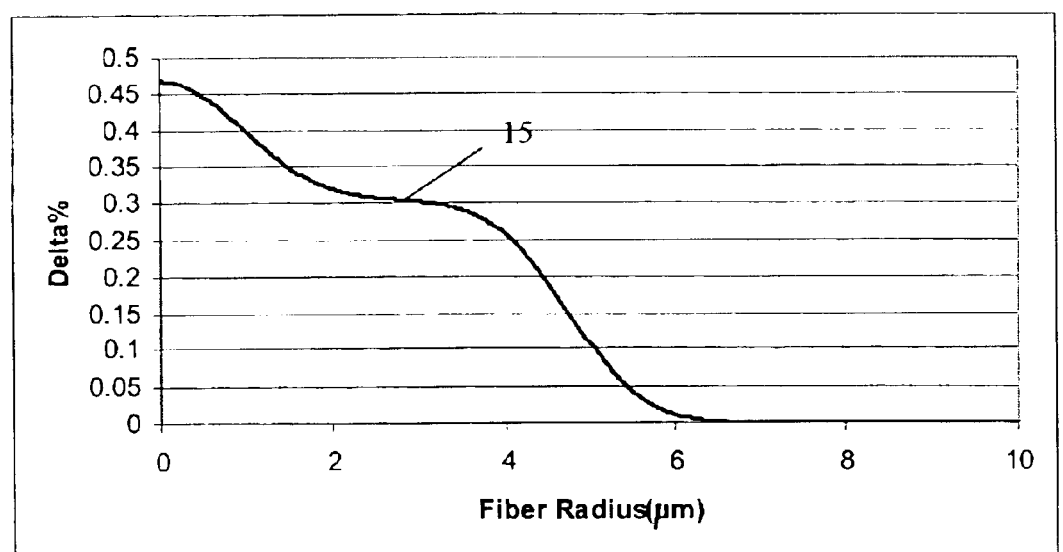
Figure 11A:
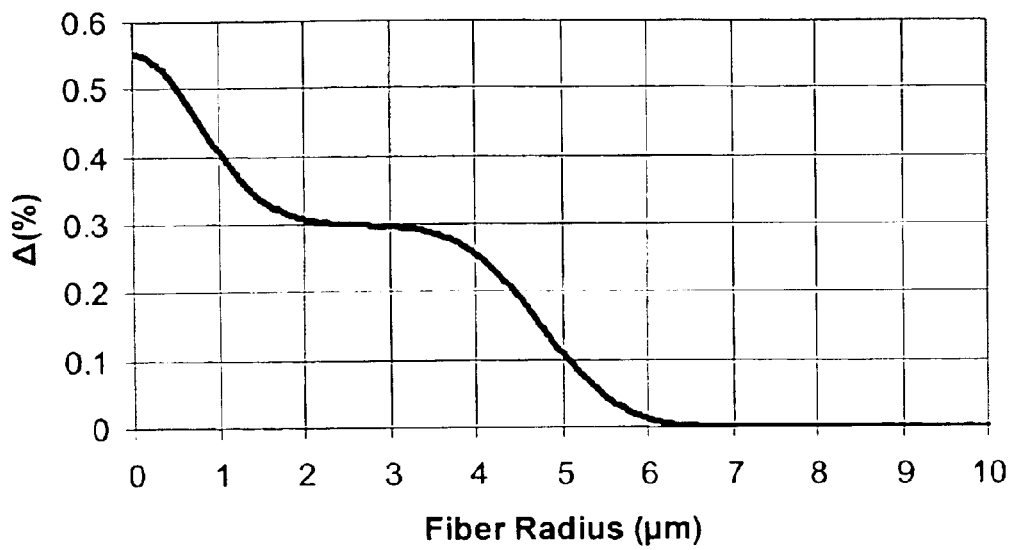
Figure 11B:
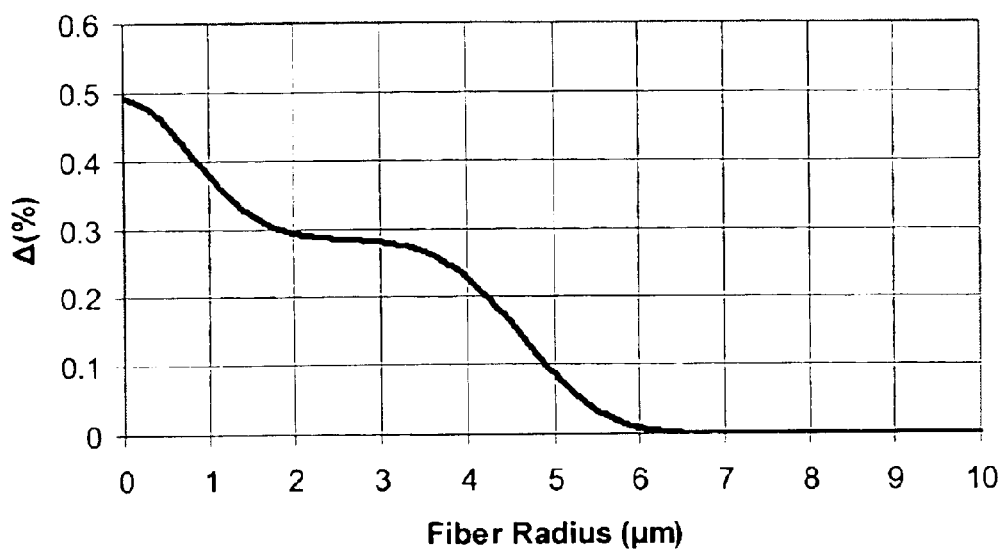
Figure 11C:
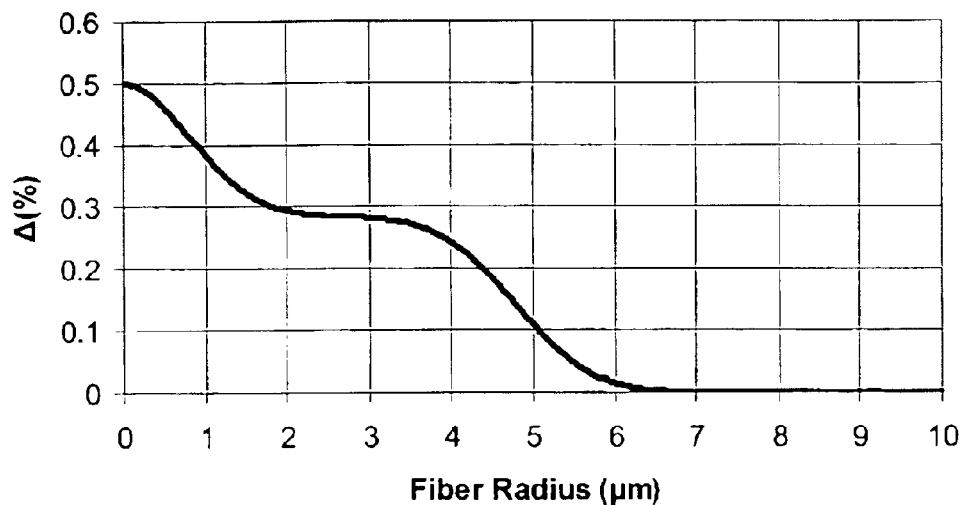
Figure 11D:
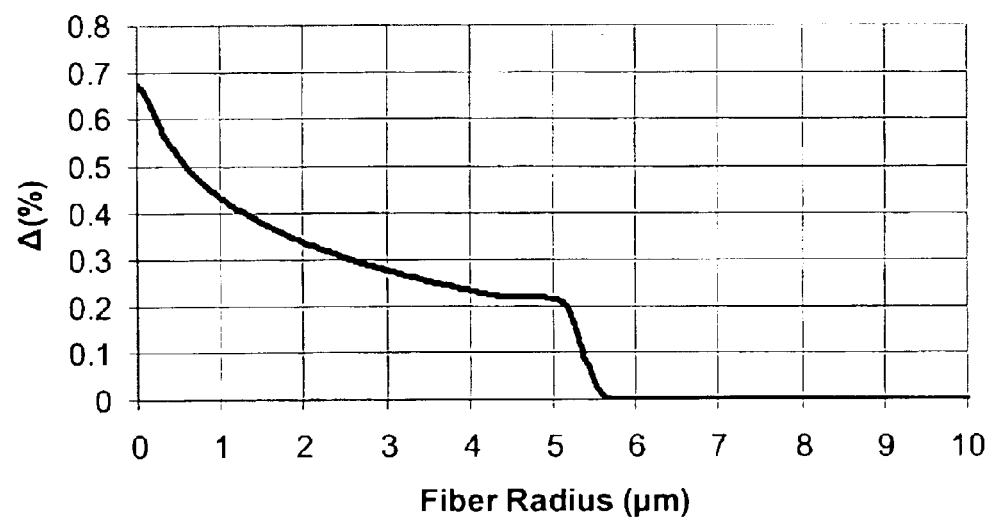
Figure 22:
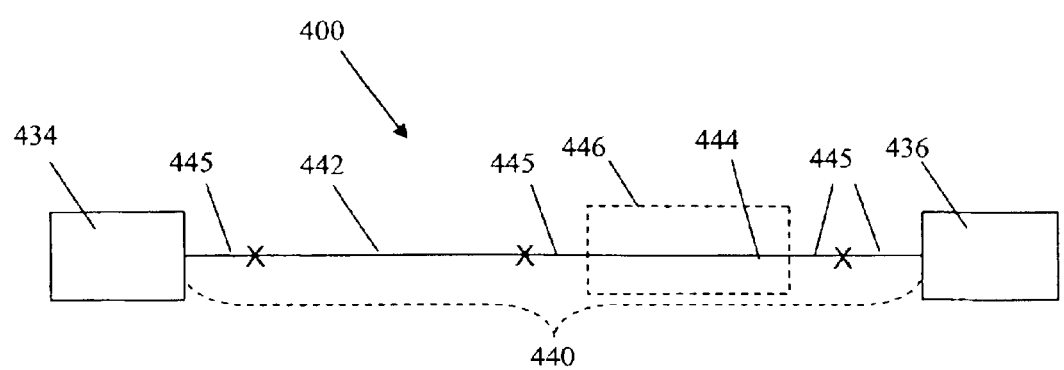
FIG. 22 schematically illustrates an optical communication system employing an optical fiber as disclosed herein.

FIG. 22 schematically illustrates another embodiment of an optical fiber communication system 400 disclosed herein. System 400 includes a transmitter 434 and a receiver 436 which are optically connected by optical transmission line 440. Optical transmission line 440 comprises a first fiber 442 which is a large effective area high SBS threshold optical fiber as disclosed herein, and a second optical fiber 444 having a dispersion at 1550 nm of between −70 and −150 ps/nm-km. In preferred embodiments, the second fiber has a relative refractive index profile having a central core segment with a positive relative refractive index, a moat segment surrounding and in contact with the central segment and having a negative relative refractive index, and a ring segment surrounding and in contact with the moat segment and having a positive relative refractive index. Preferably, the central segment of the second fiber has a maximum relative refractive index between 1.6% and 2%, the moat segment has a minimum relative refractive index between −0.25% and −0.44%, and the ring segment has a maximum relative refractive index between 0.2% and 0.5%. Preferably, the central segment of the second fiber has an outer radius of between 1.5 and 2 μm, the moat segment has an outer radius of between 4 and 5 μm, and the ring segment has a midpoint between 6 and 7 μm. An example of a second fiber is described in U.S. Patent Application Publication No. 2003/0053780, Ser. No. 10/184,377 published on Mar. 20, 2003, such as depicted in FIG. 4 or FIG. 6 therein. The first fiber 442 and second fiber 444 may be optically connected by a fusion splice, an optical connector or the like, as depicted by the symbol "X" in FIG. 22. Preferably, the kappa of the first fiber, k1, is matched to the kappa of the second fiber, k2, wherein k1/k2 is preferably between 0.8 and 1.2, more preferably between 0.9 and 1.1, and even more preferably between 0.95 and 1.05. The optical transmission line 440 may also comprise one or more components and/or other optical fiber(s) (for example one or more "pigtail fibers" 445 at junctions between fibers and/or components). In preferred embodiments, at least a portion of the second optical fiber 444 is optionally disposed within a dispersion compensating module 446. Optical transmission line 440 allows transmission of an optical signal between transmitter 434 and receiver 436. Preferably, the residual dispersion in the optical transmission line is less than about 5 ps/nm per 100 km of fiber.

Preferably, the optical fibers disclosed herein have a low water content, and preferably are low water peak optical fibers, i.e. having an attenuation curve which exhibits a relatively low, or no, water peak in a particular wavelength region, especially in the E-band.

Methods of producing low water peak optical fiber can be found in PCT Application Publication Numbers WO00/64825, WO01/47822, and WO02/051761, the contents of each being hereby incorporated by reference.

A soot preform or soot body is preferably formed by chemically reacting at least some of the constituents of a moving fluid mixture including at least one glass-forming precursor compound in an oxidizing medium to form a silica-based reaction product. At least a portion of this reaction product is directed toward a substrate, to form a porous silica body, at least a portion of which typically includes hydrogen bonded to oxygen. The soot body may be formed, for example, by depositing layers of soot onto a bait rod via an OVD process.

A substrate or bait rod or mandrel is inserted through a glass body such as a hollow or tubular handle and mounted on a lathe. The lathe is designed to rotate and translate the mandrel in close proximity with a soot-generating burner. As the mandrel is rotated and translated, silica-based reaction product, known generally as soot, is directed toward the mandrel. At least a portion of silica-based reaction product is deposited on the mandrel and on a portion of the handle to form a body thereon.

Once the desired quantity of soot has been deposited on the mandrel, soot deposition is terminated and the mandrel is removed from the soot body.

Upon removal of the mandrel, the soot body defines a centerline hole passing axially therethrough. Preferably, the soot body is suspended by a handle on a downfeed device and positioned within a consolidation furnace. The end of the centerline hole remote from the handle is preferably fitted with a bottom plug prior to positioning the soot body within the consolidation furnace. Preferably, the bottom plug is positioned and held in place with respect to the soot body by friction fit. The plug is further preferably tapered to facilitate entry and to allow at least temporary affixing, and at least loosely, within the soot body.

The soot body is preferably chemically dried, for example, by exposing soot body to a chlorine-containing atmosphere at elevated temperature within consolidation furnace. A chlorine-containing atmosphere effectively removes water and other impurities from soot body, which otherwise would have an undesirable effect on the properties of the optical waveguide fiber manufactured from the soot body. In an OVD formed soot body, the chlorine flows sufficiently through the soot to effectively dry the entire preform, including the centerline region surrounding centerline hole.

Following the chemical drying step, the temperature of the furnace is elevated to a temperature sufficient to consolidate the soot blank into a sintered glass preform, preferably about 1500° C. The centerline hole is then closed during the consolidation step so that the centerline hole does not have an opportunity to be rewetted by a hydrogen compound prior to centerline hole closure. Preferably, the centerline region has a weighted average OH content of less than about 1 ppb.

Exposure of the centerline hole to an atmosphere containing a hydrogen compound can thus be significantly reduced or prevented by closing the centerline hole during consolidation.

As described above and elsewhere herein, the plugs are preferably glass bodies having a water content of less than about 31 ppm by weight, such as fused quartz plugs, and preferably less than 5 ppb by weight, such as chemically dried silica plugs. Typically, such plugs are dried in a chlorine-containing atmosphere, but an atmosphere containing other chemical drying agents are equally applicable. Ideally, the glass plugs will have a water content of less than 1 ppb by weight. In addition, the glass plugs are preferably thin walled plugs ranging in thickness from about 200 $\mu$m to about 2 mm. Even more preferably, at least a portion of a top plug has a wall thickness of about 0.2 to about 0.5 mm. More preferably still, elongated portion 66 has a wall thickness of about 0.3 mm to about 0.4 mm. Thinner walls promote diffusion, but are more susceptible to breakage during handling.

Thus, inert gas is preferably diffused from the centerline hole after the centerline hole has been sealed to create a passive vacuum within the centerline hole, and thin walled glass plugs can facilitate rapid diffusion of the inert gas from the centerline hole. The thinner the plug, the greater the rate of diffusion. A consolidated glass preform is preferably heated to an elevated temperature which is sufficient to stretch the glass preform, preferably about 1950° C. to about 2100° C., and thereby reduce the diameter of the preform to form a cylindrical glass body, such as a core cane or an optical fiber, wherein the centerline hole collapses to form a solid centerline region. The reduced pressure maintained within the sealed centerline hole created passively during consolidation is generally sufficient to facilitate complete centerline hole closure during the draw (or redraw) process. Consequently, overall lower O—H overtone optical attenuation can be achieved. For example, the water peak at 1383 nm, as well as at other OH induced water peaks, such as at 950 nm or 1240 nm, can be lowered, and even virtually eliminated.

A low water peak generally provides lower attenuation losses, particularly for transmission signals between about 1340 nm and about 1470 nm. Furthermore, a low water peak also affords improved pump efficiency of a pump light emitting device which is optically coupled to the optical fiber, such as a Raman pump or Raman amplifier which may operate at one or more pump wavelengths. Preferably, a Raman amplifier pumps at one or more wavelengths which are about 100 nm lower than any desired operating wavelength or wavelength region. For example, an optical fiber carrying an operating signal at wavelength of around 1550 nm may be pumped with a Raman amplifier at a pump wavelength of around 1450 nm. Thus, the lower fiber attenuation in the wavelength region from about 1400 nm to about 1500 nm would tend to decrease the pump attenuation and increase the pump efficiency, e.g. gain per mW of pump power, especially for pump wavelengths around 1400 nm. Generally, for greater OH impurities in a fiber, the water peak grows in width as well as in height. Therefore, a wider choice of more efficient operation, whether for operating signal wavelengths or amplification with pump wavelengths, is afforded by the smaller water peak. Thus, reducing OH impurities can reduce losses between, for example, for wavelengths between about 1260 nm to about 1650 nm, and in particular reduced losses can be obtained in the 1383 nm water peak region thereby resulting in more efficient system operation.

The fibers disclosed herein exhibit low PMD values particularly when fabricated with OVD processes. Spinning of the optical fiber may also lower PMD values for the fiber disclosed herein.

Brillouin scattering loss of the optical fiber disclosed herein, and in particular of Ge-doped optical fiber, may be further reduced by modulating the tension applied to the fiber during draw. At least a portion, preferably an end portion, of an optical fiber preform is heated to a high temperature so that an optical fiber can be drawn, such as by lowering the preform into an RF induction furnace and heating it to a melting temperature, the preform comprising a high purity, low loss germanium silicate glass core surrounded by an outer layer of glass cladding with a lower index of refraction than the core. Fiber is then drawn from the heated preform at an appropriately modulated tension. Upon sufficient heating, a melted end portion of the preform bearing a glass strand drops, and the strand is inserted into a fiber drawing station. The parameters are then adjusted to produce a fiber of desired diameter and uniformity. The fiber drawing speed and tension can be under control of a computer the draw tension on the fiber is modulated with respect to fiber length in a sinusoidal, triangular or, preferably, a trapezoidal waveform essentially between a minimum in the range 10 to 50 g and a maximum in the range 150 to 250 g. The sinusoidal waveform is actually the positive half of a true sinusoid, and its wavelength as referred to herein is the length from the minimum tension range to the maximum back to the minimum. The preferred wavelength of a sinusoidal is in the range 3 to 30 km. The preferred triangular waveform is characterized by a base along the length in the range 3 to 30 km; and the preferred trapezoidal waveform has a pair of bases along the fiber length: a major base in the range 3 km to 15 km and a minor base in the range 1 km to 13 km. The resulting product is drawn optical fiber having a Ge-doped core and a cladding surrounding the core. The core is characterized by a repeated pattern of modulated strain. The strain is modulated with length between a low produced by 10–50 g of stress in the draw to a high produced by 150–250 g stress in the draw. The modulation pattern is characterized by a repetition length in the range 3 to 30 km. The pattern waveform is preferably sinusoidal, triangular or trapezoidal. Also see U.S. Pat. No. 5,851,259, which is incorporated herein by reference in its entirety.

All of the optical fibers disclosed herein can be employed in an optical signal transmission system, which preferably comprises a transmitter, a receiver, and an optical transmission line. The optical transmission line is optically coupled to the transmitter and receiver. The optical transmission line preferably comprises at least one optical fiber span, which preferably comprises at least one section of optical fiber.

The system preferably further comprises at least one amplifier, such as a Raman amplifier, optically coupled to the optical fiber section.

The system further preferably comprises a multiplexer for interconnecting a plurality of channels capable of carrying optical signals onto the optical transmission line, wherein at least one, more preferably at least three, and most preferably at least ten optical signals propagate at a wavelength between about 1260 nm and 1625 nm. Preferably, at least one signal propagates in one or more of the following wavelength regions: the 1310 nm band, the E-band, the S-band, the C-band, and the L-band.

In some preferred embodiments, the system is capable of operating in a coarse wavelength division multiplex mode wherein one or more signals propagate in at least one, more preferably at least two of the following wavelength regions: the 1310 nm band, the E-band, the S-band, the C-band, and the L-band.

In one preferred embodiment, the system comprises a section of optical fiber as disclosed herein having a length of not more than 20 km. In another preferred embodiment, the system comprises a section of optical fiber as disclosed herein having a length of greater than 20 km. In yet another preferred embodiment, the system comprises a section of optical fiber as disclosed herein having a length of greater than 70 km.

In one preferred embodiment, the system operates at less than or equal to about 1 Gbit/s. In another preferred embodiment, the system operates at less than or equal to about 2 Gbit/s. In yet another preferred embodiment, the system operates at less than or equal to about 10 Gbit/s. In still another preferred embodiment, the system operates at less than or equal to about 40 Gbit/s. In yet another preferred embodiment, the system operates at greater than or equal to about 40 Gbit/s.

In a preferred embodiment, a system disclosed herein comprises an optical source, an optical fiber as disclosed herein optically coupled to the optical source, and a receiver optically coupled to the optical fiber for receiving the optical signals transmitted through the optical fiber, the optical source having the capability of dithering, and/or phase modulating, and/or amplitude modulating, the optical signal generated by the optical source, and the optical signal is received by the receiver.

Stimulated Brillouin scattering (SBS) can be measured by a measurement system that records input power ($P_{in}$) and backscattered power ($P_{bs}$) as input power is varied over a defined range of input powers. Various systems and/or methods of determining the SBS threshold of an optical fiber could be used to characterize the fiber. One preferred method and system are disclosed herein.

Figure 20:
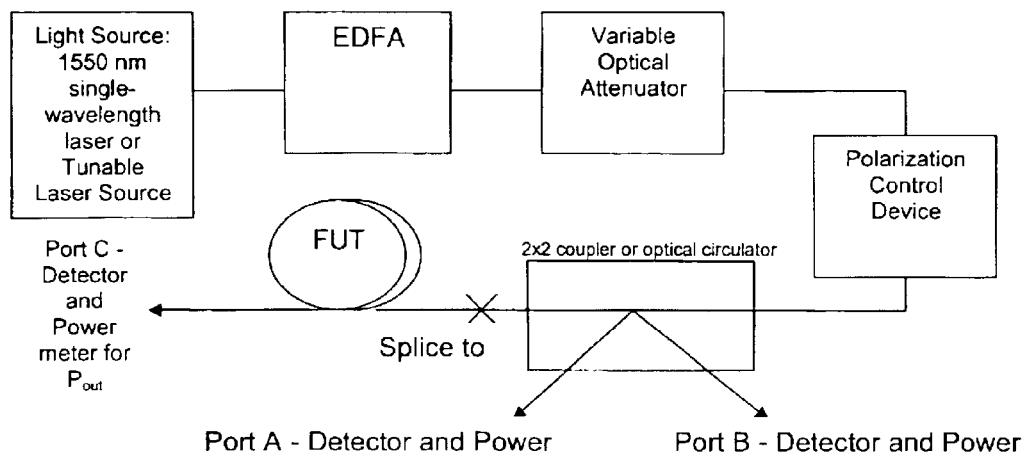
FIG. 20 is a schematic of a representative measurement system for measuring SBS threshold.

The measurement system disclosed herein comprises a light source, an erbium-doped fiber amplifier (EDFA), a variable optical attenuator (VOA), a polarization controller, an optical power routing device such as a two-by-two coupler or an optical circulator, and several optical power detectors and power meters. Single-mode patchcords with FC/APC connectors join these components. A representative measurement system is shown in FIG. 20.

The light source, which may be a tunable or single-wavelength continuous wave laser, has a very narrow spectral width, about 150 kHz or less. The wavelength is preferably centered around 1550 nm, but can vary within the gain band of the EDFA. An EDFA is used to amplify the optical signal to power levels that can induce SBS in the fiber under test. A variable optical attenuator (VOA) is used to vary the optical power that is launched into the fiber under test. The VOA is selected to allow sufficiently fine step sizes and sufficient range to allow the measurement of input power and backscattered power across a broad range of input powers. A polarization control device is preferably used to establish 100% degree of polarization and a stable state of polarization. A two-by-two directional coupler or optical circulator directs power to the fiber under test and supports the monitoring of backscattered power (Port B) and/or input power (Port A). The fiber under test (FUT) is connected to the coupler or circulator with a fusion splice or other reflectionless connection device or method. A third detector may be used to monitor output power at Port C. Unless otherwise noted herein, SBS threshold values reported herein correspond to subjecting the optical fiber to the output of a continuous wave laser having a very narrow spectral width, about 150 kHz or less. Higher threshold values may be obtained for the same fiber when subjected to the output of sources having dithered or wider spectral widths. SBS threshold values reported herein correspond to optical fibers having a length of about 50 km, unless otherwise noted. It should be understood that the SBS threshold measurements could be performed on different lengths of fiber.

To conduct a measurement, a fiber is spliced into the system and the coupler taps are connected to the optical power detectors. The laser is activated and the EDFA yields a fixed output power. The VOA attenuation is stepped across a selected range in small increments, from a high inserted loss value to zero. For example, in one embodiment the step size is 0.1 dB and the scan range is 20 dB.

Reference measurement is conducted to obtain the actual input power. Although the input power is monitored during this process, the reference measurement allows a determination of actual input power without having to account for polarization dependent loss (PDL) and splice loss. This measurement is conducted on a two-meter sample of the fiber under test. The fiber is cutback and connected to Port C. The VOA scan is repeated over the same range, and the reference input power is recorded at Port C. These power values are used as the input powers of record. The input power and backscattered power level are recorded at each step (see curve P in FIG. 21).

Figure 21:
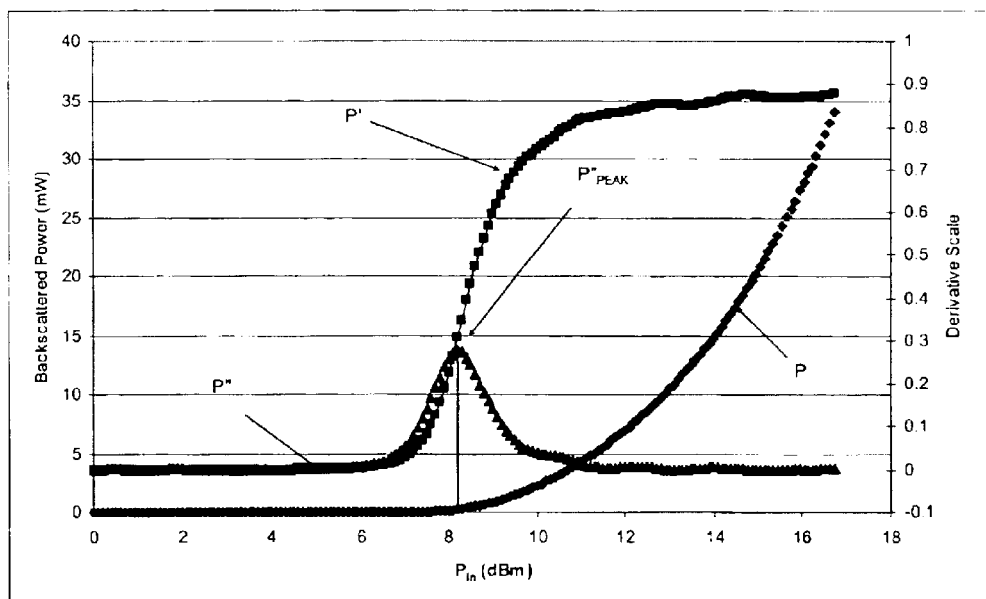
FIG. 21 is a plot of backscattered power versus input power, and its first and second derivatives for a representative optical fiber SBS threshold measurement.

When the scans are completed, first and second derivatives of the curve are calculated. The data set are preferably smoothed prior to calculating the first and second derivatives. The absolute SBS threshold is herein defined at the point at which the second derivative is maximum, which represents the point at which the rate of change of backscattered power in mW with respect to the change in input power (in mW) has reached a maximum. An illustrative plot of measured data (curve P) and the first and second derivatives (curve P' and P", respectively) are presented in FIG. 21. Curve P' is then the first derivative of backscattered power in mW with respect to input power in mW. Curve P" is the second derivative of backscattered power in mW with respect to input power in mW. In FIG. 21, the abscissa of the peak P"$_{PEAK}$ of curve P" is the absolute SBS threshold, SBSt, in dBm (e.g. 8.22 dBm in FIG. 21). That is, the input power at which the second derivative is a maximum is defined as the absolute SBS threshold for the fiber.

As reported herein, SBS threshold values were obtained with a polarization control device that establishes a fixed polarization state. However, in an alternate embodiment of the system and/or method for measuring SBS threshold, the SBS threshold could also be measured with a polarization randomizer or scrambler. The use of a polarization randomizer would increase the measured SBSt values for a given optical fiber by approximately 3 dB when compared to the SBSt value obtained with a fixed polarization state (100% degree of polarization and constant state of polarization).

Comparative SBS threshold values reported herein, such as SBS threshold improvement over a representative SMF-28® or SMF-28e® optical fiber manufactured by Corning Incorporated which has an attenuation similar to the attenuation of the optical fibers disclosed herein, compare the SBS threshold of different fibers measured in the same way (i.e. by the same method, and measurement system if measurement data is used). Thus, even though various SBS threshold measurement methods (and systems) may exist, the comparative values obtained from two different fibers according to the same method should be substantially similar to comparative values obtained from those fibers utilizing a different method.

The SBS threshold varies with the length and attenuation of the fiber under test. Generally, a very short length of an optical fiber will tend to have a higher SBS threshold value than a very long length of the same fiber. Also, generally, a length of one optical fiber having a higher attenuation will tend to have a higher SBS threshold value than the same length of another similar optical fiber having a lower attenuation. An approximate analytical expression is given in "Raman and Brillouin Non-Linearities in Broadband WDM-Overlay Single Fiber PONs," G.H. BuAbbud et al., EC 2003:

$$P_{th}(L) \approx 21 \frac{\alpha A_{eff}}{g_B^{eff}[1-\exp(-\alpha L)]},$$

where $g^{eff}_B$ is the effective Brillouin gain coefficient, $\alpha$ is the attenuation, L is the fiber length, $A_{eff}$ is the optical effective area. In this simple approximation, the SBS threshold is inversely proportion to the effective length of the fiber. Thus, if the measured threshold for a length $L_1$ is $P_1$, then the threshold at length $L_2$ is:

$$P_2(dB) \cong P_1(dB) + 10\log\left[\frac{1-\exp(-\alpha L_1)/4.343}{1-\exp(-\alpha L_2)/4.343}\right].$$

For example, the values of SBS threshold reported herein correspond to fibers having a length ($L_1$) of about 50 km and an attenuation at 1550 nm of about 0.19 dB/km. Thus, the SBS threshold $P_2$ for an optical fiber of the type disclosed herein having a length $L_2$ and attenuation $\alpha_2$ can be determined from:

$$P_2(dB) \cong P_1(dB) + 10\log\left[\frac{1-\exp(-(0.19*50))}{1-\exp(-\alpha L_2)}\right].$$

Preferably, the optical fiber disclosed herein has a silica-based core and cladding. In preferred embodiments, the cladding has an outer diameter of about 125 µm. Preferably, the outer diameter of the cladding has a constant diameter along the length of the optical fiber. In preferred embodiments, the refractive index of the optical fiber has radial symmetry.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical fiber comprising:
    a length;
    a core having a refractive index profile and a centerline, the core comprising a central region having a maximum relative refractive index $\Delta_{1MAX}$, an intermidiate region surrounding and directly adjacent the central region, the intermediate region having a minimum relative refractive index $\Delta_{2MIN}$, and an outer region surrounding and directly adjacent the intermediate region, the outer region having a maximum relative refractive index $\Delta_{3MAX}$, wherein $\Delta_{1MAX}>\Delta_{2MIN}$ and $\Delta_{3MAX}>\Delta_{2MIN}$; and
    a cladding layer surrounding and directly adjacent the core;
    wherein the optical fiber has an attenuation at 1550 nm;
    wherein the refractive index of the core is selected to provide:
    an absolute SBS threshold in dBm greater than about $9.3+10\log[(1-e^{-(0.19)(50)/4.343})/(1-e^{-(\alpha)(L)/4.343})]$,
    wherein L is the length in km and $\alpha$ is the attenuation in dB/km at 1550 nm.

2. The optical fiber of claim 1 wherein the refractive index of the core is selected to provide an optical effective area at 1550 nm greater than 80 µm².

3. The optical fiber of claim 1 wherein the refractive index of the core is selected to provide a zero dispersion wavelength below 1400 nm.

4. The optical fiber of claim 1 wherein the refractive index of the core is selected to provide a dispersion of greater than 15 ps/nm-km at a wavelength of 1550 nm.

5. The optical fiber of claim 1 wherein the refractive index of the core is selected to provide a dispersion slope at 1550 nm of less than 0.07 ps/nm²-km.

6. The optical fiber of claim 1 wherein $\Delta_{1MAX}>0.4\%$.

7. The optical fiber of claim 1 wherein $\Delta_{1MAX}>0$, $\Delta_{3MAX}>0$, $\Delta_{2MIN}>0$.

8. The optical fiber of claim 1 wherein the refractive index of the entire core relative to the cladding is greater than 0.

9. The optical fiber of claim 1 wherein $\Delta_{1MAX}$ is greater than $\Delta_{3MAX}$.

10. The optical fiber of claim 1 wherein $\Delta_{1MAX}$ is substantially equal to $\Delta_{3MAX}$.

11. The optical fiber of claim 1 wherein $\Delta_{1MAX}$ is less than $\Delta_{3MAX}$.

12. The optical fiber of claim 1 wherein $\Delta_{1MAX}-\Delta_{2MIN}>0.25\%$.

13. The optical fiber of claim 1 wherein $\Delta_{2MIN}<0.4\%$.

14. The optical fiber of claim 1 wherein $\Delta_{2MIN}$ is between 0.1 and 0.4%.

15. The optical fiber of claim 1 wherein $\Delta_{3MAX}-\Delta_{2MIN}>0.10\%$.

16. An optical communication system comprising a transmitter, a receiver, and an optical transmission line optically connecting the transmitter and receiver, the optical transmission line comprising the optical fiber of claim 1 optically connected to a second optical fiber, the second optical fiber having a dispersion at 1550 nm of between −70 and −150 ps/nm-km.

17. An optical fiber comprising:
a length;
a core having a refractive index profile and a centerline, the core having a maximum relative refractive, $\Delta_{MAX}$, wherein $\Delta_{MAX}>0.4\%$; and
a cladding layer surrounding and directly adjacent the core;
wherein the optical fiber has an attenuation at 1550 nm;
wherein the refractive index of the core is selected to provide:
an absolute SBS threshold in dBm greater than about $9.8+10\log[(1-e^{-(0.19)(50)/4.343})/(1-e^{-(\alpha)(L)/4.343})]$, wherein L is the length in km and α is the attenuation in dB/km at 1550 nm.

18. The optical fiber of claim 17 wherein $\Delta_{MAX}$ is located at a radius between 0 and 1 μm.

19. The optical fiber of claim 17 wherein the refractive index of the core is selected to provide an optical effective area at 1550 nm greater than 80 μm².

20. The optical fiber of claim 17 wherein the optical fiber has attenuation at 1380 μm not more than 0.3 dB greater than an attenuation at 1310 μm.

21. The optical fiber of claim 17 wherein the refractive index of the entire core relative to the cladding is greater than 0%.

22. The optical fiber of claim 17 wherein substantially all of the core has a relative refractive index having an alpha profile with an alpha <1.

23. The optical fiber of claim 17 wherein the core comprises a central region and an outer region surrounding and directly adjacent the central region, wherein the central region comprises $\Delta_{MAX}$.

24. The optical fiber of claim 17 wherein the core comprises a central region having a maximum relative refractive index, $\Delta_{1MAX}$, an intermediate region surrounding and directly adjacent the central region, the intermediate region having a minimum relative refractive index, $\Delta_{2MIN}$, and an outer region surrounding and directly adjacent the intermediate region, the outer region having a maximum relative refractive index, $\Delta_{3MAX}$, wherein $\Delta_{1MAX}>\Delta_{2MIN}$ and $\Delta_{3MAX}>\Delta_{2MIN}$.

25. The optical fiber of claim 24 wherein $\Delta_{1MAX}>0$, $\Delta_{3MAX}>0$, and $\Delta_{2MIN}>0$.

26. The optical fiber of claim 24 wherein $\Delta_{1MAX}$ is greater than $\Delta_{3MAX}$.

27. The optical fiber of claim 24 wherein $\Delta_{1MAX}$ is substantially equal to $\Delta_{3MAX}$.

28. The optical fiber of claim 24 wherein $\Delta_{1MAX}$ is less than $\Delta_{3MAX}$.

29. The optical fiber of claim 24 wherein $\Delta_{1MAX}-\Delta_{2MIN}>0.25\%$.

30. The optical fiber of claim 24 wherein $\Delta_{2MIN}<0.4\%$.

31. The optical fiber of claim 24 wherein $\Delta_{3MAX}-\Delta_{2MIN}>0.10\%$.

32. An optical communication system comprising a transmitter, receiver, and an optical transmission line optically connecting the transmitter and receiver, the optical transmission line comprising the optical fiber of claim 17 optically connected to a second optical fiber, the second optical fiber having a dispersion at 1550 nm of between −70 and −150 ps/nm-km.

33. An optical fiber comprising:
a core having a refractive index profile and a centerline; and
a cladding layer surrounding and directly adjacent the core;
wherein the absolute SBS threshold in dBm is greater than about $8.5+10\log[(1-e^{-(0.19)(50)/4.343})/(1-e^{-(\alpha)(L)/4.343})]$, wherein L is the length in km and α is the attenuation in dB/km at 1550 nm; and
wherein an attenuation at 1380 μm is not more than 0.3 dB greater than an attenuation at 1310 μm.

* * * * *